(12) United States Patent
Anderson

(10) Patent No.: US 10,493,945 B2
(45) Date of Patent: Dec. 3, 2019

(54) PASSENGER SIDE AIRBAG

(71) Applicant: JOYSON SAFETY SYSTEMS ACQUISITION LLC, Auburn Hills, MI (US)

(72) Inventor: Christopher L. Anderson, Harrison Township, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 60 days.

(21) Appl. No.: 15/804,612

(22) Filed: Nov. 6, 2017

(65) Prior Publication Data

US 2018/0148013 A1 May 31, 2018

Related U.S. Application Data

(63) Continuation of application No. 14/602,234, filed on Jan. 21, 2015, now Pat. No. 9,815,428.

(Continued)

(51) Int. Cl.
*B60R 21/2338* (2011.01)
*B60R 21/233* (2006.01)
*B60R 21/239* (2006.01)

(52) U.S. Cl.
CPC ........ *B60R 21/2338* (2013.01); *B60R 21/233* (2013.01); *B60R 21/239* (2013.01);
(Continued)

(58) Field of Classification Search
CPC . B60R 21/205; B60R 21/233; B60R 21/2338; B60R 21/239;
(Continued)

(56) References Cited

U.S. PATENT DOCUMENTS 5,129,675 A * 7/1992 Wang .................... B60R 21/233
280/743.1
5,160,164 A 11/1992 Fischer et al.
(Continued)

FOREIGN PATENT DOCUMENTS

DE  10 2006 014823   10/2007
FR  2577903          8/1986
(Continued)

OTHER PUBLICATIONS

International Search Report and Written Opinion issued for International Application No. PCT/US2015/012318, dated Jun. 10, 2015.
(Continued)

*Primary Examiner* — Laura Freedman
(74) *Attorney, Agent, or Firm* — Meunier Carlin & Curfman LLC

(57) ABSTRACT

An airbag includes at least one panel defining an interior of the airbag, a divider positioned in the interior so as to divide the interior into an upper chamber and a lower chamber, and at least one tethering mechanism positioned within the lower chamber. The at least one tether mechanism is structured and attached to the at least one panel so as to restrict movement of a portion of the at least one panel during airbag inflation such that a first recess is formed along an exterior surface of the airbag when the airbag is inflated.

14 Claims, 27 Drawing Sheets

Related U.S. Application Data

(60) Provisional application No. 61/929,764, filed on Jan. 21, 2014.

(52) U.S. Cl.
CPC ............... *B60R 2021/2395* (2013.01); *B60R 2021/23324* (2013.01); *B60R 2021/23382* (2013.01)

(58) Field of Classification Search
CPC .......... B60R 2021/23324; B60R 2021/23382; B60R 2021/2395; B60R 2021/23308
See application file for complete search history.

(56) References Cited

U.S. PATENT DOCUMENTS

| | | | |
|---|---|---|---|
| 5,520,413 A | 5/1996 | Mossi et al. | |
| 5,536,038 A | 7/1996 | Bollaert et al. | |
| 5,586,782 A | 12/1996 | Zimmerman et al. | |
| 5,593,179 A | 1/1997 | Maruyama | |
| 5,599,041 A | 2/1997 | Turnbull et al. | |
| 5,697,641 A | 12/1997 | McGee et al. | |
| 5,853,191 A | 12/1998 | Lachat | |
| 5,906,391 A | 5/1999 | Weir et al. | |
| 6,059,312 A | 5/2000 | Staub et al. | |
| 6,062,594 A | 5/2000 | Asano et al. | |
| 6,086,092 A | 7/2000 | Hill | |
| 6,254,121 B1 | 7/2001 | Fowler et al. | |
| 6,270,113 B1 | 8/2001 | Wipasuramonton et al. | |
| 6,276,716 B1 | 8/2001 | Kato | |
| 6,361,067 B1 | 3/2002 | Varcus et al. | |
| 6,402,190 B1 | 6/2002 | Heudorfer et al. | |
| 6,419,267 B1 | 7/2002 | Hashimoto et al. | |
| 6,439,605 B2 | 8/2002 | Ariyoshi | |
| 6,471,239 B1 | 10/2002 | Nishijima et al. | |
| 6,471,244 B1 | 10/2002 | Nishijima et al. | |
| 6,616,177 B2 | 9/2003 | Thomas et al. | |
| 6,692,023 B2 | 2/2004 | Tokita et al. | |
| 6,832,780 B2 | 12/2004 | Amamori | |
| 6,981,719 B2 | 1/2006 | Igawa | |
| 7,000,947 B2 | 2/2006 | Kumagai et al. | |
| 7,040,655 B2 | 5/2006 | Igawa et al. | |
| 7,059,634 B2 | 6/2006 | Bossecker et al. | |
| 7,111,866 B2 | 9/2006 | Abe et al. | |
| 7,147,247 B2 | 12/2006 | Hayakawa | |
| 7,264,268 B2 | 9/2007 | Ehrke | |
| 7,264,269 B2 | 9/2007 | Gu et al. | |
| 7,334,812 B2 | 2/2008 | Abe | |
| 7,393,011 B2 | 7/2008 | Keshavaraj | |
| 7,455,317 B2 | 11/2008 | Bito | |
| 7,543,849 B2 | 6/2009 | Bradburn | |
| 7,543,850 B2 | 6/2009 | Bachraty et al. | |
| 7,597,356 B2 | 10/2009 | Williams | |
| 7,604,252 B2 | 10/2009 | Heitplatz et al. | |
| 7,625,007 B2 | 12/2009 | Sekizuka | |
| 7,731,232 B2 | 6/2010 | Higuchi | |
| 7,789,423 B2* | 9/2010 | Kim | B60R 21/233 280/743.2 |
| 7,857,347 B2 | 12/2010 | Abe et al. | |
| 7,862,082 B2 | 1/2011 | Thomas | |
| 7,938,446 B2 | 5/2011 | Smith et al. | |
| 8,002,309 B2 | 8/2011 | Kim et al. | |
| 8,342,573 B2 | 1/2013 | Kwon | |
| 8,371,612 B2 | 2/2013 | Williams et al. | |
| 8,419,050 B2 | 4/2013 | Yoo | |
| 8,480,122 B2 | 7/2013 | Ohara | |
| 8,500,159 B2 | 8/2013 | Feller et al. | |
| 8,505,966 B2 | 8/2013 | Yoo | |
| 8,613,465 B2 | 12/2013 | Nozaki et al. | |
| 8,746,734 B1 | 6/2014 | Smith et al. | |
| 8,925,962 B2 | 1/2015 | Yamada | |
| 9,120,460 B2 | 9/2015 | Fukurono et al. | |
| 9,272,683 B2 | 3/2016 | Anderson et al. | |
| 9,321,425 B2 | 4/2016 | Charpentier | |
| 9,381,885 B2 | 7/2016 | Anderson | |
| 9,440,612 B2* | 9/2016 | Anderson | B60R 21/239 |
| 9,487,181 B2* | 11/2016 | Anderson | B60R 21/233 |
| 9,815,428 B2* | 11/2017 | Anderson | B60R 21/2338 |
| 9,862,350 B2* | 1/2018 | Guerrero | B60R 21/233 |
| 9,969,350 B2* | 5/2018 | Anderson | B60R 21/239 |
| 2001/0007391 A1 | 7/2001 | Hamada et al. | |
| 2001/0015546 A1 | 8/2001 | Kato | |
| 2003/0151233 A1 | 8/2003 | Varcus | |
| 2004/0119271 A1 | 6/2004 | Webber | |
| 2006/0175809 A1 | 8/2006 | Yamaji et al. | |
| 2006/0237953 A1 | 10/2006 | Abe | |
| 2007/0052222 A1 | 3/2007 | Higuchi et al. | |
| 2007/0170710 A1 | 7/2007 | Bouquier | |
| 2008/0143086 A1 | 6/2008 | Higuchi | |
| 2008/0179867 A1 | 7/2008 | Riedel | |
| 2009/0152846 A1 | 6/2009 | Choi | |
| 2009/0224520 A1 | 9/2009 | Higuchi | |
| 2010/0001495 A1 | 1/2010 | Sekino et al. | |
| 2010/0133797 A1 | 6/2010 | Kim et al. | |
| 2010/0225094 A1 | 9/2010 | Rose et al. | |
| 2010/0244419 A1 | 9/2010 | Maripudi | |
| 2011/0248487 A1 | 10/2011 | Burczyk et al. | |
| 2011/0260431 A1 | 10/2011 | Kwon | |
| 2012/0025497 A1 | 2/2012 | Yoo | |
| 2012/0112441 A1 | 5/2012 | Ohara | |
| 2012/0248746 A1 | 10/2012 | Yamamoto | |
| 2013/0001934 A1 | 1/2013 | Nagasawa et al. | |
| 2013/0020787 A1 | 1/2013 | Abele et al. | |
| 2013/0133971 A1 | 5/2013 | Rick | |
| 2013/0221645 A1 | 8/2013 | Yamada | |
| 2014/0151985 A1 | 6/2014 | Hotta et al. | |
| 2014/0203542 A1 | 7/2014 | Fukawatase et al. | |
| 2014/0225354 A1 | 8/2014 | Williams et al. | |
| 2014/0265277 A1 | 9/2014 | Iida et al. | |
| 2014/0306433 A1 | 10/2014 | Anderson et al. | |
| 2015/0035263 A1 | 2/2015 | Guerrero et al. | |
| 2015/0042080 A1 | 2/2015 | Guerrero et al. | |
| 2015/0375709 A1 | 12/2015 | Anderson | |

FOREIGN PATENT DOCUMENTS

| | | |
|---|---|---|
| JP | H09-118186 | 5/1997 |
| JP | 10-100827 | 4/1998 |
| JP | 3648795 | 2/2005 |
| JP | 2005247118 | 9/2005 |
| KR | 2004-0073017 | 8/2004 |
| KR | 10-2014-0014923 | 2/2014 |
| WO | 2007069064 | 6/2007 |

OTHER PUBLICATIONS

Office Action and Search Report issued in Chinese Application No. 201580005354.8, dated Jan. 17, 2018, English translation included.

Office Action issued in U.S. Appl. No. 14/458,153, dated May 15, 2015.

Office Action issued in U.S. Appl. No. 14/458,153, dated Nov. 18, 2015.

Office Action issued in U.S. Appl. No. 14/458,153, dated Apr. 5, 2016.

Office Action issued in U.S. Appl. No. 14/458,153, dated Oct. 19, 2016.

Office Action issued in U.S. Appl. No. 14/458,153, dated May 24, 2017.

Notice of Allowance issued in U.S. Appl. No. 14/458,153, dated Sep. 6, 2017.

Office Action issued in Chinese Application No. 201480050175.1, dated Oct. 13, 2017, with English translation.

Office Action issued in Chinese Application No. 201480050175.1, dated Feb. 27, 2017, with English translation.

International Search Report and Written Opinion issued for International Application No. PCT/US2014/050780, dated Dec. 16, 2014.

Office Action issued in Japanese Application No. 2016-533502, dated Aug. 28, 2017, English translation included.

(56) References Cited

OTHER PUBLICATIONS

Office Action issued in Chinese Application No. 201480019815.2, dated Nov. 17, 2016, English translation included.
Office Action issued in Chinese Application No. 201480019815.2, dated Aug. 11, 2017, English translation included.
Office Action issued in Chinese Application No. 201480019815.2, dated Apr. 23, 2018, English translation included.
Non-Final Office Action, dated Oct. 23, 2015, in connection with U.S. Appl. No. 14/912,812.
Final Office Action, dated Apr. 18, 2016, in connection with U.S. Appl. No. 14/912,812.
Non-Final Office Action, dated Jul. 2, 2014, in connection with U.S. Appl. No. 14/195,767.
Final Office Action, dated Dec. 16, 2014, in connection with U.S. Appl. No. 14/195,767.
Non-Final Office Action, dated Mar. 13, 2015, in connection with U.S. Appl. No. 14/195,767.
Final Office Action, dated Aug. 5, 2015, in connection with U.S. Appl. No. 14/195,767.
Japanese Office Action, dated May 14, 2018, in connection of Application No. 2016-5365136.

* cited by examiner

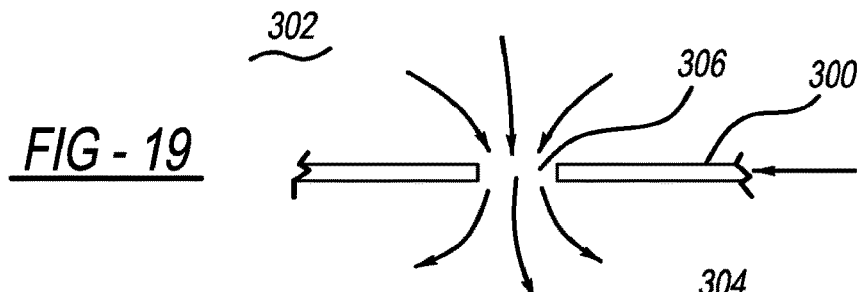
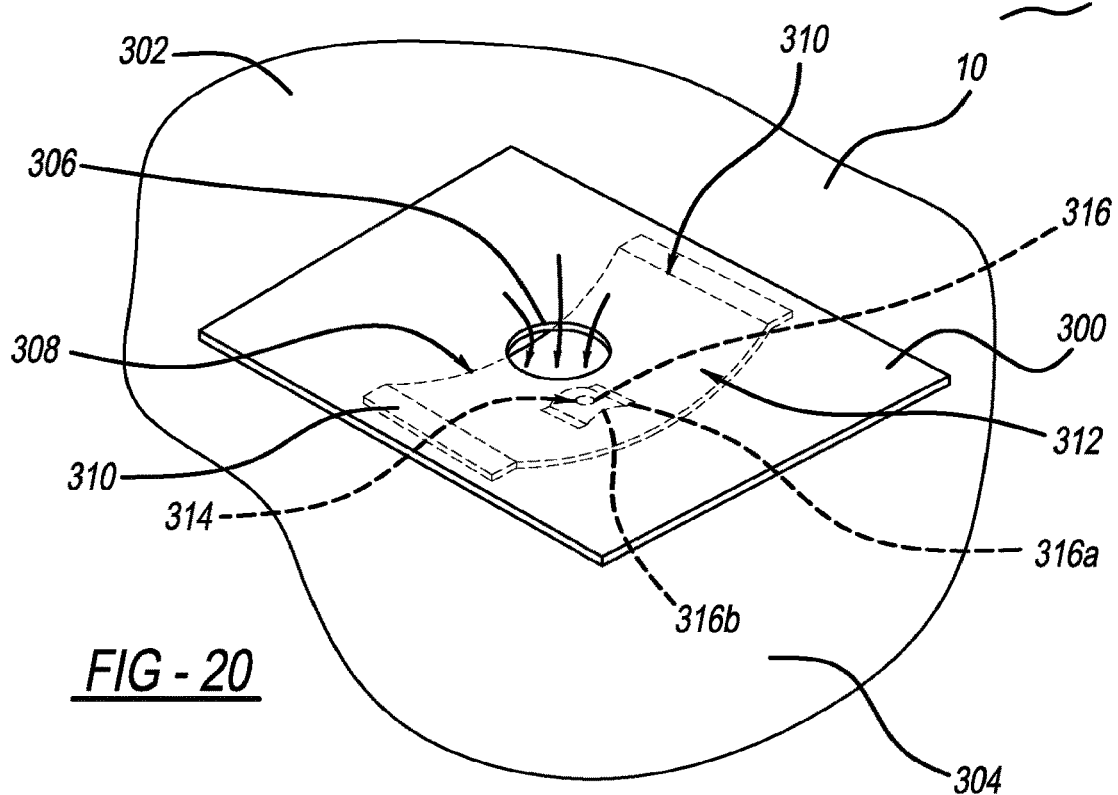
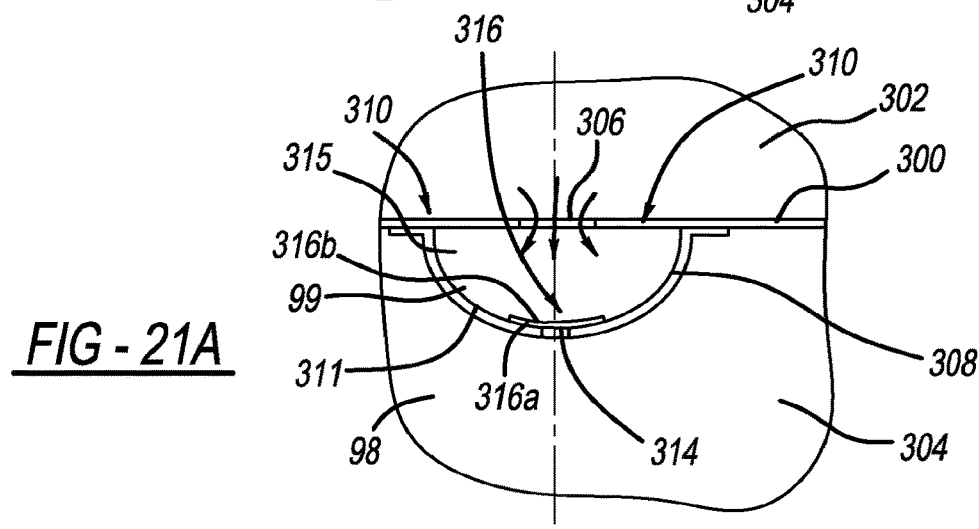

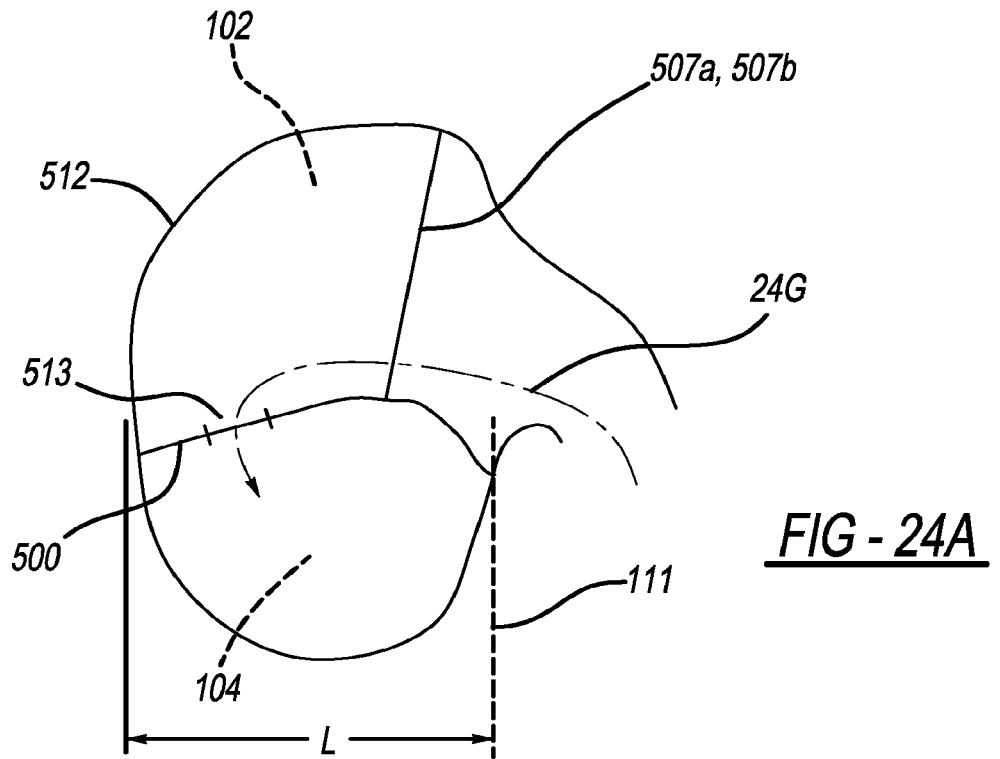

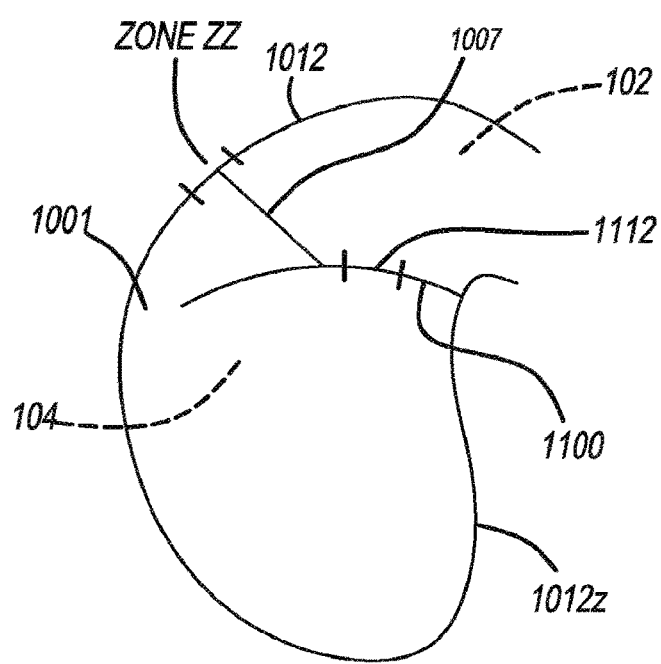
FIG - 25A
FIG - 25B
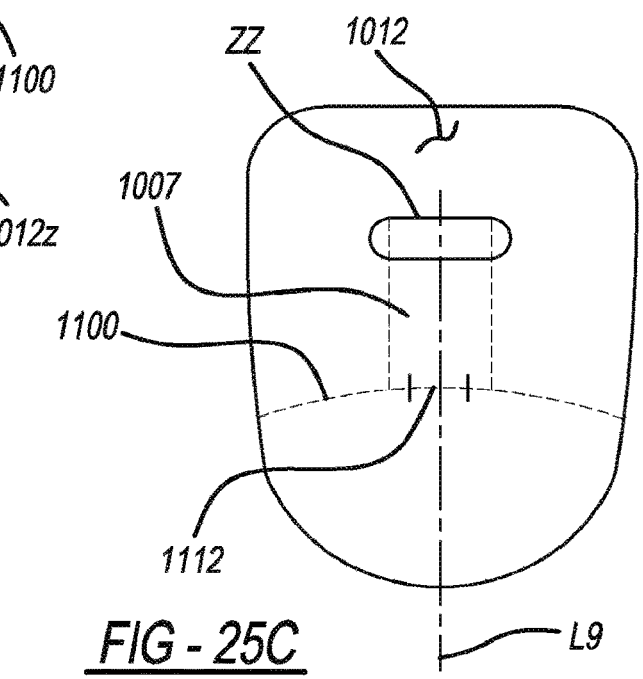
FIG - 25C

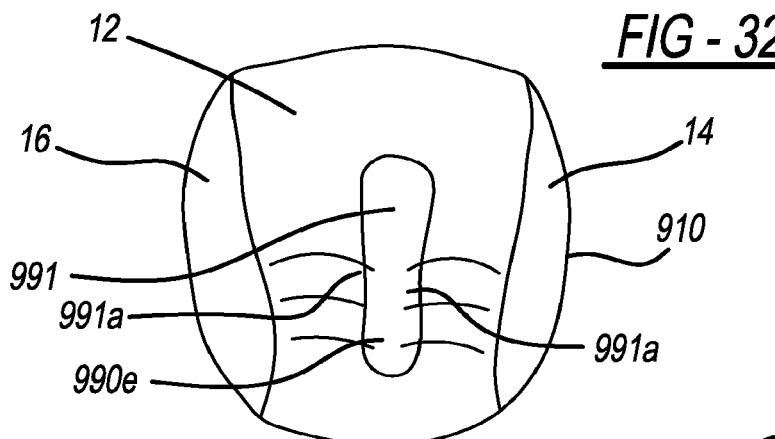
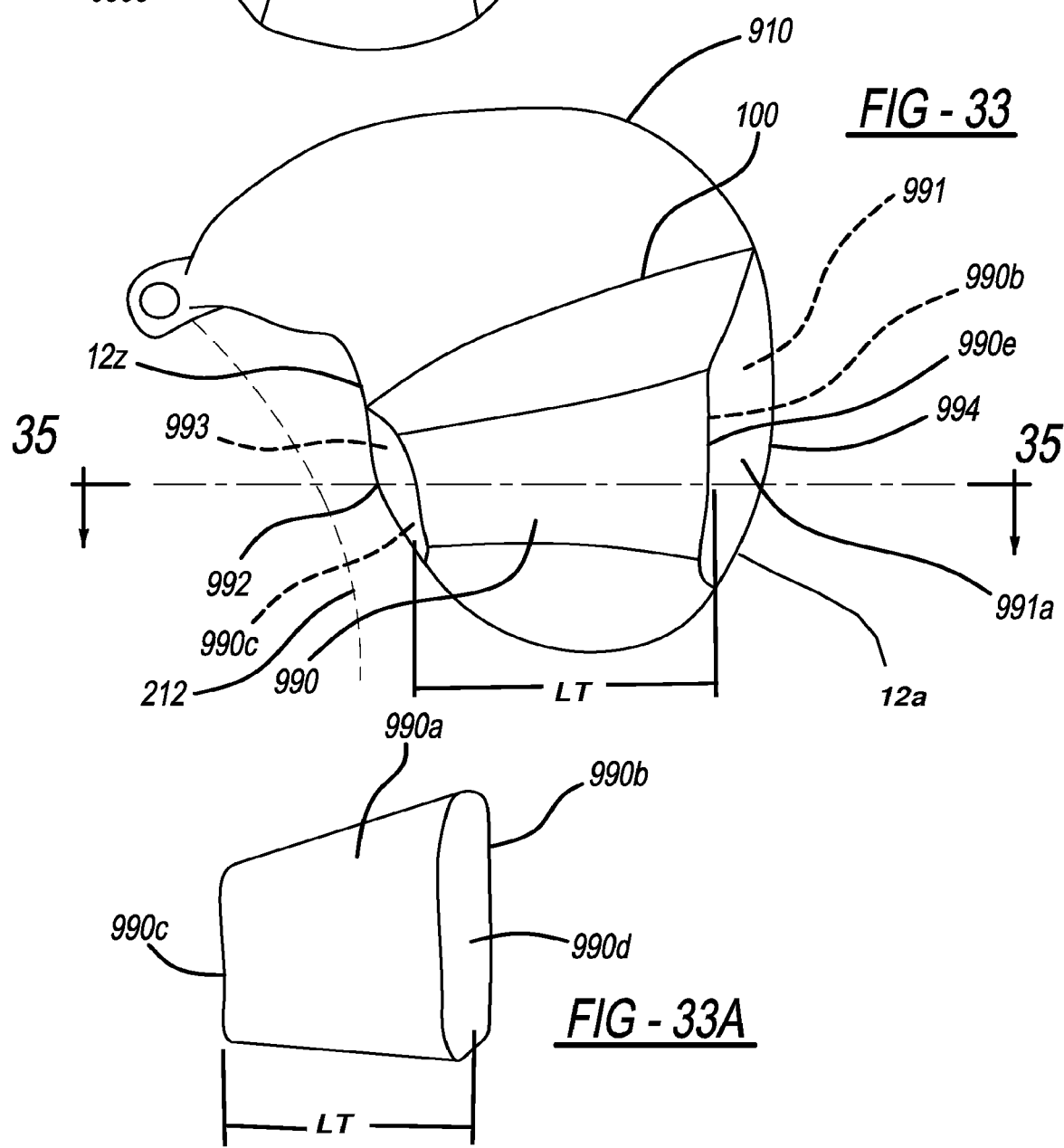

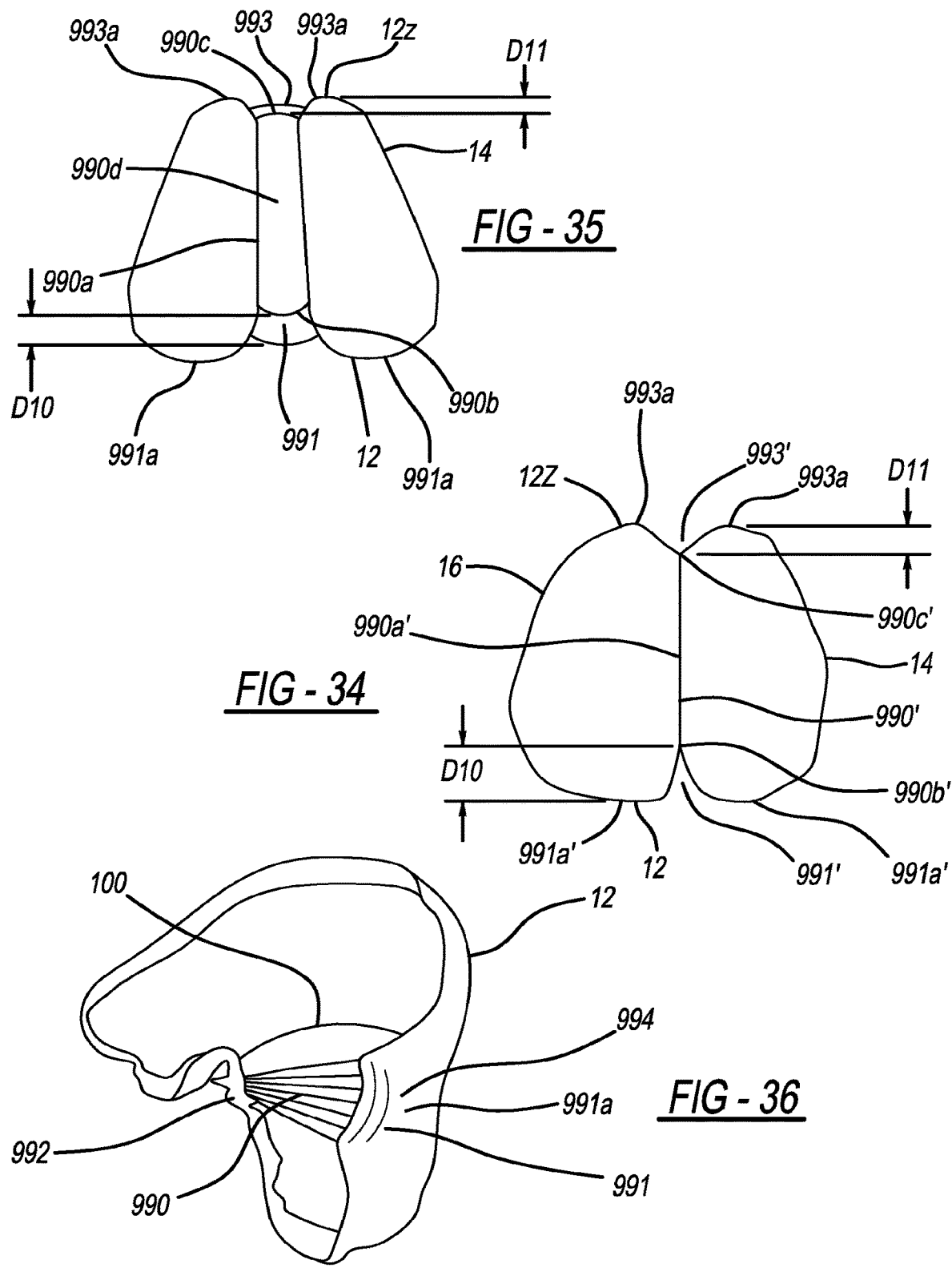

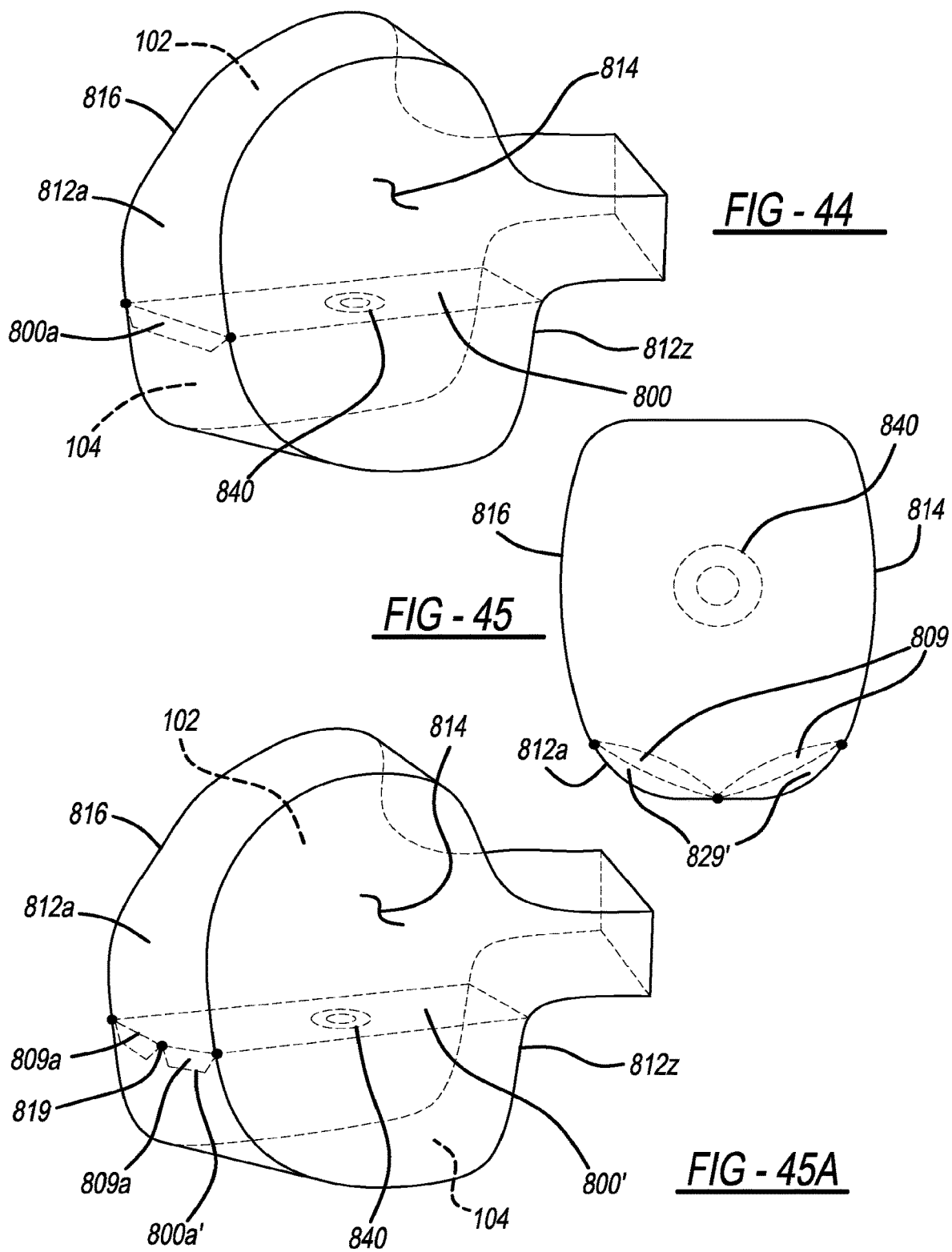

PASSENGER SIDE AIRBAG

CROSS-REFERENCE TO RELATED APPLICATIONS

This application is a continuation application of U.S. application Ser. No. 14/602,234 filed Jan. 21, 2015, which will issue as U.S. Pat. No. 9,815,428 on Nov. 14, 2017 and which claims priority to and the benefit of U.S. Provisional Application Ser. No. 61/929,764, filed on Jan. 21, 2014, both of which are fully incorporated by reference in their entireties.

BACKGROUND OF THE INVENTION

The present invention relates to a passenger side airbag, which is filled with gas during an emergency situation such as, for example, a frontal or side impact. It will be appreciated that the structural benefits and design principles may of course be extended to airbags typically employed in other areas of the vehicle, such as a side airbag, for example.

Current airbag cushion designs may include multiple chambers and may incorporate an inter-chamber valving system that allows gas to flow from one chamber to another. These cushions are configured to rapidly contact a vehicle occupant when inflated, to limit movement of the passenger head, neck and thoracic regions. However, these cushion designs do not differentiate between these different regions with regard to the stiffness or resistance of the various portions of the airbag to contact with each region.

Research has shown that the masses of the various body portions contacting an airbag differ greatly. For example, the mass ratio of the Thorax to Head & Neck regions may range from between 5:1 to 8:1, depending on the sex of the individual. Due to the differences in body part masses and the dynamics of contact between the occupant and the cushion, it has proven difficult to design a multi-chamber airbag which provides optimum protection for each portion of the body contacting the airbag.

Thus, a need exists for an airbag design which permits the stiffness or resistance to occupant impact provided by each portion of the airbag to be adjusted according to the time elapsed since the initiation of airbag deployment, the size of the occupant, and/or the masses of different portions of the occupant's body contacting an associated portion of the airbag. A need also exists for an airbag structure adaptable for controlling a neck extension moment (defined as an undesirable rotation of the head and neck about the torso at the neck-torso junction) resulting from contact of the passenger with the airbag.

SUMMARY OF THE INVENTION

In one aspect of the embodiments described herein, an airbag is provided. The airbag includes at least one panel defining an interior of the airbag, a divider positioned in the interior so as to divide the interior into an upper chamber and a lower chamber, and at least one tethering mechanism positioned within the lower chamber. The at least one tether mechanism is structured and attached to the at least one panel so as to restrict movement of a portion of the at least one panel during airbag inflation such that a first recess is formed along an exterior surface of the airbag when the airbag is inflated.

In another aspect of the embodiments of the described herein, an airbag is provided. The airbag includes at least one panel defining an interior of the airbag, a divider positioned in the interior so as to divide the interior into an upper chamber and a lower chamber, and at least one tether positioned within the upper chamber. The at least one tether is attached to the divider and to a portion of the at least one panel so as to restrict movement of a portion of the divider in a direction toward the lower chamber during inflation of the airbag.

In another aspect of the embodiments of the described herein, an airbag is provided. The airbag includes at least one panel defining an interior of the airbag, and a divider positioned in the interior so as to divide the interior into an upper chamber and a lower chamber. At least a portion of a leading edge of the divider is not attached to an occupant contact side of the at least one panel.

BRIEF DESCRIPTION OF THE DRAWINGS

FIG. 19 shows a schematic representation of gas flow from an upper airbag chamber through a divider opening and into a lower chamber.

FIG. 20 is a perspective view of a portion of an interior of an airbag incorporating one embodiment of a divider and valve mechanism described herein.

FIG. 21A is a cross-sectional side view of a portion of the airbag shown in FIG. 20 during flow of gases from an upper chamber of the airbag to a lower chamber of the airbag.

FIG. 24A is a cross-sectional view of the airbag shown in FIG. 24.

FIG. 25 is a cross-sectional perspective view of another embodiment of an inventive enhancement using a unique tethered system, with the tether attached to the airbag divider and main panel.

FIG. 25A is a cross-sectional view of the airbag shown in FIG. 25.

FIG. 25B is a schematic cross-sectional side view of an airbag in accordance with a particular embodiment described herein.

FIG. 25C is a front or passenger-facing view of the airbag embodiment shown in FIG. 25B.

FIG. 32 is a front (passenger-facing) view of the airbag embodiment shown in FIG. 33.

FIG. 33 is a cross-sectional side view showing attachment of one embodiment of an internal tether to occupant contact and rear surfaces of an airbag.

FIG. 33A is a perspective view of one embodiment of a tether mechanism incorporated into the airbag embodiment of FIG. 33.

FIG. 34 is a cross-sectional plan view showing an airbag including one embodiment of an internal tethering mechanism.

FIG. 35 is a cross-sectional plan view of the airbag embodiment shown in FIGS. 32 and 33.

FIG. 36 is a side cross-sectional perspective view of the airbag embodiment shown in FIG. 33.

FIG. 44 is a schematic perspective view of the airbag shown in FIG. 43.

FIG. 45 is a schematic cross-sectional plan view of a portion of an airbag incorporating a divider and flow restriction valve mechanism in accordance with another embodiment described herein.

FIG. 45A is a schematic perspective view of the airbag shown in FIG. 45.

DETAILED DESCRIPTION

Figure 1:
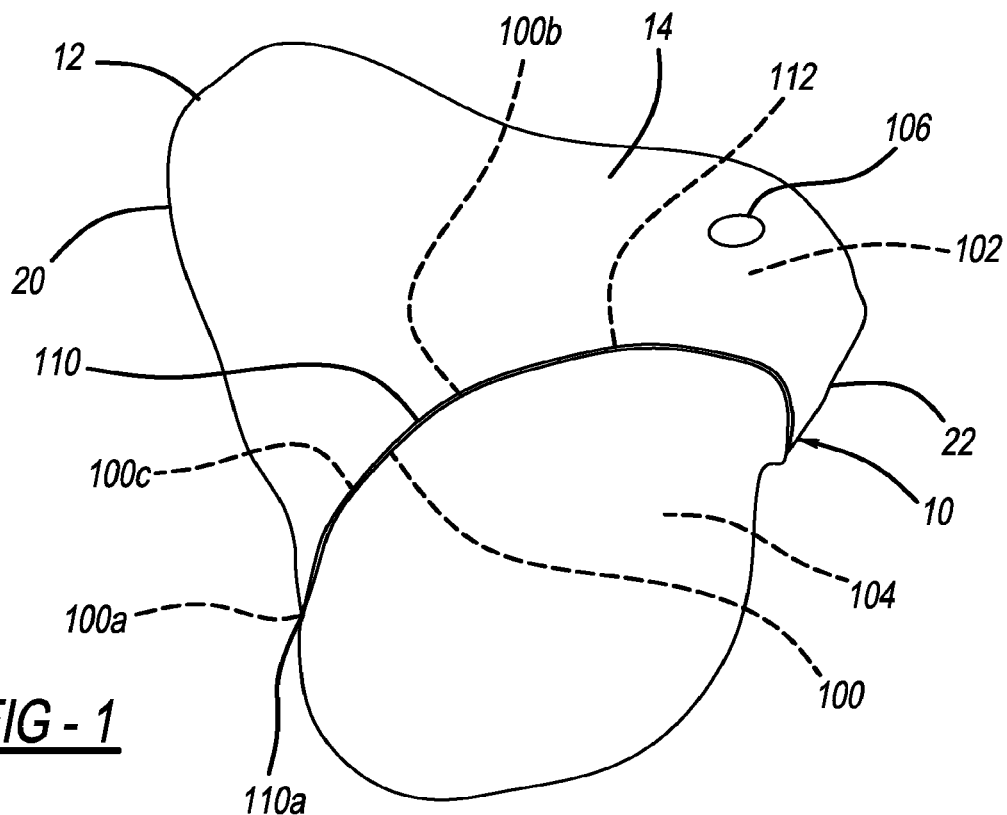
FIG. 1 is a side cross-sectional view of a passenger-side airbag (in an inflated state) in accordance with one embodiment described herein.
Figure 2:
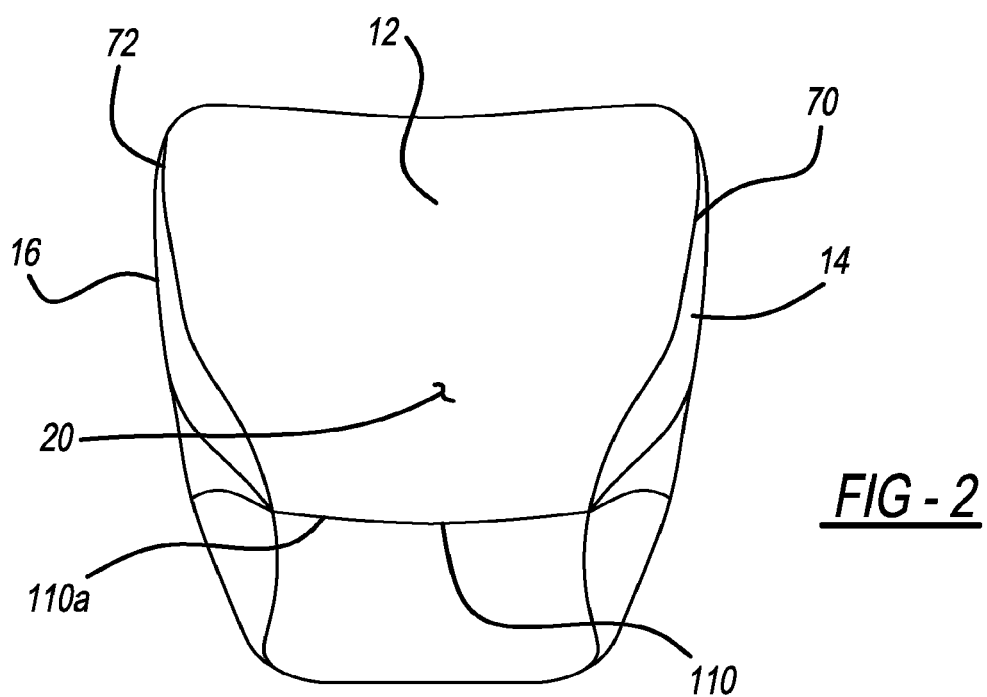
FIG. 2 is a front view of the airbag of FIG. 1.
Figure 3:
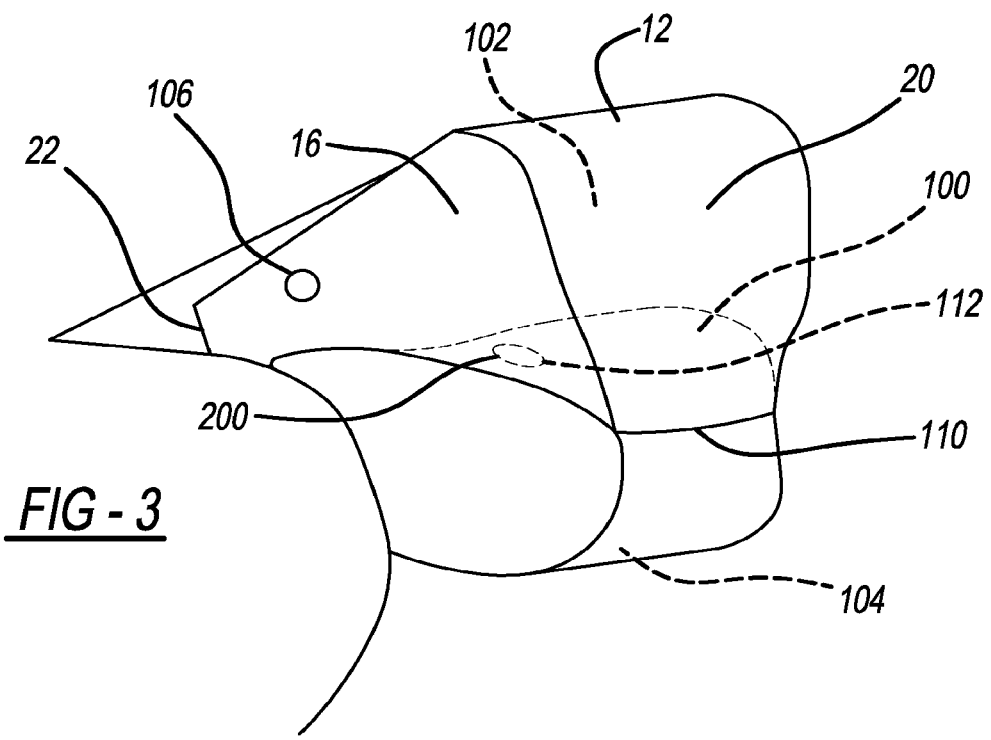
FIG. 3 is a schematic perspective cutaway view of the airbag of FIG. 1, showing elements of the airbag interior.

Like reference numerals refer to like parts throughout the description of several views of the drawings. In addition, while target values are recited for the dimensions of the various features described herein, it is understood that these values may vary slightly due to such factors as manufacturing tolerances, and also that such variations are within the contemplated scope of the embodiments described herein.

Embodiments of the present invention will be described below with reference to the drawings. One of ordinary skill in the art will appreciate the various aspects of airbag design, construction and operation applicable to the embodiments of the present invention described herein. U.S. Pat. Nos. 6,886,857, 7,857,347, 8,128,124, and 8,322,748, for example, describe many such aspects and are incorporated herein by reference in their entirety, but not by way of limitation.

FIGS. 1-4 are views of a passenger-side airbag 10 (in an inflated state) according to an embodiment of the present invention. The airbag embodiment shown in FIGS. 1-4 is formed from three panels which, in combination, define an outer shell of the airbag. Specifically, the airbag is formed of a main panel 12, a right side (when viewing the airbag from a seated position) panel 14, and a left side panel 16 opposite the right side panel 14. Each of the side panels 14, 16 may be generally planar (when separated from the other panels and laid out on a flat surface). The main panel 12 connects the left and right panels and wraps around the airbag 10. As a result, the entirety of the right edge of the main panel 12 is connected along a seam 70 (e.g., by stitching, sewing, or other suitable means) to the right panel 14 and the entirety of the left edge of the main panel 12 is connected along a seam 72 (e.g., by stitching, sewing, or other suitable means) to the left panel 16.

The main panel 12 has both a front, impact side 20 and a rear, inflation side 22. After wrapping around the airbag 10, ends of the main panel 12 are joined at the rear inflation side. In addition, the rear inflation side 22 has slits (not shown) which are sized to receive an inflator (not shown), and may also include holes (not shown) which are sized to receive bolts (or other suitable fasteners) that are configured to secure the airbag 10 to the body of an automobile (or other device). The "front side" of the airbag or of main panel 12 is that portion of the airbag structured and positioned so as to be impacted first by a vehicle occupant when the airbag is activated.

Portions of one or more of panels 12, 14, 16 defining upper chamber 102 may incorporate one or more cushion vents 106 therein to release gas from the upper chamber to the environment in a controlled manner during contact between a passenger and the airbag.

Referring to FIGS. 1-4, a dividing panel or divider 100 is stitched or otherwise suitably attached along a perimeter thereof to interior surfaces of the main, left and right panels. The divider 100 is attached to the panel interior surfaces along a seam 110 so as to form a gas-flow restricting seal between the divider and the panels to which it is attached. In a particular embodiment, the divider 100 is attached to the panel interior surfaces along seam 110 so as to form a gas-tight seal between the divider and the panels to which it is attached. Divider 100 divides the airbag interior into an upper chamber 102 and a lower chamber 104. The divider is also attached to other portions of the airbag (via stitching, tethers, or any other suitable method or methods) so as to provide a desired profile (for example, as shown in the side view of FIG. 1) and a desired location of the divider leading edge, as described herein.

Figure 7:
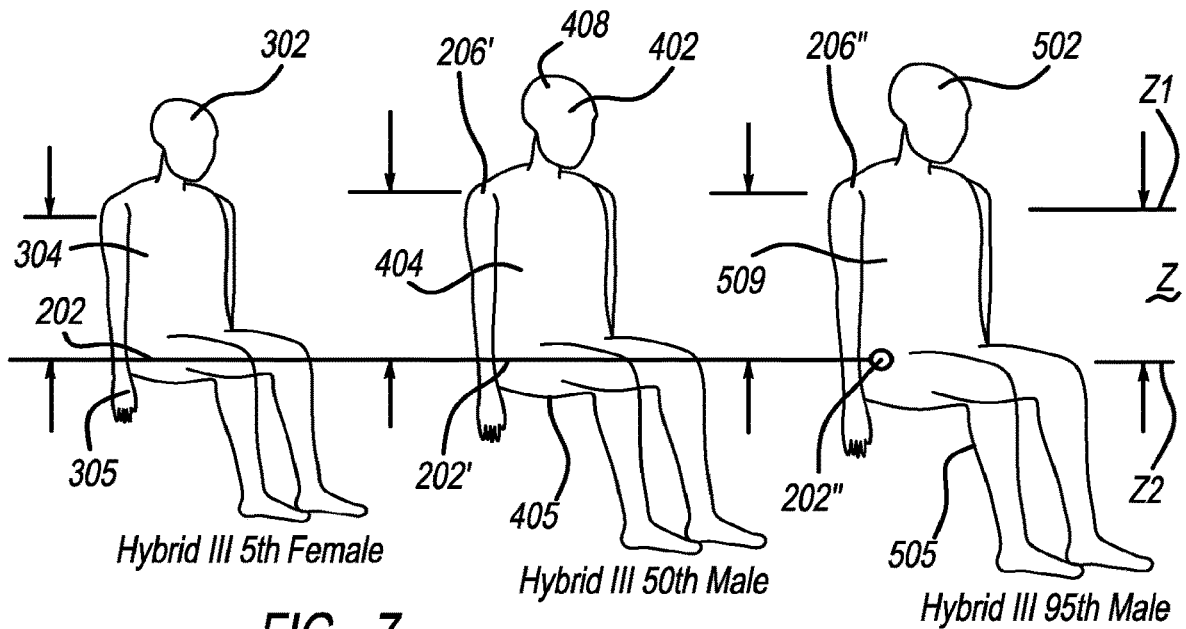
FIG. 7 is a schematic view showing relative proportions of Anthropomorphic Test Devices and relevant parameters used to define the desired positioning of the divider within the airbag, in accordance with embodiments described herein.

In embodiments described herein, the inflated shapes of the airbag 10 and divider 100 and the positions of the intersections between divider 100 and the interior portions of the panels 12, 14, 16 to which the divider is attached are configured so as to ensure that the head and neck regions (collectively designated 302 for a Hybrid III 5th percentile female Anthropomorphic Test Device (ATD) 305, 402 for a Hybrid III 50th percentile male test ATD 405, and 502 for a Hybrid III 95th percentile male test ATD 505, as shown in FIG. 7) of passengers of various sizes impact the bag along the exterior of the upper chamber 102 of the bag (i.e., that the upper chamber 102 absorbs the impact of the head and neck regions of the passenger). The configuration of the divider 100, its positioning within the airbag, and the position of the portion 110a of the seam 110 attaching the divider leading edge 100a to the panel 12 enable the cushion to match the forward movement of the relatively heavier thoracic regions (generally designated 304 in ATD 305, 404 in ATD 405, and 504 in ATD 505) to the forward movement of the relatively smaller and lighter head & neck regions 302, 402, 502. As known in the pertinent art, an anthropomorphic test device or ATD is a human form in shape, mass and mechanical response, equipped with sensors including accelerometers, deflection sensors and other measurement devices, to simulate the performance of the human body. It is used in the assessment of injury potential in crash safety testing.

Referring to FIGS. 1-4, in one example, edge 100a of divider 100 attached to an interior surface of the front side 20 of main panel 12 defines a leading edge of the divider 100. Leading edge 100a is attached to the main panel front side 20 along seam 110 and is configured such that the leading edge 100a and the portion 110a of the seam 110 attaching the leading edge to the front side will reside below the neck and head regions of any passenger contacting the airbag front side (more specifically, within the zone Z shown in FIG. 7 and defined below), when the airbag mounted in the vehicle and is fully inflated. In this configuration of the airbag, the passenger head and neck regions will always contact the airbag along an exterior of the bag upper chamber 102.

In the particular embodiment shown in FIGS. 1-4, divider 100 is attached to the inner surfaces of the airbag panels 12, 14, 16 so as to form a curved surface 100b having a downwardly angling portion 100c terminating in leading edge 100a connected to front side 20. However, the seams connecting the divider 100 to the main and side panels may have any locations and/or configurations necessary to facilitate attachment to the panel 12 at the desired location within zone Z as described herein. For example, FIG. 5 shows the airbag embodiment of FIGS. 1-4 in an inflated state and mounted in a vehicle.

Figure 4:
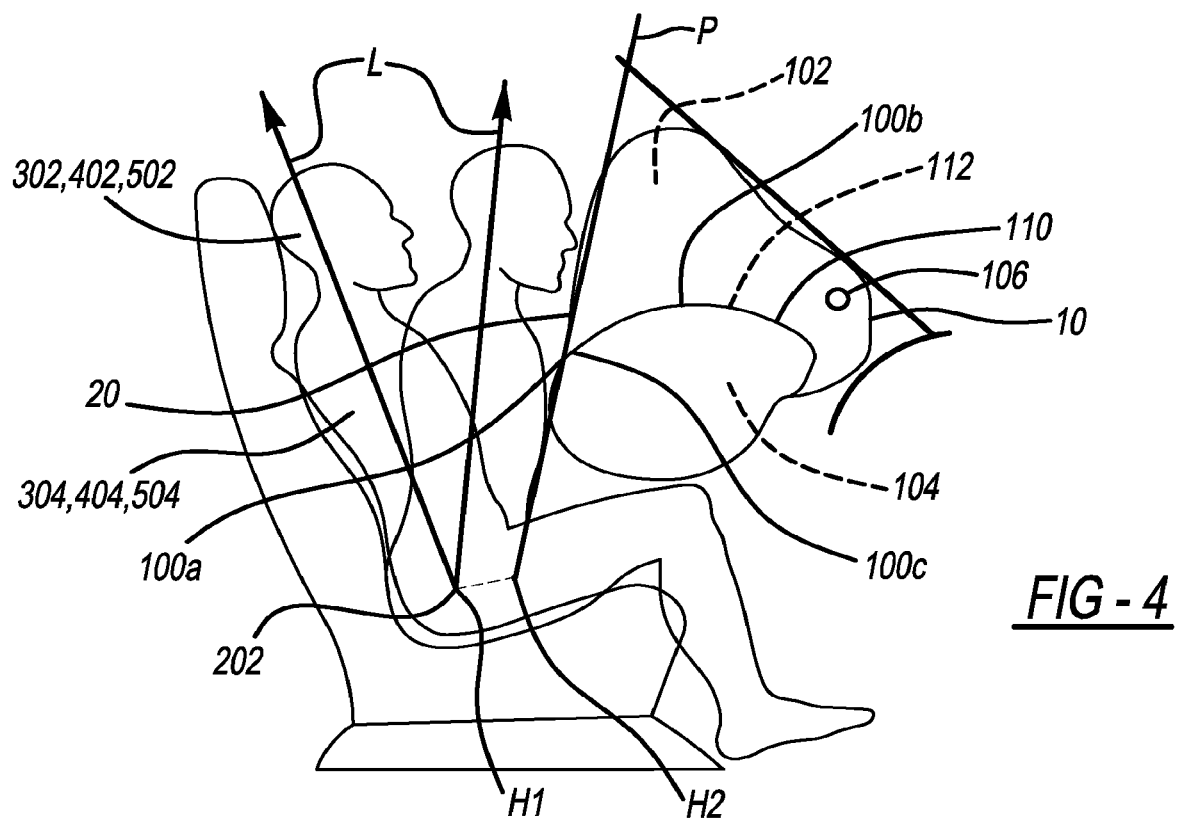
FIG. 4 is a side view of the airbag of FIG. 1 mounted and deployed in a vehicle in front of a seated passenger.
Figure 5:
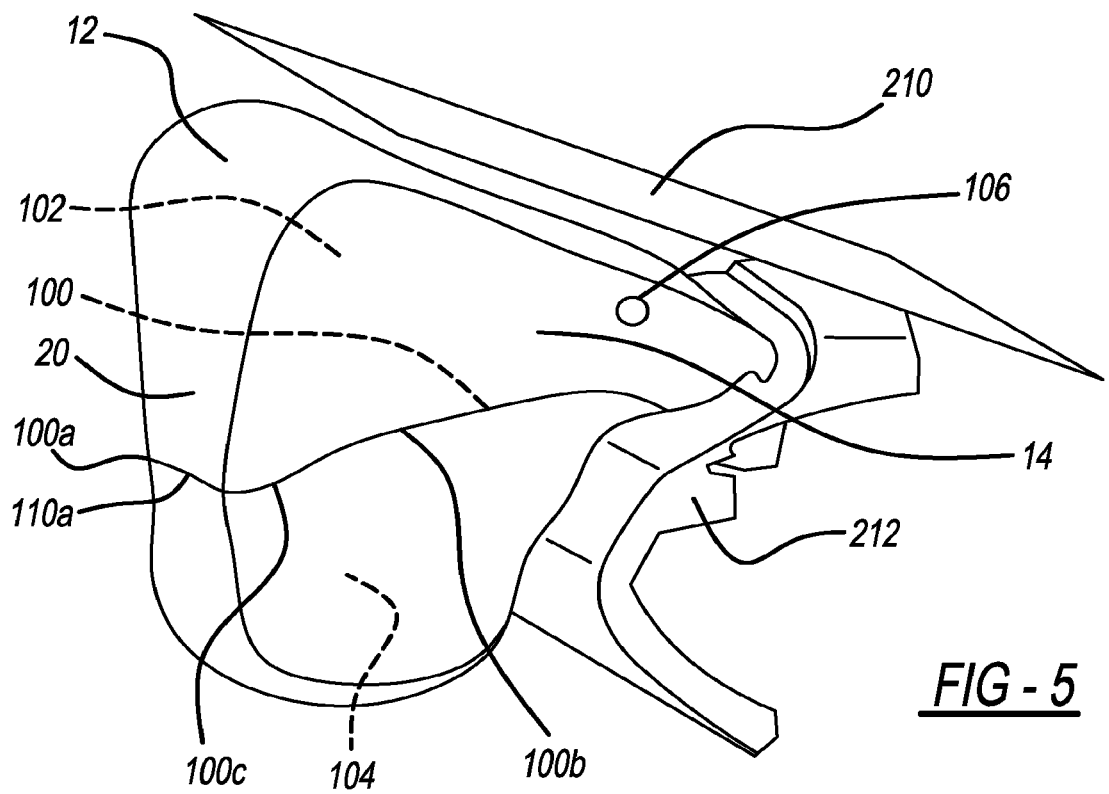
FIG. 5 is a perspective view of the passenger-side airbag of FIGS. 1-4, shown in an inflated state and mounted in a vehicle.

In particular embodiments described herein, the various airbag elements are shaped and connected to each other so that, when fully inflated, the front side 20 of the bag aids in maintaining alignment of the head, neck, and thoracic body regions along a line L as shown in FIG. 4 during early occupant interaction with the airbag, wherein the upper body portion of the occupant pivots forward from the hip pivot axis 202 along line L. As the occupant contacts the bag, it is desirable to maintain the alignment of the head and thorax regions and balance the energy absorption by the bag from the head and the thorax, to minimize motion or rotation of the head about the neck and with respect to the torso. As seen in FIG. 4, the bag is structured such that the portions of the upper and lower chambers of the cushion facing the occupant 20 form an essentially flat plane, indicated by the line P in the drawing. At the early stages of airbag inflation, the occupant seatbelt (not shown) tensions to restrain the occupant's lower thoracic region in the seat. Thus, at this point, the hip pivot axis 202 resides at a first location H1. At a later stage of inflation, as the seatbelt tensioner relaxes, thereby permitting the pivot axis 202 to shift from location H1 to a second location H2, closer to or lying on plane P. Thus, during the later stages of inflation, due to movement of the occupant, the line L approaches or lies along plane P.

Figure 6:
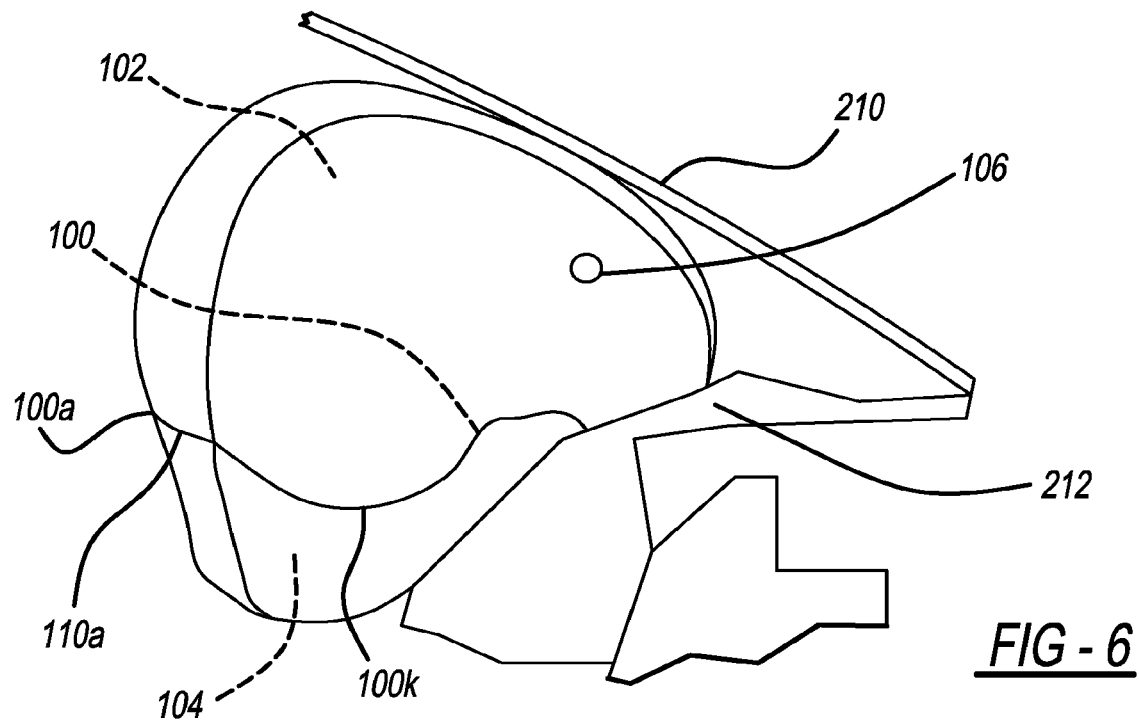
FIG. 6 is a perspective view of an airbag in accordance with another embodiment described herein, shown in an inflated state and mounted in a vehicle.

Referring to FIGS. 6 and 7, in embodiments described herein, the divider leading edge 100a is attached to the main panel along a seam 110 positioned so as to reside within a zone Z defined at a lower end Z2 by the hip pivot axis 202 of a seated Hybrid III 5th female ATD 305, and at an upper end Z1 by the shoulder pivot 206' of a seated Hybrid III 50th Male ATD 405, inclusive. These boundary positions and other characteristics of all the test ATD's described herein are specified in 49 CFR Part 572, which is incorporated herein by reference in its entirety, and which may be found, for example, at http://www.gpo.gov/fdsys/pkg/CFR-2011-title49-vol7/pdf/CFR-2011-title49-vol7-part572.pdf. In a particular embodiment, the hip pivot 202 of the seated Hybrid III 5th female ATD resides at a vertical distance of 3.30 inches above the portion of the seat in contact with the ATD, and the shoulder pivot 206' of the seated Hybrid III 50th male ATD resides at a distance of 17.5 inches above the portion of the seat in contact with the ATD. Thus, in the particular embodiment, the dimension of the zone Z is 14.2 inches.

Figure 8:
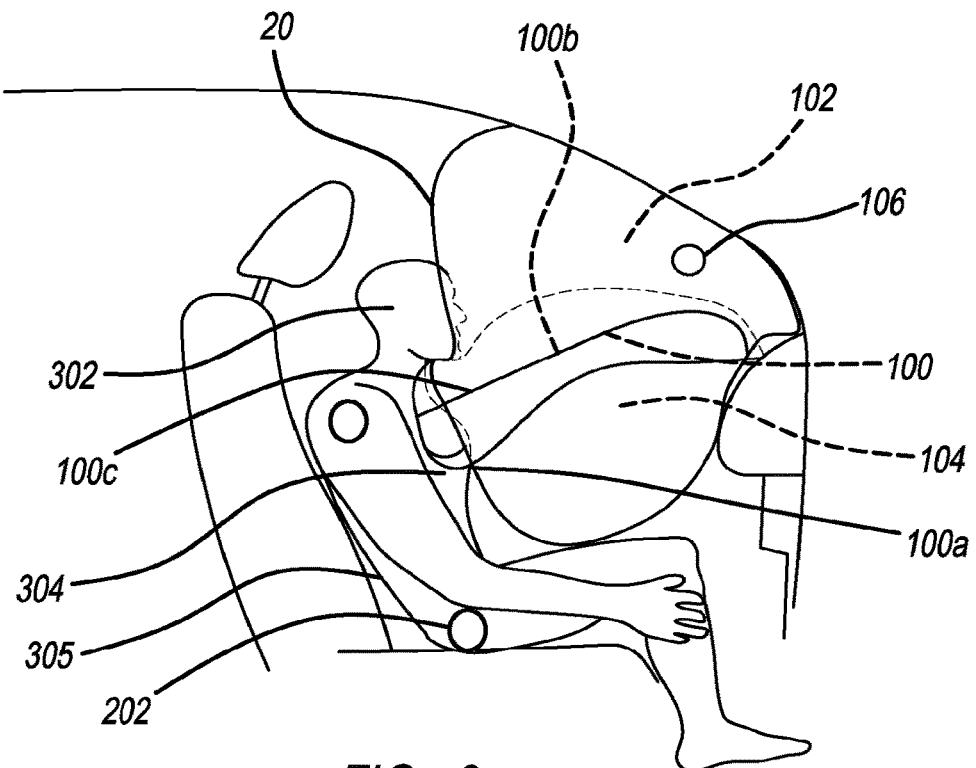
FIG. 8 is a side view of a Hybrid III 5th percentile female test Anthropomorphic Test Device contacting a deployed airbag having a divider positioned within the airbag in accordance with an embodiment described herein.
Figure 9:
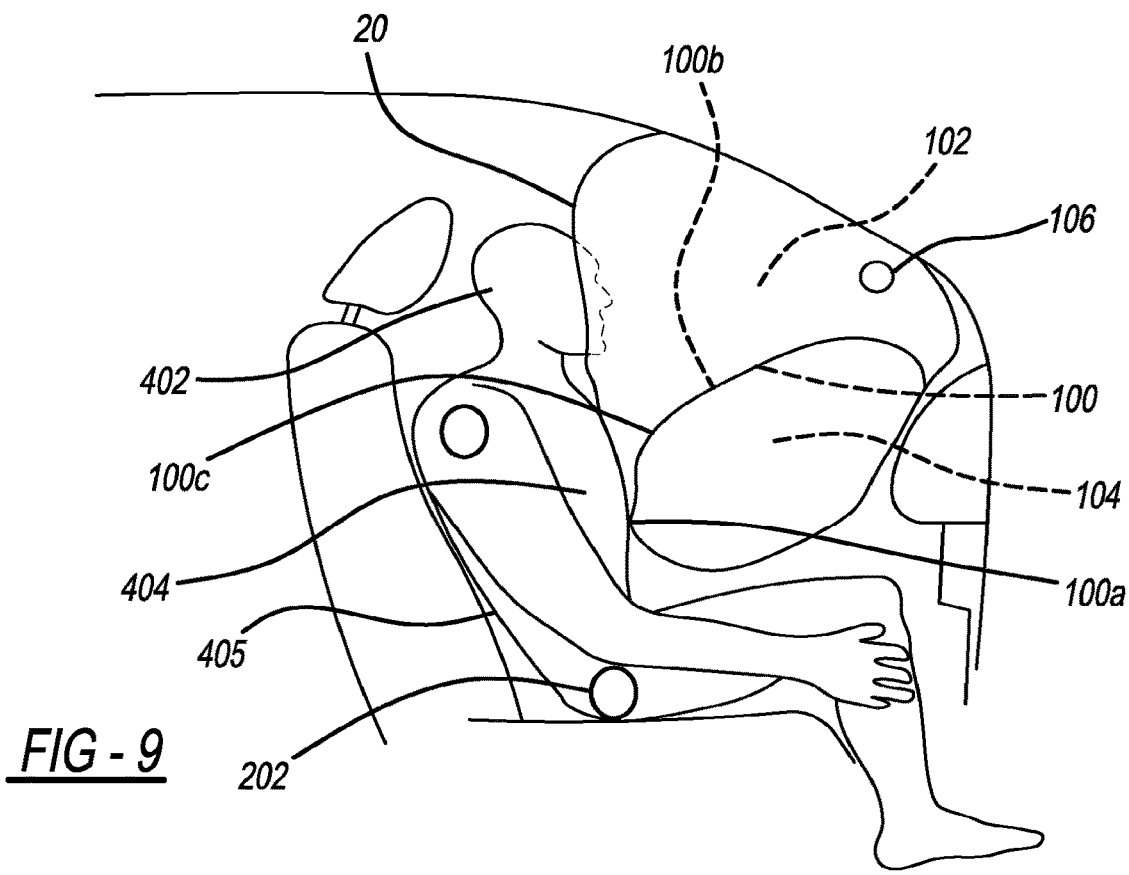
FIG. 9 is a side view of a Hybrid III 50th percentile male Anthropomorphic Test Device contacting a deployed airbag having a divider positioned within the airbag in accordance with an embodiment described herein.

It is noted that the hip pivot axes of the seated ATD's 305, 405, and 505 are collinear or at the same level, so that the hip pivot of the seated Hybrid III 50th male ATD 405 may be referred to as 202' and the hip pivot of the seated Hybrid III 95th male ATD 505 may be referred to as 202". In addition, the shoulder pivot of the seated Hybrid III 5th female ATD 305 is referred to as 206, the shoulder pivot of the seated Hybrid III 50th male ATD 405 is referred to as 206', and the shoulder pivot of the seated Hybrid III 95th male ATD 505 is referred to as 206". This common boundary of the zone Z may also serve as a reference axis. Also, in this embodiment, the portions of the body located above the respective shoulder pivots on ATD's 305, 405 and 505 are considered to define the respective head and neck regions of the ATD's. FIG. 8 shows contact between the front or contact face of a deployed airbag 10 and the divider leading edge seam 110a positioned as just described, and a Hybrid III 5th female ATD 305. FIG. 9 shows contact between a deployed airbag 10 of the same design shown in FIG. 8, and a Hybrid III 50th male ATD 405. It is seen that both of ATD's 305 and 405 contact the seam 110a connecting the divider leading edge 100a to the airbag main panel 12 within the zone Z previously described.

It has been found that connecting the divider leading edge 110 to the main panel 12 along a seam 110a located at or below and proximate the upper limit of zone Z (i.e., the horizontal axis defined by the shoulder pivot 206' of a seated Hybrid III 50th Male ATD 405) greatly reduces the neck extension moment (i.e., the tendency of the head and neck to rotate with respect to the torso, about the neck-torso junction).

For example, for a seated Hybrid III 5th female ATD, it has been found during collision testing that, in an airbag embodiment in which at least a portion of the divider leading edge is detached from the occupant contact side of the airbag so as to form a gas flow passage along the occupant contact side, the upper portion of the head of the ATD will contact the relatively softer or more "deflatable" upper chamber 102, the portion of the ATD located below the chin contacts the relatively higher pressure lower chamber (after the pressure therein has been raised by contact with the occupant and backflow into the upper chamber restricted by the flow restriction valve), and the chin of the ATD contacts a zone located in the upper chamber proximate the occupant contact side gas flow passage and having an intermediate pressure somewhere between the higher lower chamber pressure and the relatively lower upper chamber pressure.

Also, as the position of the divider connection seam 110a along the occupant contact face of the airbag is lowered, the head region of the ATD is positioned relatively farther from the divider and deeper into the relatively softer upper chamber. Thus, in this case, the head and neck regions are able to rotate to a relatively greater extent responsive to the neck extension moment.

It has also been found desirable to, in conjunction with adjusting the position of the leading edge seam 110a, control the rate of gas backflow from the lower chamber 104 into the upper chamber 102 responsive to pressure resulting from occupant contact with the airbag exterior of the lower chamber. For example, in cases where the leading edge seam 110a is attached to the airbag at a relatively higher location, it may be desirable to structure the flow restriction valve to permit a relatively lower backflow gas rate. This permits a relatively less rapid "deflation" of the lower chamber due to backflow, which promotes a more uniform deflation of the cushion and helps maintain a proportional support of the entire occupant along the airbag occupant contact face. This aids in maintaining the body alignment along the plane P in the face of the relatively greater stiffness or level of support for the head and neck region provided by the higher location of the seam 110a.

Alternatively, in cases where the leading edge seam 110a is attached to the airbag at a relatively lower location, it may be desirable to structure the flow restriction valve to permit a relatively greater backflow gas rate. This permits a relatively more rapid "deflation" of the lower chamber, which promotes a more uniform deflation of the cushion and helps maintain a proportional support of the entire occupant along the airbag occupant contact face. This aids in maintaining the body alignment along the plane P in the face of the relatively larger proportion of the body impacting the airbag along the exterior of the relatively softer upper chamber.

Thus, it has been found that by controlling the position of the leading edge connection seam 110a and the flow restriction valve structure as described above, a controlled deceleration of the torso, neck and head regions of the occupant can be effected, and the effects of the neck moment can be minimized or even eliminated for a given passenger size, vehicle configuration, and other application parameters, using known analytical methods and/or through iterative testing.

Figure 26A:
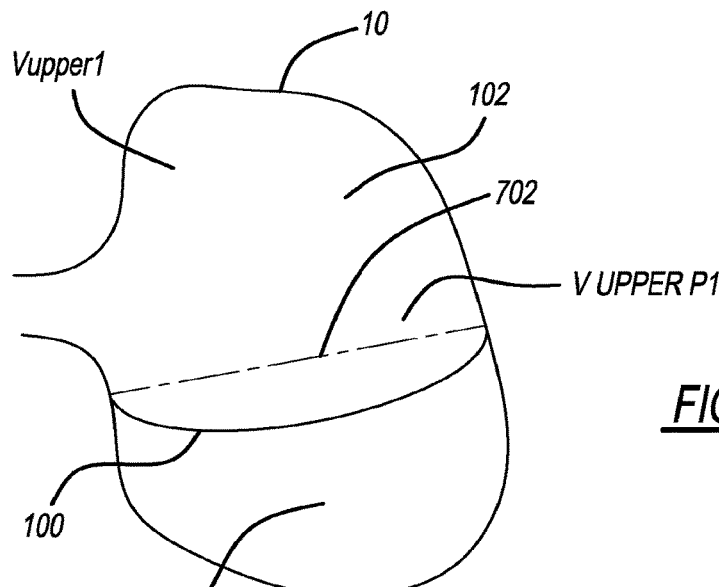
FIGS. 26A and 26B are schematic cross-sectional side views of an airbag in accordance with an embodiment described herein, showing a portion of the airbag interior volume shared by the upper and lower chambers when the bag is inflated.
Figure 26B:
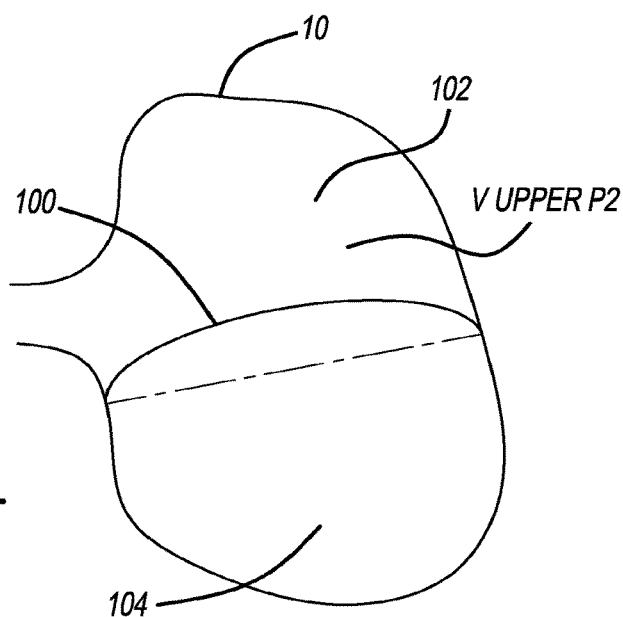

Referring now to FIGS. 26A and 26B, in accordance with certain embodiments described herein, it is possible to integrate a "shared volume" depending on the valve mechanism and dynamic configuration of the divider panel in the airbag. That is, the divider may be configured and attached to the outer airbag panels so as to provide a degree of slack in the portions of the divider not attached to the outer panels. This slack enables the unattached portion of the divider to move in the direction of the lower chamber during initial filling of the airbag or when the upper chamber pressure otherwise exceeds the lower chamber pressure, and to move toward the upper chamber during loading of the lower portion of the airbag (or when the lower chamber pressure otherwise exceeds the upper chamber pressure). The shared volume may be defined by the relationship:

$$V_{shared} = V_{upper\ P1} - V_{upper\ P2}$$

where $V_{upper\ P1}$=the volume of the upper chamber when the chamber is fully inflated and the divider is fully distended toward the lower chamber, and $V_{upper\ P2}$=the volume of the upper chamber when the lower chamber is fully inflated and the divider is fully distended toward the upper chamber.

When the cushion is deployed, the relative volumes of the chambers and the pressures in the chambers will vary during cushion inflation. Initially, the upper chamber will fill as the cushion extends from its stowed position to a deployed position. This is necessary to provide early support for the head, as the thoracic region is initially restrained by the seat belt. Filling and pressurization of the upper chamber causes the unattached central portions of the divider to deflect toward lower chamber 104. As the upper chamber comes into position, gas flow to the lower chamber is increased from the upper chamber through the divider flow restriction valve(s) (as described herein). This gas flow causes the lower chamber to begin to fill. As the lower chamber fills, its pressure and volume also increase. At the same time, the pressure in the upper chamber is maintained by continued gas flow from the inflator. Flow into the lower chamber continues until the cushion reaches a state where the upper and lower chambers are in substantial pressure equilibrium.

Upon initial contact between the passenger's thorax and the portion of the airbag exterior of the lower chamber, the lower chamber pressure increases due to pressure from the thoracic loading, forcing the unattached central portion of the divider to distend toward the upper chamber. If there is a relatively greater amount of slack in the divider, the amount of time elapsed between passenger contact with the lower chamber and full pressurization of the lower chamber (which provides firm support for the passenger thorax) is also relatively greater, as the unattached portion of the divider moves from a lower location in the airbag toward the upper chamber. Conversely, if there is a relatively lesser amount of slack in the divider, the amount of time elapsed between passenger contact with the lower chamber and full pressurization of the lower chamber (which provides firm support for the passenger thorax) is also relatively lower, as the unattached portion of the divider moves from the lower location in the airbag toward the upper chamber. Thus, as the value of $V_{shared}$ increases, the general effect is to soften the initial contact between the passenger thorax and the portion of the airbag exterior of the lower chamber 104.

The ability to vent gas through the upper chamber vents 106 allows an initially softer response to contact by the occupant's head, while the divider flow restriction valve(s) 112 permit a backflow of gas into the upper chamber from the lower chamber, thereby helping to maintain the upper chamber gas pressure needed to support the head.

In addition, for a given application and during fabrication of the airbag, the flow characteristics of the upper chamber vents 106 and the divider flow restriction valve mechanism(s) 112 are adjusted with respect to each other such that alignment of the occupant's body with the plane P (FIG. 4) is maintained during contact with the airbag.

Gas migrates from upper chamber to lower chamber during initial filling through a flow restriction valve as described herein. Later, gas will move back through the valve from the lower chamber to the upper chamber after the lower chamber is filled and/or at the onset of loading by the occupant. Depending on the state of filling of the chambers at a given time in the event, the unattached portions of the divider panel will move within the cushion (either in a direction toward the upper or toward the lower chamber) providing the tunable variable volume previously described. This provides a proportional restraint for both the relatively lighter head and the relatively heavier thorax which helps to minimize the differential movement between the head and the thorax which would result in undesirable forces at the neck. As the occupant loading continues and the gas from both chambers is expelled into the vehicle interior through the upper chamber main vent, this balance between head and thorax restraint is maintained, resulting in low differential movement between the head and thorax and more favorable occupant neck performance.

Stated another way, the flow control characteristics of the divider valve(s) 112 and main vent(s) 106, and the divider configuration and attachment of the divider to airbag exterior panels 12, 14 and 16 are specified so as to regulate gas flow through the valve(s) 112 and vent(s) 106 during the various stages of occupant contact with the cushion, so that the portions of the upper and lower chambers of the cushion facing the occupant 20 form and maintain an essentially flat plane, indicated by the line P in FIG. 4, during contact with the occupant. The upper and lower chamber pressures are regulated by the valve and vent flow characteristics so that the cushion supports the occupant in a manner required to maintain the head-thorax alignment shown in FIG. 4 during occupant contact with the cushion. This provides the desired low differential movement between the head and thorax. The valve and vent design parameters required to provide the desired response to cushion loading for a given requirement may be determined analytically and/or iteratively through experimentation.

The ability to control the geometries or shapes of the upper and lower chambers as defined by the outer panel and divider panel configurations and the divider panel attachment, and the ability to control the flow characteristics of the valves 112 and vents 106 are important in achieving the desired optimum cushion performance, because appropriate selection of these parameters enables the desired adjustment of pressures and pressure distributions within the airbag responsive to loading by contact with the vehicle occupant head and thorax regions.

A desired relationship between upper and lower chamber volumes and valve and vent flow characteristics for a particular application is affected by the vehicle interior general arrangement, including the windshield angle, the profile of the instrument panel, and other interior features, and also by the position and size of the occupant (as determined by testing with ATD's per the applicable standards) and the projected movement of the occupant after a collision, (which is, in turn is affected by such factors as the crash pulse and the energy management performance of the seatbelt, for example). These factors are all considered in developing the specific upper and lower chamber volumes and valve and vent flow characteristics for a given application.

In certain embodiments described herein, an inter-chamber venting system is provided to permit gas to flow from the upper chamber into the lower chamber, and also for controlling or restricting backflow from the lower chamber 104 into the upper chamber 102. In one embodiment, a flow restriction valve 112 (shown schematically in the drawings) is incorporated into or otherwise operatively coupled to divider 100 for controlling flow between the upper and lower chambers. The valve is structured such that an actuation response time of the valve in attenuating or impeding gas flow from lower chamber 104 into upper chamber 102 is proportional to the pressure differential between the upper and lower chambers. The valve is also structured such that a backflow rate of gases through the valve and into the upper chamber is proportional to the pressure differential between the upper and lower chambers.

In operation, as the vehicle occupant begins to load the lower chamber 104 of the cushion, the pressure within the lower chamber increases, causing the operating member of the valve mechanism 112 to close, thereby restricting the backflow of gas from the lower chamber to the upper chamber. This restricted flow now is effectively absorbing energy from the occupant interaction with the bag. The flow restriction can also be adjusted or tuned in order to absorb the occupant energy as required in a particular application. The directional or flow restriction valve mechanism 112 controlling flow between the upper and lower chambers can have a single operating member which permits both a desired inflow (to the lower chamber) and which is operable to restrict backflow through the opening 200 and into the upper chamber in a desired manner, responsive to a pressure differential wherein the lower chamber pressure exceeds the upper chamber pressure. Alternatively, as seen in the valve embodiment shown in FIGS. 19-22B (described in greater detail below), the valve mechanism can have one operating member for controlling flow into the lower chamber 104 and another operating member to restrict backflow from the lower chamber into the upper chamber. In the later phases of the occupant loading of the cushion, backflow from the lower chamber goes into the upper chamber and then the gas is discharged from the upper chamber into the environment through the main vents (not shown) located in the wall of the upper chamber.

In particular embodiments, it may be desirable to more tightly and flexibly control the gas flow from the upper chamber to the lower chamber, and then, from the lower chamber to the upper chamber. Accordingly, FIGS. 19-22B illustrate a divider and a particular flow restriction valve embodiment that facilitates the flow of gas from the upper chamber to the lower chamber, and then, from the lower chamber back to the upper chamber. Accordingly, an object of the embodiment of FIGS. 19-22B, but not by way of limitation, is to provide a predetermined equilibrium between the pressures in the upper and lower chambers. A detailed description of this valve embodiment is provided in pending U.S. application Ser. No. 14/249,930, the disclosure of which is incorporated by reference herein in its entirety.

In the embodiment shown in FIGS. 19-22B, a directional fabric two-way valve 312 is sewn or otherwise attached to a divider panel 300 (constructed as described above) and connects the upper and lower chambers to facilitate fluid communication between the upper chamber 302 and the lower chamber 304. A main orifice 306 is formed within the dividing panel 300 and facilitates the initial flow of inflator gas from the upper chamber 302 to the lower chamber 304. A first valve cover 308 is preferably formed from the same fabric as the divider 300, whereby the first valve cover 308 is attached to the underside of divider panel 300 along first divider attachment regions 310, to at least partially cover the main orifice 306. First gas pathways 315 are defined by the resultant interface defined between the first valve cover 308 and the divider panel 300, whereby initial gas flow from the upper chamber 302 is diverted or channeled through the first gas pathways 315 about the first valve cover 308 and into the lower chamber 304.

A second orifice 314 is formed in the first valve cover 308 thereby providing fluid communication from the lower chamber 304 back into the upper chamber 302 subsequent to the initial transfer of gas from the upper chamber to the lower chamber. A second valve cover 316 is sewn or otherwise attached to the first valve cover 308 along second attachment regions 316a, to at least partially cover the second orifice 314. Second gas pathways 320 are defined by the resultant interface defined between the second valve cover 316 and the first valve cover 308, whereby secondary gas flow from the lower chamber 304 is channeled through the second gas pathways 320 through the main orifice 306 and back into upper chamber 302.

Figure 22A:
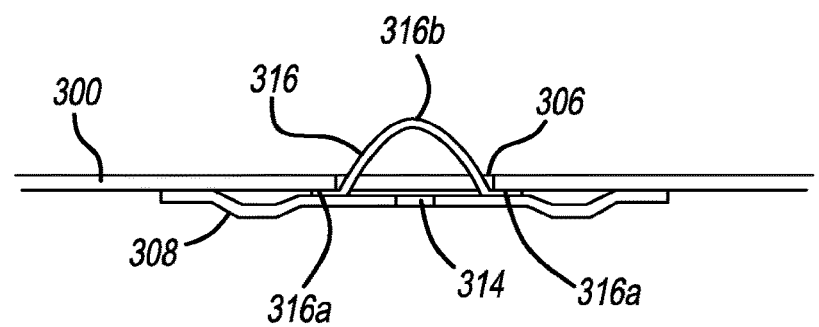
FIG. 22A is a cross-sectional side view of the portion of the airbag shown in FIG. 21A during flow of gases from the lower chamber of the airbag to the upper chamber of the airbag.
Figure 22B:
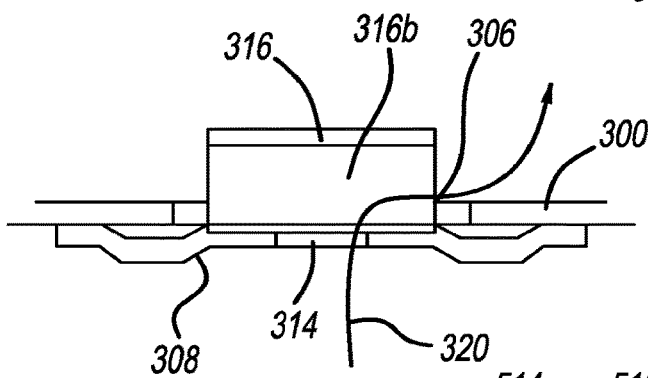
FIG. 22B is a cross-sectional front view of the portion of the airbag shown in FIG. 22A.

In operation, an associated inflator (not shown in FIGS. 19-22B, but exemplified in the other embodiments and in the prior art) is actuated upon a crash or collision event. Inflation gas initially fills the upper chamber 302 and then flows through the main orifice 306 and through first gas pathways 315, and then into lower chamber 304. As pressure increases within the lower chamber 304, the first valve cover 308 is responsively designed to cover the main orifice 306 thereby attenuating the backflow from the lower chamber 304 back into the upper chamber 302, and simultaneously and substantially restricting the gas flow through first gas pathways 315. However, once the occupant (not shown) makes physical contact with the airbag, the outer pressure from the occupant increases the gas pressure within the lower chamber 304. The increased pressure within lower chamber 304 exerts a force on the second valve cover 316 through opening 314 that "lifts" the second valve cover 316 from the normally closed and flush position over the second orifice 314. As the second valve cover 316 is "lifted" as shown in FIG. 22, a secondary gas flow is facilitated through second gas pathways 320 and then upward and into first chamber 302.

In sum, the embodiment of FIGS. 19-22B provides an alternate inflation profile of the airbag 30 as compared to the other embodiments shown herein, whereby the inflation pressure may be softened over time thereby affecting a softer deployment if desired.

In addition, as the cross-sectional areas of first gas flow pathways 315 are greater than the cross-sectional area of return or backflow pathway 320, and because the cross-sectional area of opening 314 and/or the cross-sectional areas of first gas flow pathways 315 may be varied in accordance with the requirements of a particular application, the volumetric gas flow rates along each pathway may be controlled as desired to facilitate desired airbag deployment and response profiles.

In the case of an Out of Position child in accordance with the NHTSA Position-2 testing standard, the initial stages of the cushion deployment development remains the same as described above. However, the gas flow between the upper and lower chambers as regulated by the divider valve mechanism is different when a child interacts with the cushion. In the case of the Out of Position-2 child, the volume of the lower chamber is decreased due to the space occupied by the Out of Position Child. The divider valve mechanism continues to permit the flow of gases from the upper chamber into the lower chamber. However, the valve mechanism also allows the gas to continue to flow into the lower chamber until the cushion's lower chamber and upper chamber internal pressures are in equilibrium, thereby stabilizing the interaction between the cushion and the out of position child. The divider valve mechanism 112 and cushion main vent designs are structured to facilitate rapid transition of this state of equilibrium into an adaptive state, wherein the cushion changes from a state of gas flow into the lower chamber to a state where the gas flow is increased out of the main vents (located in wall(s) of the upper chamber) into the environment. This increased flow out of the cushion allows for decreased pressure within the upper chamber and then allows for the backflow of gases from the lower chamber back into the upper chamber and out of the main vents into the environment. This adaptability of the valve mechanism 112 to regulate the flow communication between the two chambers is important for the protection of adult and child occupants.

In sum, the particular valve embodiment described above may be characterized as:

an airbag comprising a first chamber and a second chamber;

a perforated dividing panel attached to an inner wall of the airbag thereby providing said first chamber and said second chamber, said perforated dividing panel containing at least one main orifice;

a valve for one-way or two-way fluid communication between said first chamber and said second chamber, the valve providing fluid communication through said at least one main orifice;

a first valve cover attached to said dividing panel for covering said at least one main orifice, said first valve cover facilitating fluid flow from said upper chamber to said lower chamber and attenuating fluid flow from said lower chamber into said upper chamber;

at least one optional second orifice formed in said first valve cover, said second orifice selectively sealed during actuation of said airbag; and an optional second valve cover attached to said first valve cover for covering said at least one optional second orifice, said optional second valve cover facilitating fluid flow from said lower chamber into said upper chamber.

Valve 112 may have any of a number of alternative structures suitable for controlling gas flow in the airbag interior, in the manner described herein. In one embodiment, the valve has the structure shown in U.S. Pat. No. 5,246,250, the disclosure of which is incorporated herein by reference in its entirety. In another embodiment, the valve has the structure shown in U.S. patent application Ser. No. 14/452,016, the disclosure of which is incorporated herein by reference in its entirety. In another embodiment, the valve has the structure shown in U.S. Patent Application Ser. No. 61/865,095, the disclosure of which is also incorporated herein by reference in its entirety. Other suitable valve structures are also contemplated. The gas flow rate from the upper chamber 102 into the lower chamber 104 may be controlled in a known manner by controlling the valve structure and dimensions.

In additional embodiments of the airbag, a valve 112 suitable for controlling gas flow in the airbag interior may have one of the structures shown in U.S. patent application Ser. No. 14/458,153, the disclosure of which is incorporated herein by reference in its entirety.

Figure 28:
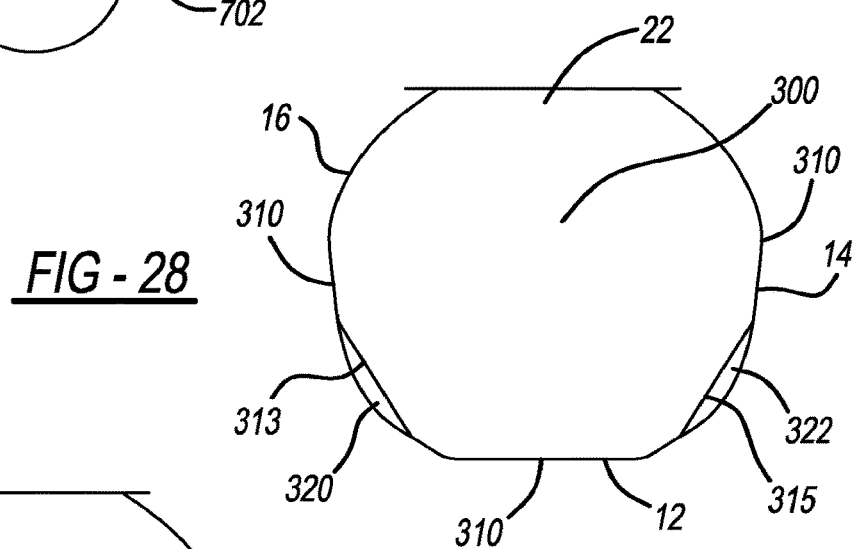
FIG. 28 is a schematic cross-sectional plan view of a portion of an airbag incorporating a divider with alternative valve locations, in accordance with another embodiment described herein.
Figure 29:
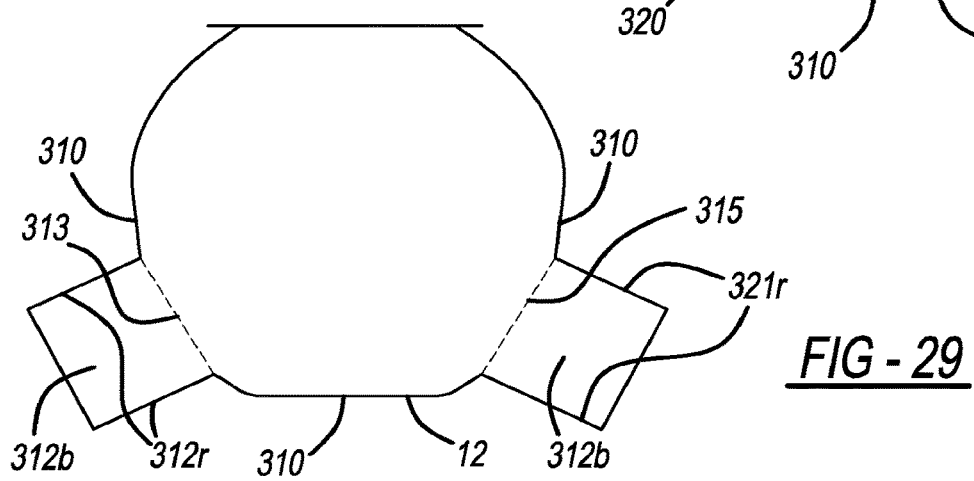
FIG. 29 is a plan view of the divider shown in FIG. 28.

Referring now to FIGS. 28 and 29, in another particular embodiment of the airbag, a divider 300 has attachment portions 310 and non-attachment portions 313 and 315. Attachment portions 310 are attached to the panels 12, 14 and 16 forming an exterior of the airbag so as to form gas tight seals between the divider and the panels, as previously described. Non-attachment portions 313 and 315 are unattached to any of panels 12, 14 and 16, so that openings or slits 320 and 322 are formed between the non-attachment portions 313 and 315 and the portions of the panels 12, 14 and 16 opposite the non-attachment portions 313 and 315. Slits 320 and 322 enable fluid communication between the upper and lower chambers 102 and 104.

Referring to FIGS. 28 and 29, in a particular embodiment, flaps 312b and 321b are formed integrally with (or otherwise attached to) divider 300 by cutting a piece of material forming the divider to a desired shape (for example, the shape shown in FIG. 29 or a similar shape). This permits the attachment portions 310 formed on either side of each of flaps 312b and 321b to be attached to one or more of the outer airbag panels, while the non-attachment portions 313 and 315 reside spaced apart from or opposite respective ones of the outer airbag panels. At the same time, flaps 312b and 321b hang from the divider 300 and extend into lower chamber 104. Flaps 312b and 321b are also dimensioned and otherwise structured so that they are forced in a direction toward slits 320 and 322 and/or toward and into contact with the respective airbag exterior panels opposite which they reside, responsive to an airbag pressure differential which tends to force a backflow of gases from lower chamber 104 toward upper chamber 102. In this manner, flaps 312b and 321b at least partially occlude or block the slits 320 and 322, thereby restricting backflow through the slits in the manner described in U.S. patent application Ser. No. 14/458,153, which is incorporated herein by reference.

In the particular embodiment shown in FIGS. 28 and 29, the divider 300 is structured and attached to the airbag exterior panels 12, 14 and/or 16 so that each of non-attachment portions 313 and 315 forms a straight line extending between adjacent portions of the divider attached to the exterior panels when the airbag is inflated. In this embodiment, flaps 312b and 321b extend from the non-attachment portions 313 and 315 into the lower chamber 104.

In particular embodiments, portions of the flaps 312b and 321b are stitched or otherwise suitably attached to one or more of airbag exterior panels 12, 14 and 16, to aid in preventing the flaps from being forced through openings 320 and 322 and into upper chamber 102 responsive to a pressure surge in lower chamber 104.

In one particular embodiment, at least portions of side edges 312r and 321r of the flaps are attached to associated ones of airbag panels 12, 14 and 16. The attachment may be along the entire lengths of the side edges, so as to form gas tight seals between the exterior panels 12, 14, 16 and the flap side edges attached thereto. The locations and structures of the side edges attachments are configured to enable at least portions of the associated flaps to contact the airbag outer panels 12, 14, 16 so as to form the desired seals to restrict backflow, as previously described. The flaps may be attached to any of the airbag panels 12, 14 and/or 16 in any desired manner and at any desired location(s) along the flaps. In one embodiment, the lengths of flaps 312b and 321b from the divider 300 to the ends of the flaps is at least 4 inches.

Referring now to FIGS. 27 and 43-47A, in particular embodiments, at least a portion of the divider leading edge is unattached or spaced apart from the occupant contact side of the main panel. This provides a gas flow opening opening between the divider leading edge and the occupant contact side of the main panel which enables fluid communication between the upper and lower chambers when during airbag inflation and prior to contact with the occupant. The remaining edges of the divider 800 are attached to one or more of panels 12, 14 and 16 so as to form substantially gas tight seals between these attached edges and the associated panels, as previously described. The unattached divider edge(s) may extend from a main portion of the divider to form associated flap(s) positioned opposite the occupant contact side and extending into the airbag lower chamber, similar to the flaps shown in FIGS. 28 and 29. These structures thus form flow restriction valve mechanisms similar to that shown in FIGS. 28 ands 29, with an opening enabling fluid communication between the upper and lower chambers. Alternatively, one or more portions of the divider leading edge may be unattached and (optionally) spaced apart from the occupant contact side without incorporating a flap therein. In these embodiments, the area of the flow passage between the divider leading edge and the occupant contact side is controlled after airbag deployment by direct occupant contact with the occupant contact side, which closes the gas flow opening to a degree dependent on the contact force exerted by the occupant.

A feature provided by divider-edge gas flow passages formed by leaving at least a portion of the divider unattached to another airbag panel (and, in particular, by a leading edge gas flow passage formed by leaving at least a portion of the leading edge unattached to the occupant contact side) is a continuous gas flow channel extending along the inner surface of the main panel through both the upper and lower chambers.

In addition, the opening and valve mechanism (if any) controlling flow between the upper and lower chambers is at least partially defined by the occupant contact surface, enabling the valve mechanism to actuated and/or the gas flow opening to be restricted or closed by direct contact of the occupant with the occupant contact surface.

In addition, the speed with which, and amount by which, the gas flow opening is restricted or closed by direct occupant contact is affected by the contact force between the occupant and the contact side, which directly affects the speed and degree of deflection of the contact side.

Figure 27:
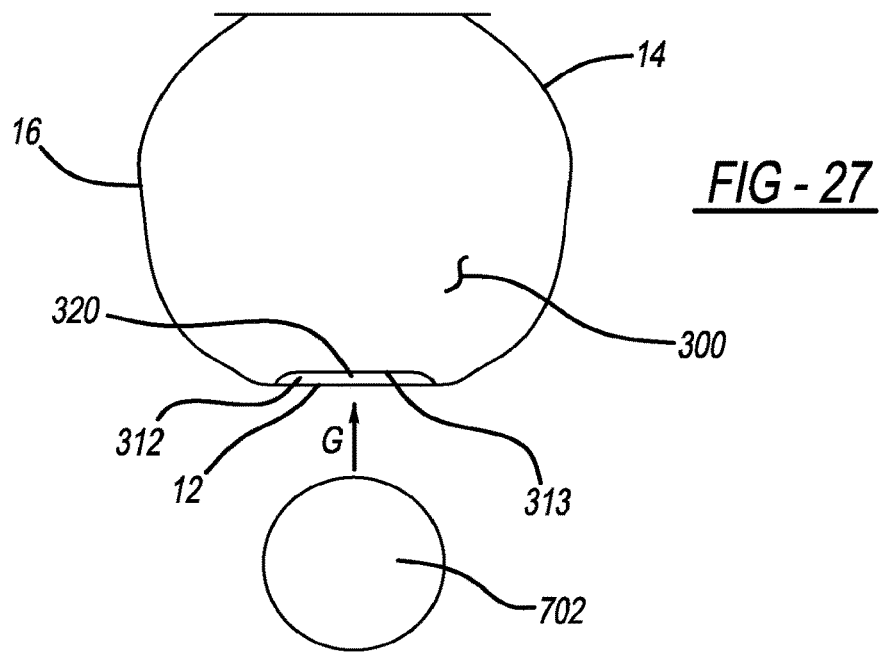
FIG. 27 is a plan cross-sectional view of an airbag incorporating a divider in accordance with an embodiment described herein with alternative valve location along a leading edge of the divider panel.

In another particular flow restriction valve embodiment shown in FIG. 27, one or more valves 312 structured as shown in FIGS. 28 and 29 are formed at the seam(s) between the divider 300 and the main airbag panel, in a frontal region of the bag first contacted by a passenger 702 during or after bag inflation.

In this embodiment, the divider 300 has at least one non-attachment portion 313 structured to form an associated at least one slit 320 between the non-attachment portion 313 and the portions of the main panel 12 residing opposite the at least one non-attachment portion 313. Slit 320 enables fluid communication between the upper and lower chambers 102 and 104.

In addition, a flap (not shown) as previously described with regard to FIGS. 28 and 29—may be formed integrally with (or otherwise attached to) divider 300 by cutting a piece of material forming the divider to a desired shape in which the flap extends from the associated at least one non-attachment portion 313, as described previously with regard to FIGS. 28 and 29.

In this embodiment, the valve structure can be tuned or tailored so that the effectiveness of the seal formed between the flap and the bag outer panel opposite the flap is related to the mass of a passenger 702 impacting the airbag on the occupant contact side. When the passenger impacts the airbag, there is a pressure surge in lower chamber 104 tending to force gases from the lower chamber back through the valve 312 and into the upper chamber. This pressure tends to force the valve flap into contact with the opposing exterior airbag panel, as previously described. In addition, the contact of the passenger with the exterior airbag panel 12 tends to push the contacted portion of the panel in the direction of arrow "G", toward and into the outwardly-moving valve flap. The greater the mass of the passenger, the greater the inward force exerted on the bag panel 12 and the greater the pressure surge in the lower portion of the bag. As the magnitudes of the opposing forces acting on the valve flap increase, the flap is forced more tightly against the airbag panel, thereby increasing the effectiveness of the seal formed therebetween. In addition, the size and/or shape of the opening 320 may be tailored to control such factors as the backflow rate of gases therethrough, the amount by which the opening 320 is blocked, the amount of deflection of the occupant contact face required to close the opening a given amount, and other pertinent factors.

Also, in embodiments incorporating a gas flow passage between the divider leading edge and the occupant contact side of the airbag as just described, while gas flows freely from the upper chamber prior to contact between the passenger and the airbag and is restricted after passenger contact as described herein, gas backflow from the lower chamber into the upper chamber may increase later in the loading sequence, due to a reduction in loading energy by the passenger as this energy is absorbed and dissipated by the airbag.

Also, in embodiments incorporating one or more gas flow passages between the divider leading edge and the occupant contact side of the airbag as just described, the flaps may be omitted from the gas flow opening depending on the requirements of a particular application, if sufficient closure of the gas flow passage can be obtained as a result of pressure exerted by the occupant when contacting the occupant contact side of the airbag and pressing this side inwardly, as described herein.

Figure 43:
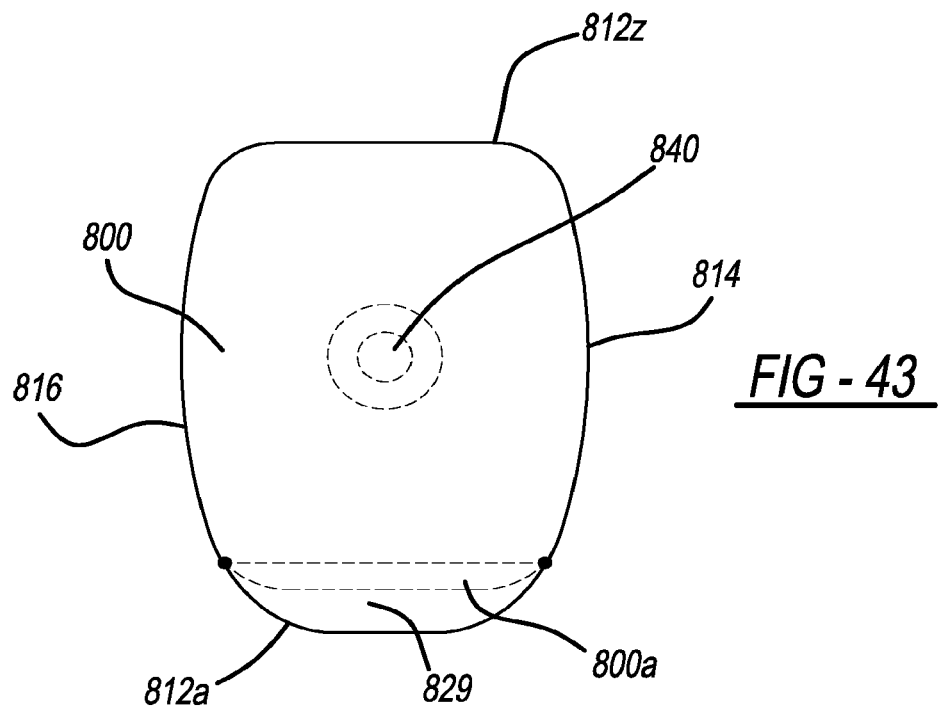
FIG. 43 is a schematic cross-sectional plan view of a portion of an airbag incorporating a divider and flow restriction valve mechanism in accordance with another embodiment described herein.

Referring now to FIGS. 43 and 44, in particular embodiments, an entire length of the divider leading edge 800*a* positioned adjacent or opposite the occupant contact side 812*a* of the airbag is unattached or spaced apart from the occupant contact side 812*a* of the main panel 812. This permits provides an opening between the divider leading edge and the occupant contact side of the main panel which enables fluid communication between the upper and lower chambers when the airbag is inflated and prior to contact with the occupant. The remaining edges of the divider 800 are attached to the side panels 814 and 816 and to a side 812*z* of the main panel opposite the occupant contact side 812*a* so as to form substantially gas tight seals between these edges and the associated panels, as previously described. Unattached edge 800*a* extends from a main portion of the divider 800 to form a free-hanging flap positioned opposite the occupant contact side and extending into the airbag lower chamber, similar to the flaps shown in FIGS. 28 and 29. The structure shown in FIGS. 43 and 44 thus forms a flow restriction valve mechanism similar to that shown in FIGS. 28 ands 29, with an opening 829 enabling fluid communication between the upper and lower chambers.

Figure 46:
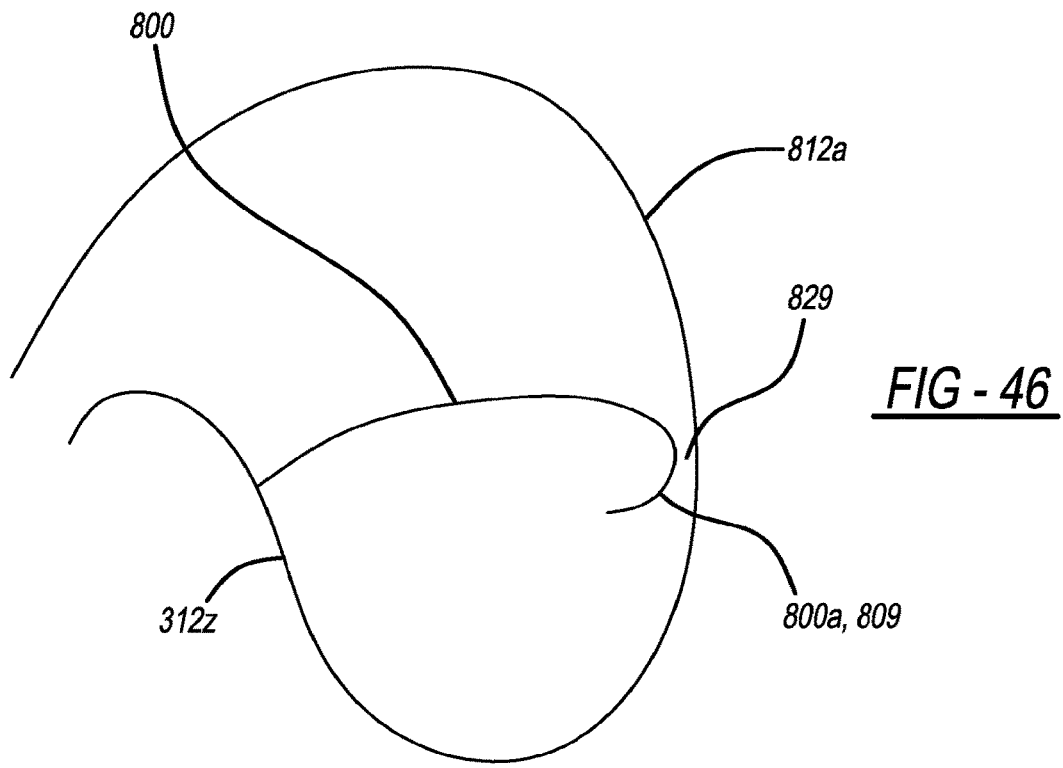
FIG. 46 is a schematic cross-sectional side view of one embodiment of an airbag incorporating a valve mechanism into the leading edge of the dividing panel, showing the valve in an open condition.
Figure 46A:
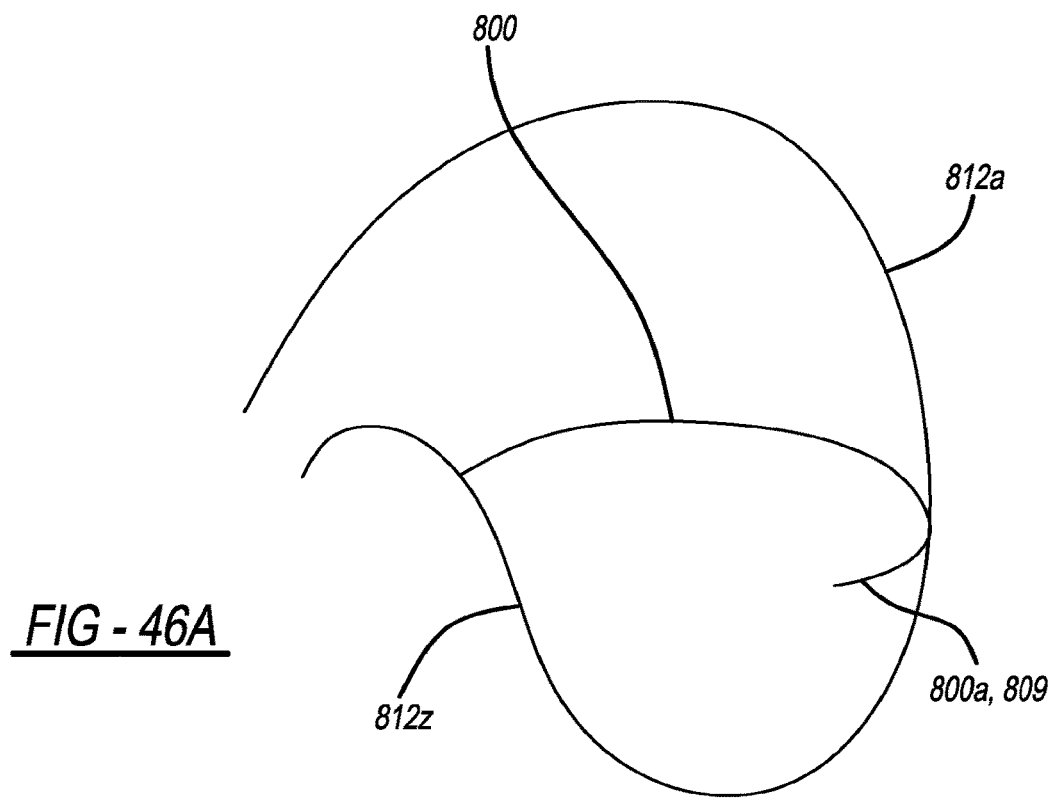
FIG. 46A is the side view of FIG. 46 showing the valve in an open condition.

During inflation of the airbag, gases may flow freely through the valve opening 829 from the upper chamber 102 to the lower chamber 104, as in the valve embodiments previously described. The valve opening 829 formed by the space between the flap 800*a* and the occupant contact side 812*a* is also at least partially closable as previously described (to restrict backflow from the lower chamber into the upper chamber) by pressure exerted by the occupant when contacting side 812*a* (i.e., backflow through the valve mechanism is restricted by contact between the occupant and an exterior surface of the airbag and/or by pressure exerted by the occupant on the airbag which urges a portion of the airbag toward the airbag interior). The increased pressure in the lower chamber acts to urge the flap 800*a* toward an airbag exterior panel, as previously described. FIGS. 46 and 46A show schematic cross-sectional side views of the embodiment shown in FIGS. 43 and 44, with the valve mechanism in an open (FIG. 46) and a closed (FIG. 46A) condition. This embodiment of the divider 800 may also, if desired, incorporate one or more valve mechanism(s) 840 spaced apart from the edges of the divider and structured and/or located in accordance with one of the other flow restriction valve embodiments described herein.

Referring now to FIGS. 45 and 45A, in particular embodiments similar to that shown in FIGS. 43 and 44, the divider edge 800a' positioned adjacent or opposite the occupant contact side 812a of the airbag may incorporate one or more attachment portions 819 alternating with one or more adjacent non-attachment portions 809. In one embodiment, a flap 809a is formed along each of the non-attachment portions as previously described. The flaps 809a extend into the lower chamber 104. Extending between each non-attachment portion 809 and the occupant contact side 812a is a gas flow passage 829' enabling fluid communication between the upper and lower chambers. The embodiment shown in FIGS. 45 and 45A show an attachment region 819 and a non-attachment region 809 along either side thereof. However, any arrangement of attachment regions and associated non-attachment regions may be employed, according to the requirements of a particular application.

The remaining edges of the divider 800' are attached to the side panels 814 and 816 and to a side 812z of the main panel opposite the occupant contact side 812a so as to form substantially gas tight seals between these edges and the associated panels, as previously described.

The divider may be attached at any desired locations and number of locations along the occupant contact side 812a, to provide any associated desired number of flow passages. In addition, each of the connected regions may have any desired length extending along the occupant contact side 812a. The structure shown in FIGS. 43 and 44 thus provides a series of flow restriction valve mechanisms similar to that shown in FIGS. 28 and 29.

During inflation of the airbag, gases may flow freely through the valve openings 829' from the upper chamber to the lower chamber, as in the valve embodiments previously described. The valve openings 829' formed by the space between the flaps 809 and the contact side 812a are also closable as previously described (to restrict backflow from the lower chamber into the upper chamber) by pressure exerted by the occupant when contacting side 812a (i.e., backflow through the valve mechanism is restricted by contact between the occupant and an exterior surface of the airbag and/or by pressure exerted by the occupant on the airbag which urges a portion of the airbag toward the airbag interior). FIGS. 46 and 46A show cross-sectional side views of the embodiment shown in FIGS. 45 and 45A, with the valve mechanism in an open (FIG. 46) and a closed (FIG. 46A) condition. This embodiment of the divider 800' may also, if desired, incorporate one or more valve mechanism(s) 840 spaced apart from the edges of the divider and structured and/or located in accordance with one of the other flow restriction valve embodiments described herein.

Figure 47:
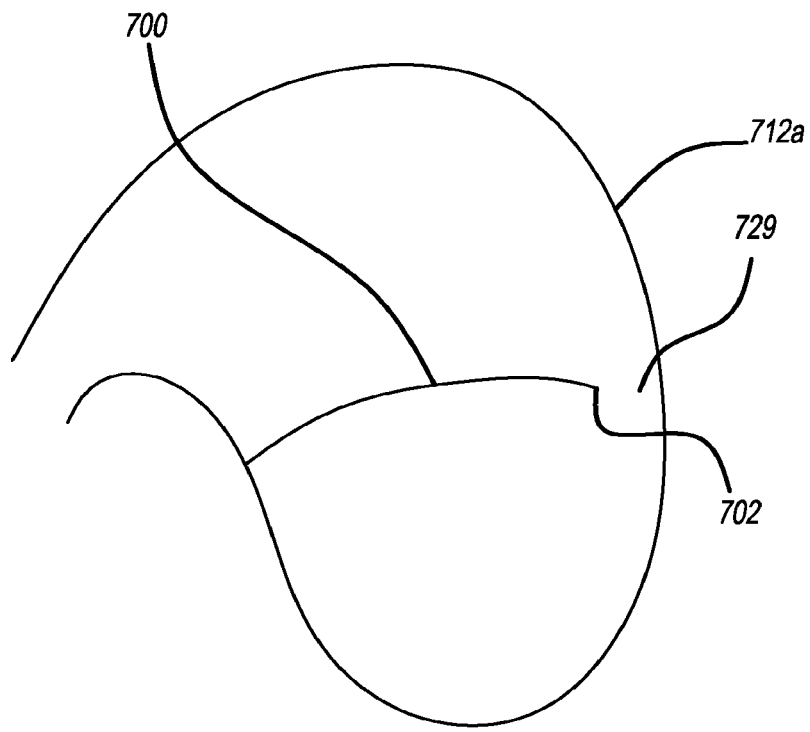
FIG. 47 is a schematic cross-sectional side view of another embodiment of an airbag incorporating a valve mechanism into the leading edge of the dividing panel, showing the valve in an open condition.
Figure 47A:
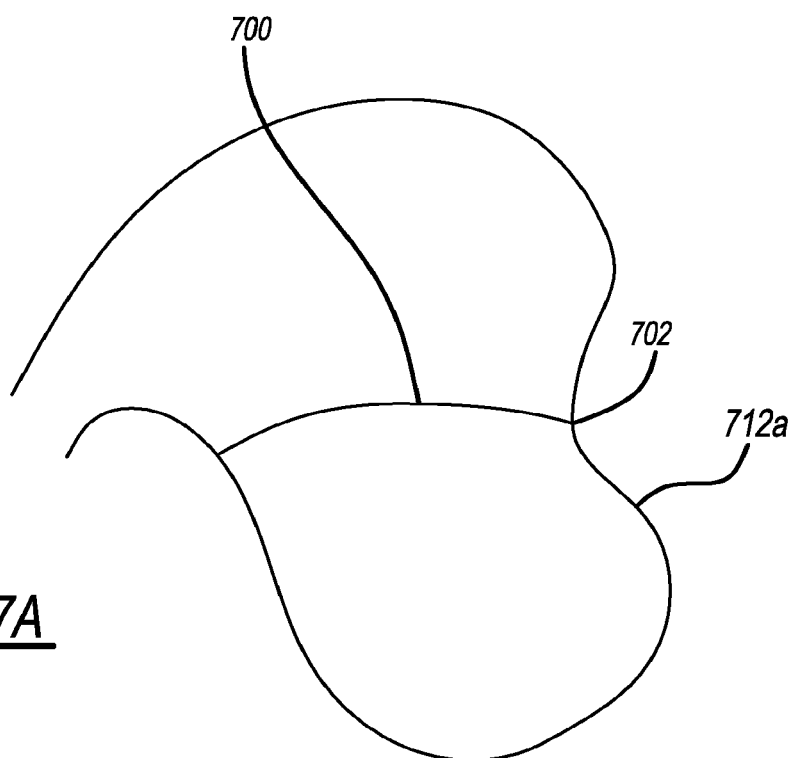
FIG. 47A is the side view of FIG. 47 showing the valve in an open condition.

Referring to FIGS. 47 and 47A, in particular embodiments, the edge 702 of the divider 700 closest to occupant contact side 712a is unattached to and spaced apart from the occupant contact side 712a when the airbag is inflated and prior to contact with the occupant. These embodiments may be structurally and operationally similar to those shown in FIGS. 43-46A, except that no flaps are formed along the edge 702.

During inflation of the airbag, gases may flow freely through the valve openings 729 from the upper chamber to the lower chamber, as in the valve embodiments previously described. The valve opening(s) 729 formed by the space between the divider edge 702 and the occupant contact side 712a are also closable as previously described (to restrict backflow from the lower chamber into the upper chamber) by pressure exerted by the occupant when contacting side 712a (i.e., backflow through the valve mechanism is restricted by contact between the occupant and an exterior surface of the airbag and/or by pressure exerted by the occupant on the airbag which urges a portion of the airbag toward the airbag interior). FIGS. 47 and 47A show cross-sectional side views of this embodiment, with the valve mechanism in an open (FIG. 47) and a closed (FIG. 47A) condition. This embodiment of the divider 700 may also, if desired, incorporate one or more valve mechanism(s) (not shown) spaced apart from the edges of the divider and structured and/or located in accordance with one of the other flow restriction valve embodiments described herein.

The design parameters of the valve embodiments shown in FIGS. 43-47A can be iteratively determined (experimentally and/or analytically) and specified as previously described so as to regulate the amount of gas backflow (if any) through the valve opening, responsive to the mass of the passenger and according to the requirements of a particular application.

Figure 15:
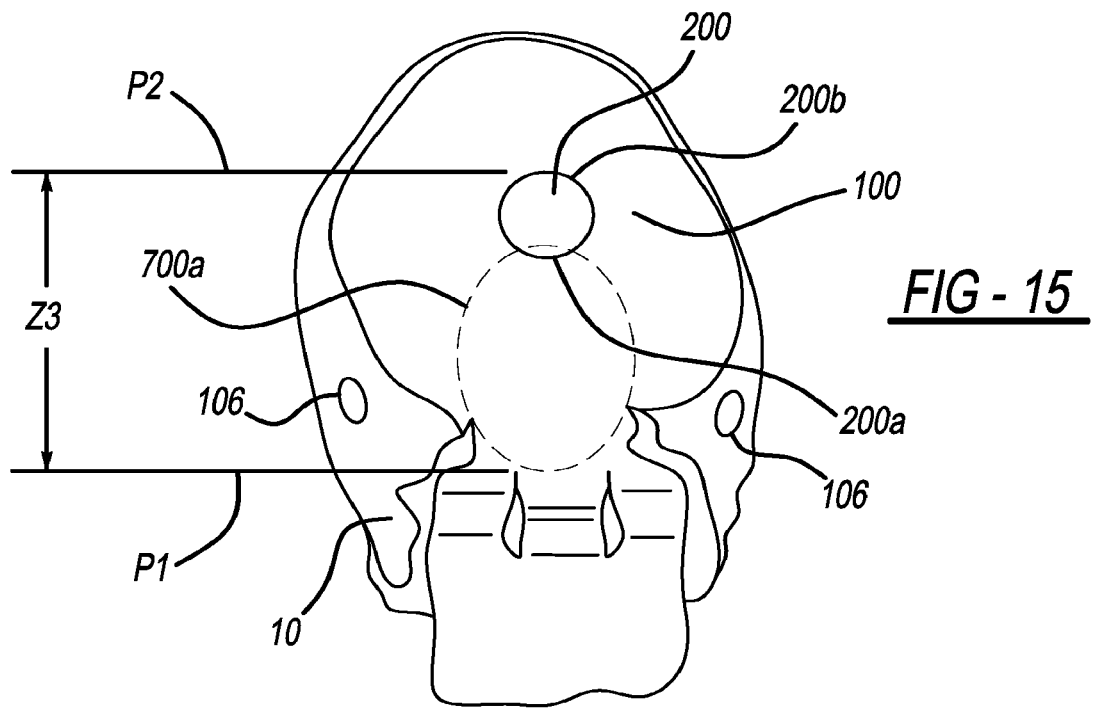
FIG. 15 is a dividing panel in a cross-sectional plan view of an uninflated airbag showing a location of a representative inter-chamber vent in the divider.
Figure 16:
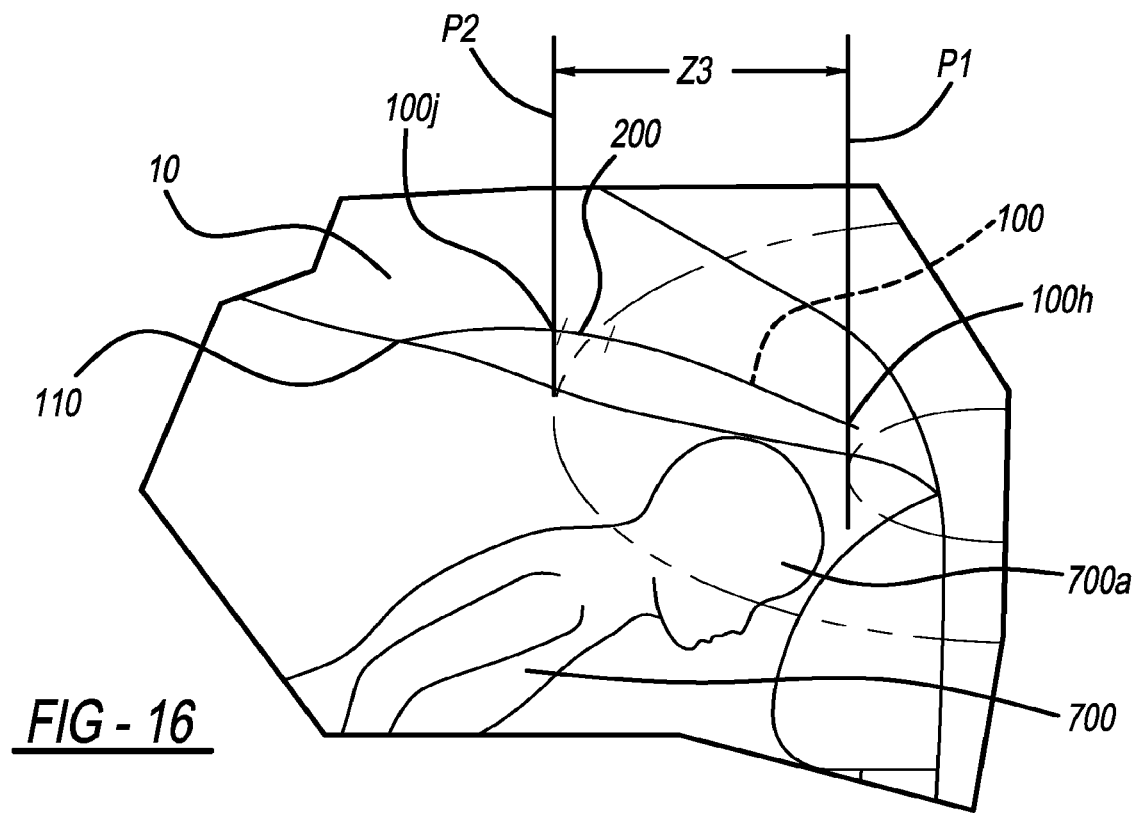
FIG. 16 is a side view of a portion of the airbag shown in FIG. 15 in an inflated state, showing a location of the inter-chamber vent, and showing the initial stage of inflation of one embodiment of the airbag in relation to a head of a Hybrid III 6-Year Old Anthropomorphic Test Device.
Figure 16A:
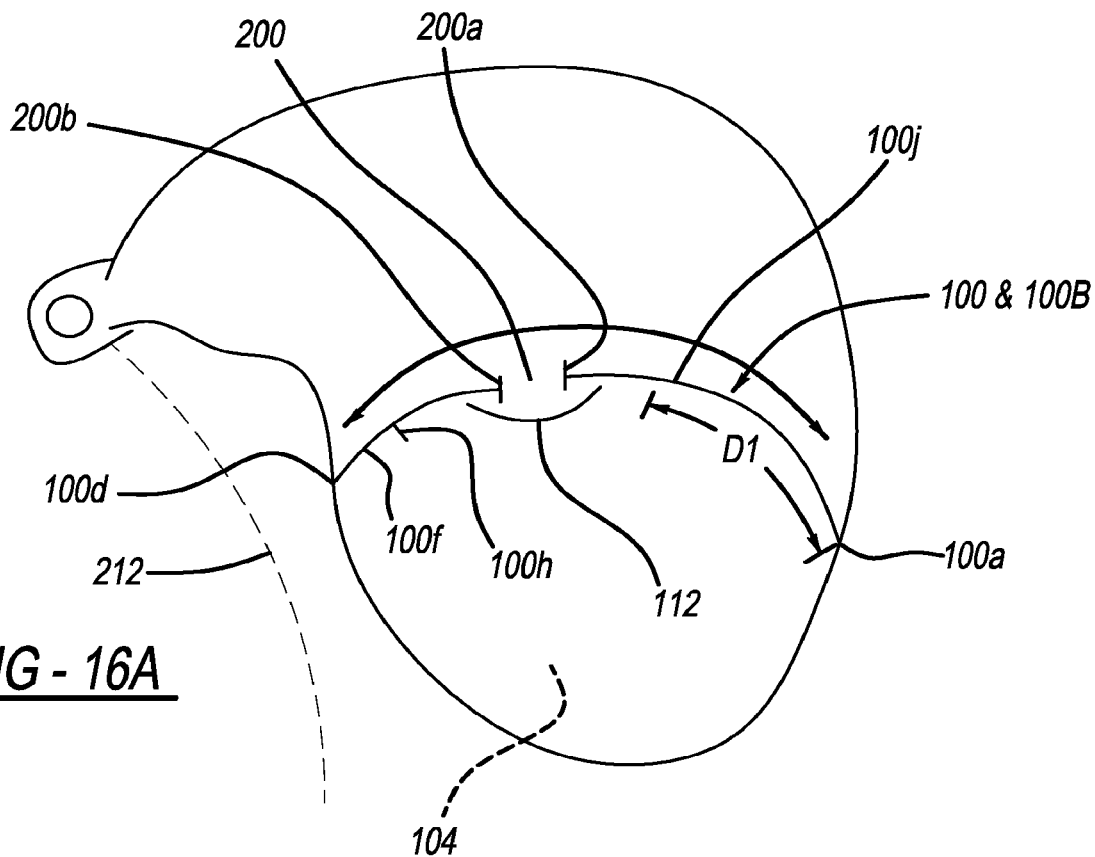
FIG. 16A is cross-sectional side view of the airbag embodiment shown in FIG. 16, in an inflated state.
Figure 16B:
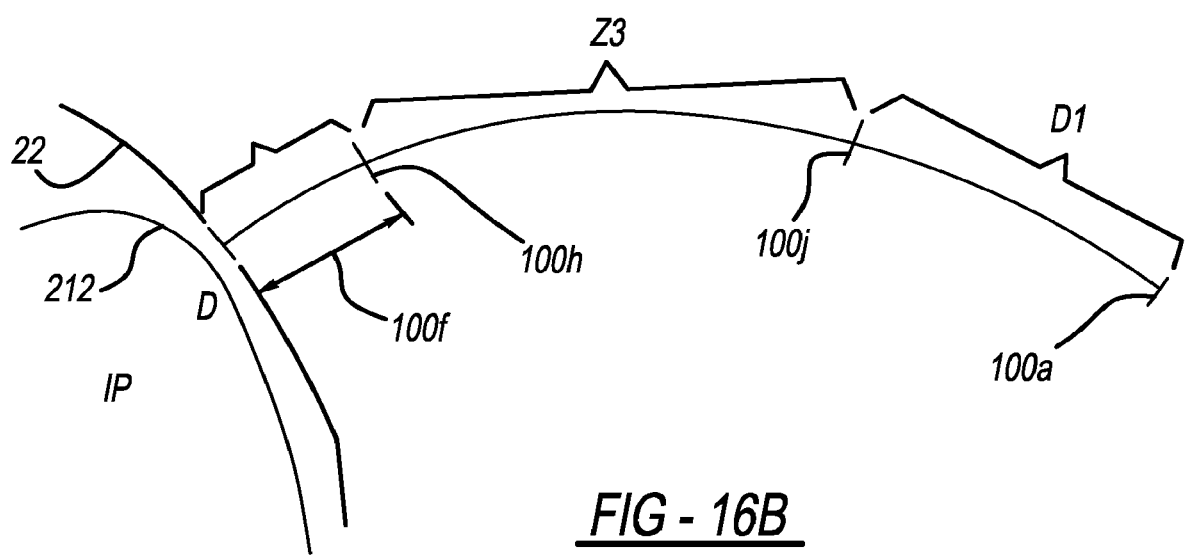
FIG. 16B is a magnified view of a portion of the cross-sectional side view shown in FIG. 16A.
Figures 17, 18:
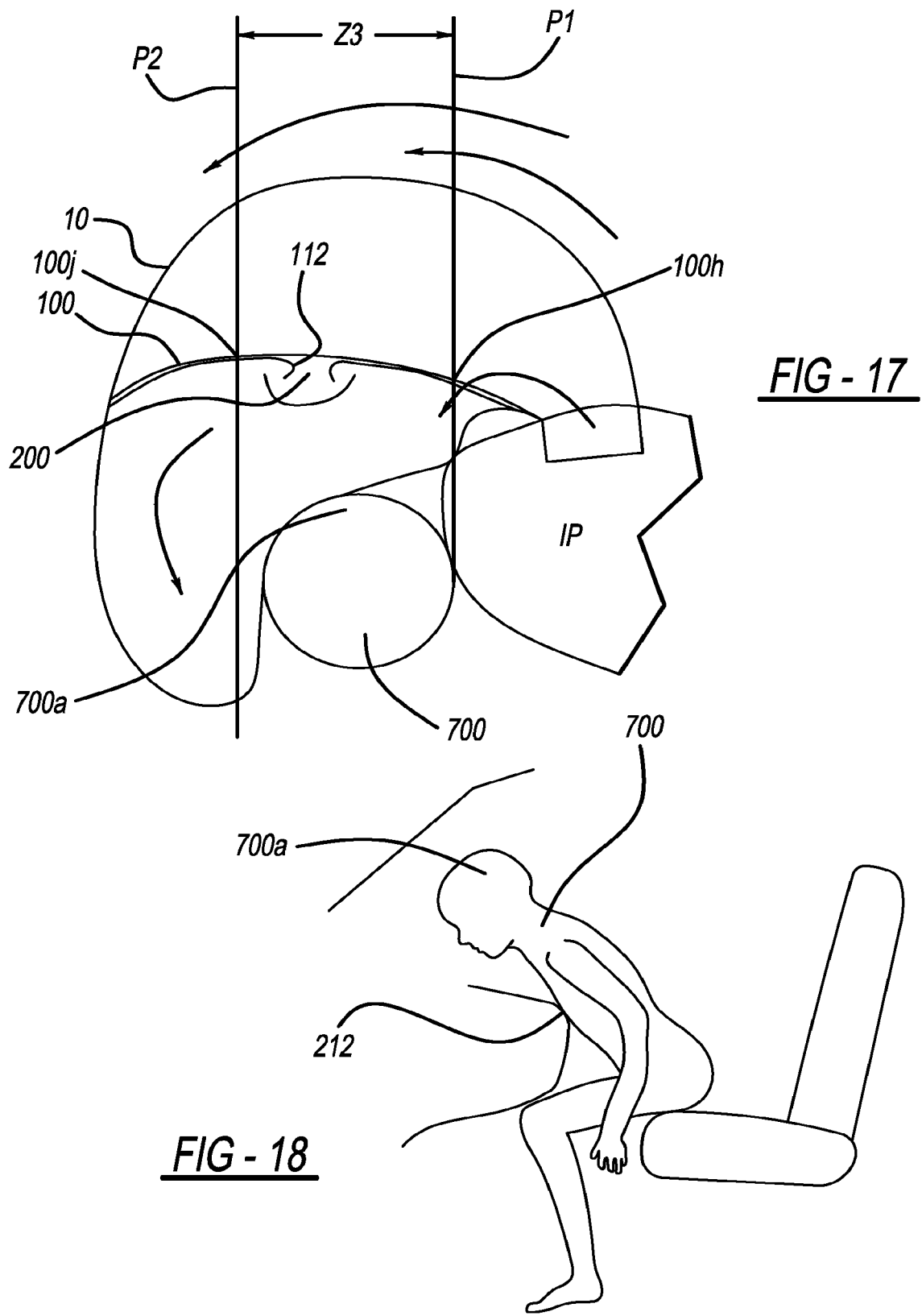
FIG. 17 is a side view of the airbag of FIG. 16 showing a later stage of inflation of the airbag.
FIG. 18 is a schematic view of Position-2 for Out of Position testing for a Hybrid III 3 and 6-Year Old Anthropomorphic Test Device (ATD).
Figure 21B:
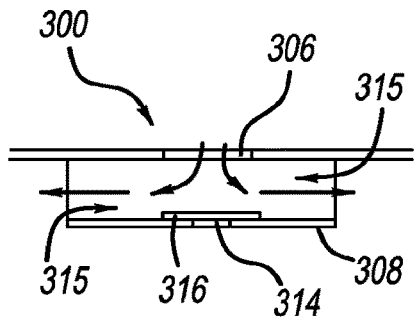
FIG. 21B is a cross-sectional front view of the portion of the airbag shown in FIG. 21A.

Referring now to FIGS. 15-17, in particular embodiments, a valve mechanism 112 controls and provides a directional gas flow through one or more openings 200 (for example, opening 200 as shown in FIGS. 3, 15, 16A, 16B and 17) formed in divider 100. Opening(s) 200 are provided to enable fluid communication from upper chamber 102 into lower chamber 104 as previously described. It has been found that airbag performance after activation and during filling is affected by the distance (or distances) 100f of the opening(s) 200 from the inflator side 100d of the airbag (as seen in FIG. 16a), and also by the distance (or distances) of the opening(s) 200 from the front or passenger side 100a of the airbag along an axis extending parallel to the fore-aft axis of the vehicle. More specifically, if leading edge 200a of the openings 200 (or the leading edge of any opening, if multiple openings are used) is located nearer to the occupant contact side of the cushion than a location 100j defined by a predetermined distance D1 from the occupant side (as measured from the seam connecting the divider 100 with the front portion of main panel 12 and along a surface of the divider), the airbag will have a tendency to pull excessively downward during inflation of the upper chamber 102, thereby pulling the airbag out of the desired alignment with the passenger's body shown in FIG. 4, prior to contact between the passenger and the inflating airbag.

Also, if an edge 200b of the opening 200 (or an edge of any opening, if multiple openings are used) closest to the inflation side 100d of the airbag, is located closer to the inflation side 100d than a location 100h (residing a predetermined distance 100f along the a surface of the divider 100 from the inflator side 100d), the movements of the components of the valve mechanism 112 may be constricted by proximity to the instrument panel profile (denoted by line 212 in FIG. 16A), thereby impairing valve operation.

It is also desirable to achieve adequate gas flow to fill lower chamber without having the upper chamber pressure become too high to meet the NHTSA airbag performance requirements for an out-of-position 3 year old or 6 year old child, evaluated for position-1, with the torso of the child positioned in relation to the instrument panel as shown in FIG. 49. Position-1 for Out of Position testing is also shown in FIG. 5 of the reference available at http://www.nhtsa.gov/cars/rules/rulings/80g/80giii.html, the substance of which is repeated as FIG. 49.

While positioning of the divider opening edge(s) 200a (closest to the passenger contact side) past the distance D1 along the divider and farther away from the passenger contact side of the main panel 12 helps to eliminate excessive downward pull of the airbag during the initial stages of inflation, thereby improving the overall performance of the bag with respect to an adult occupant, this positioning of the opening(s) may result in less-than-optimum performance for Out of Position-1 children. There is a balance between these requirements which may be tuned for a specific vehicle or specific application in order to achieve the best overall performance both early and later in the deployment event, and for both types of passenger, children and adults. Between locations 100h and 100a lies an optimal location or locations for tuning the initial cushion fill and cushion pitch to achieve the desired results for a given application. The exact desired location of the opening (or openings) 200 for a particular application may be determined iteratively, by experimentation, or analytically.

Thus, between locations 100h and 100j along a surface of the divider is an interval or zone in which all edges of the opening or openings 200 should be positioned to prevent excessive downward pull of the airbag during inflation and to space apart the flow restriction valve components from the instrument panel. By positioning the valve mechanism within the range defined by locations 100h and 100j, the force exerted by the inflated airbag on 3 & 6 year olds in position-1 will be equally divided between the child's head and thorax regions.

Also, in particular embodiments of the airbag, it is desired to position the opening(s) 200 along the divider 100 so that, during inflation, the airbag 10 reacts with a child passenger in a predetermined manner. More specifically, the opening(s) 200 are positioned along the divider such that, as the upper chamber fills in the initial stage of deployment, the bag upper chamber 102 inflates above the top of the head 700a of a Hybrid III 3 and 6-Year Old Anthropomorphic Test Device (ATD) (generally designated 700) when the head is positioned resting against or proximate the vehicle instrument panel at a location specified as Position-2 for NHTSA Out of Position (OOP) testing in accordance with FMVSS Standard No. 208 (which is incorporated herein by reference in its entirety and which may be found, for example, at http://www.fmcsa.dot.gov/rules-regulations/administration/fmcsr/fmcsrruletext.aspx?reg=571.208). The Hybrid III 3 and 6-Year Old test ATD has physical parameters defined by the National Highway Traffic Safety Administration at http://www.nhtsa.gov/Research/HYBRID+III+6-Year+Old+Physical+Data, the contents of which is incorporated by reference in its entirety, and a copy of the substance of which is included herein as FIG. 18a. Position-2 for Out of Position testing is also shown in FIG. 5 of the reference available at http://www.nhtsa.gov/cars/rules/rulings/8g/80giii.html, the substance of which is repeated in this application as FIG. 18B. As gases flow into the lower chamber 104 from the upper chamber 102, the lower chamber 104 inflates in the later stages of deployment so as to occupy a space behind and around the child's head, thereby preventing and/or mitigating harmful interactions between the airbag and the child's head. This inflation progression is shown in FIGS. 16 and 17.

It has been found that an optimum inflation profile range and alignment with the passenger's body as shown in FIG. 4, as well as the bag inflation progression shown in FIGS. 16-17, can be achieved by positioning all divider openings 200 such that all edges of all the openings reside within the zone bounded by or residing between locations 100h and 100j in FIG. 16A, which may also be defined on one side by a vertical plane P1 shown in FIG. 16 corresponding to location 100h in FIG. 16b abutting the front-most portion of the head of the Hybrid III 6-Year Old Anthropomorphic Test Device when the head of the Hybrid III 6-year old is in Position-2 for NHTSA Out of Position testing as specified above, and on an opposite side by a vertical plane P2 (see FIG. 16) passing through location 100j shown in FIG. 16b. In one embodiment, plane P2 is spaced apart approximately 7 inches from plane P1 toward a rear of the vehicle when the airbag is inflated. This effectively positions the divider opening(s) within a zone enclosing the head of the Hybrid III 6-Year Old ATD. The distance between planes P1 and P2 defines a zone Z3 in which the openings 200 may be positioned. For example, FIG. 15 is a plan view of an uninflated airbag showing an embodiment of the airbag divider 100 having a circular opening 200 positioned such that the rear-most edge of the opening resides within the specified zone Z3 when the bag is inflated.

It has also been found that a total area of the opening (or openings) 200 within a range of 700 square millimeters (achievable using, for example, one opening of approximately 15 mm radius) to 32,000 square millimeters (achievable using, for example, one opening of approximately 100 mm radius opening) is desirable for helping to ensure that airbag performance is within an optimum range. In embodiments of the present invention, which use a directional valve mechanism to facilitate inflow and restrict backflow from the lower chamber to the upper chamber as previously described, the areas of the divider opening or openings may need to be at or near an upper end of this range of opening sizes 700 to 32,000 square millimeters, to provide the necessary inflation profile given the reduction in flow caused by turbulence and friction in the gases as they flow through the opening(s) and interact with the portions of the valve.

In one embodiment, the opening or openings 200 are circular. However, the opening(s) can have any desired shape, as long as the total area of the opening(s) is within the range specified above, and as long as all of the opening edges are positioned within the zone defined above.

In addition, the number of openings 200 and the optimum size(s) of the opening(s) formed in divider 100 for a particular application may be determined based on the type of vehicle collision pulse and interior geometry of the vehicle in which the airbag is installed, the desired fill rate of the airbag, the volume ratio, the type of directional valve used, the overall dimensions and curvature of the instrument panel, and other pertinent factors. The size(s) and position(s) of the opening(s) 200 as described herein facilitate smooth and rapid transfer of inflation gases from the upper chamber to the lower chamber during initial stages of airbag filling. Once equilibrium is substantially reached between the upper and lower chamber pressures, flow from one chamber to the other is reduced.

FIGS. 15-17 thus show an airbag comprising at least one panel defining an interior of the airbag and a divider positioned in the interior so as to divide the interior into an upper chamber and a lower chamber, the divider having at least one opening formed therealong, the at least one opening being positioned such that all edges of the at least one opening reside within a zone (Z3) bounded by a first vertical plane (P1) residing a predetermined distance (1000 along the divider from an inflator side (100d) of the airbag toward an occupant contact side of the airbag, and a second vertical plane (P2) passing through a location (100j) defined by a distance (D1) along the divider from a seam (110a) connecting the divider (100) with the occupant side of the airbag, after activation of the airbag.

In a particular embodiment of the airbag, the first plane (P1) may be positioned so as to abut a forward-most portion of a head of a Hybrid III 6-Year Old Anthropomorphic Test Device when the head is in Position-2 for NHTSA Out of Position testing.

In a particular embodiment of the airbag, the second plane (P2) may be spaced apart approximately 7 inches from the first plane (P1) toward a rear of the vehicle when the airbag is fully inflated.

In a particular embodiment of the airbag, the airbag may further include a plurality of openings formed in the divider 100, with each opening being positioned such that all edges of the opening reside within the zone (Z3) bounded by the first plane (P1) and the second plane (P2).

In a particular embodiment of the airbag, a total area of all of the openings of the plurality of openings may be within the range 700 square millimeters to 32,000 square millimeters, inclusive.

In a particular embodiment of the airbag, a total area of the at least one opening may be within the range 700 square millimeters to 32,000 square millimeters, inclusive.

In addition, the airbag may be incorporated into a vehicle in any of a variety of forms. The airbag may also be incorporated into a vehicle occupant protection system or airbag system.

Another enhancement to improve the performance of the chambered airbag is the addition of volume control mechanism (VCM) or tether within the upper chamber of the cushion. The function of the VCM is to control upper chamber volume relative to that of the lower chamber. This causes gas to flow into the lower chamber at an earlier time than would be the case without the tether, thereby forcing the lower portion of the airbag into position relatively faster for protecting small occupants, as represented by the Hybrid III 5th female ATD. The VCM also controls the configuration of the inner chamber dividing panel 100 during and after inflation, so as to maintain the position of the divider above the head of the 6 year old child ATD in position 2 of the low risk deployment section, as detailed in the Federal regulations (FMVSS 208).

In certain embodiments described herein, tether mechanisms positioned within the airbag upper chamber may be attached to the divider at any location within the zone Z3 defined herein with regard to FIGS. 16B and 17. At the same time, the tether mechanisms are attached to any other portion of the airbag located within the upper chamber and above the divider, so as to prevent or reduce movement of unattached portions of the divider in a direction toward lower chamber 104.

Figure 23:
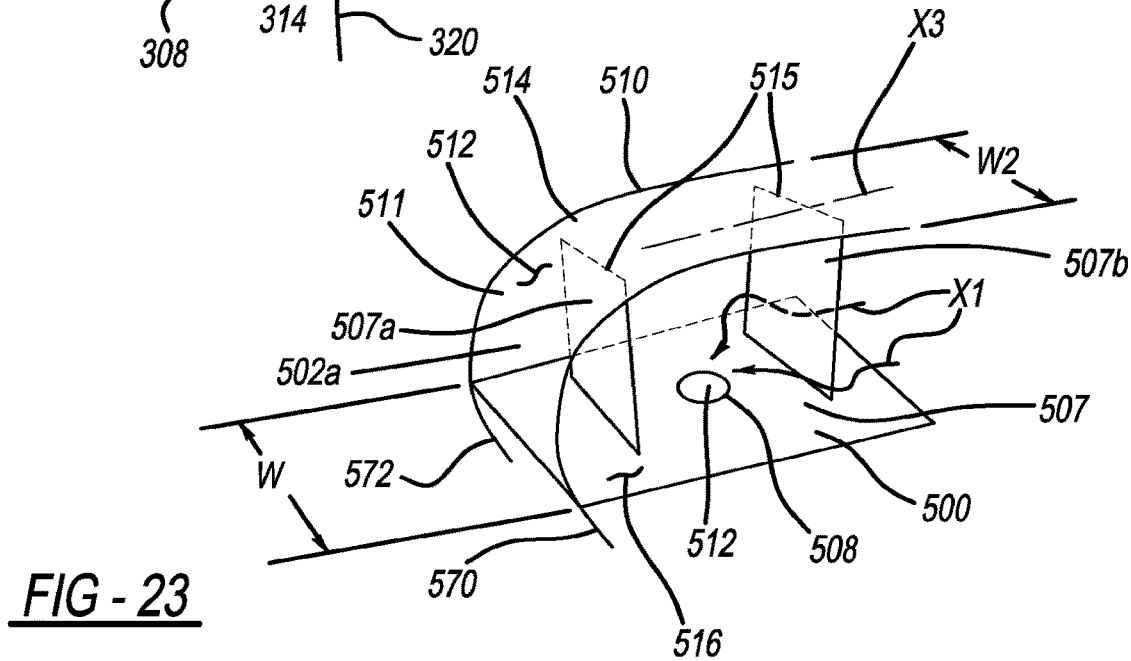
FIG. 23 illustrates a perspective view of one embodiment of an inventive enhancement using a unique tethered system, with the tether attached to the airbag divider and main panel.

In certain embodiments (such as FIGS. 23 and 23A) the tether(s) 507 are oriented substantially orthogonal or crosswise to an axis X3 running parallel to a fore-aft axis of the vehicle. Referring to FIG. 23, in accordance with one particular embodiment, a tether or tethers 507 (in FIG. 23, tethers 517b and 517c) may, if desired, be dimensioned to broadly cover an interim portion within the airbag 510 that extends across an interior of the airbag 510, whereby the tether width W may be designed to approach the width W2 (in a direction perpendicular to vehicle fore-aft axis X3) of an upper portion 511 of the main panel 512. By thereby directing the gas flow along inner side periphery regions of the upper chamber 502a (i.e., between each of airbag side panels 514 and 516 and opposite side edges of second tether 517c connecting the divider with the main panel above the divider), the central part of the upper chamber 502a (between first and second tethers 517b and 517c) receives a flow of gas directed from the opposite edges of the tether 517b toward the flow restriction valve 513, a flow that may be described as "cross-car" or orthogonal to axis X3 running parallel to a fore-aft axis of the vehicle and which is indicated by arrow X1. As a result, the lower chamber 504 fill time is effectively decreased with the decrease of the tether length (defined as the shortest distance along the tether between the divider and the main panel) and also effectively decreased with the decrease of the tether width W. It will be appreciated that the fill rate of the lower chamber 504 may be iteratively tailored by modifying the width W and or length(s) of the tether(s) 507 to alter the resultant gas flow directed toward the flow restriction valve. In this way, the upper chamber 502 may be tailored to exhibit a relatively softer or more pliable inflation profile over time, thereby protecting the head of a smaller occupant that may come in contact with the deploying upper chamber 502 portion of the airbag 510. Tether embodiments as shown in and/or similar to that shown in FIG. 23 are described in greater detail in U.S. patent application Ser. No. 14/195,767, the disclosure of which is incorporated herein by reference in its entirety.

Figure 23A:
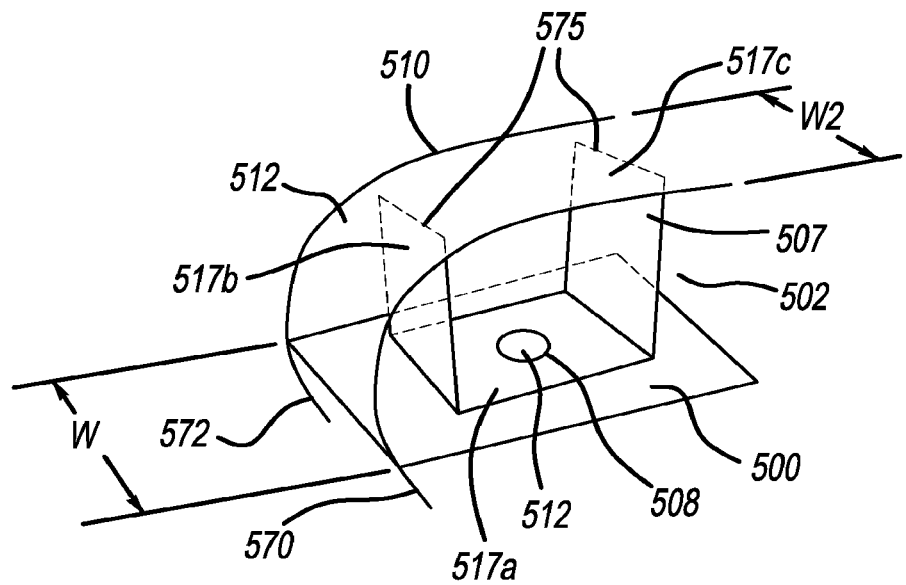
FIG. 23A is a cross-sectional perspective view of another embodiment of an inventive enhancement using a unique tethered system, with the tether attached to the airbag divider and main panel.

In another particular embodiment, tether 507 has the general structure shown in FIG. 23A. In this embodiment, tether 507, when suitably attached to other portions of the airbag, has central portion 517a, a first portion 517b extending from one end of the central portion, and a second portion 517c extending from an opposite end of the central portion. An end of first portion 517b is stitched or otherwise suitably attached to a portion of main panel 512 residing in upper chamber 102. An end of second portion 517c is stitched or otherwise suitably attached to a portion of main panel 512 residing in upper chamber 102. In particular embodiments, the ends of the tether are attached to the main panel along seams 575 as shown in FIG. 23A, so as to form gas-tight seals along the seams. This enables the tethers to direct a flow of gas impinging on the tether around side edges of the tether. However, in other embodiments, openings or slits may be formed in the seams 575 to enable gas flow through the seams. In addition, openings (not shown) may also be formed in the bodies of one or more of first and second portions 517b and 517c, to enable a flow of gas through the openings. The dimensions of such opening(s) may be specified according to the requirements of a particular application, and depending on such factors as the desired flow rate(s) through the openings, the locations of the opening(s), and other pertinent factors. Also, the ends of either of first and second tether portions 517b and 517c may alternatively be attached to either of airbag side panels 514 and 516 and main panel 512, if desired. Embodiments of the tether may be formed from the same material as any of the airbag panels or divider 100, or any of other suitable material or materials. Tether embodiments as shown in and/or similar to that shown in FIG. 23A are described in greater detail in U.S. patent application Ser. No. 14/195,767, which is incorporated herein by reference.

In certain embodiments shown herein, and referring in particular to the embodiment shown in FIG. 23A for purposes of description, the opposite ends of the tether central portion 517a are anchored by attaching these ends to divider 500. In addition, central portion 517a has an opening 508 formed therein to enable a flow of gases through the central portion and through a flow restriction valve mechanism 512 provided in divider 500, as previously described.

Figure 24:
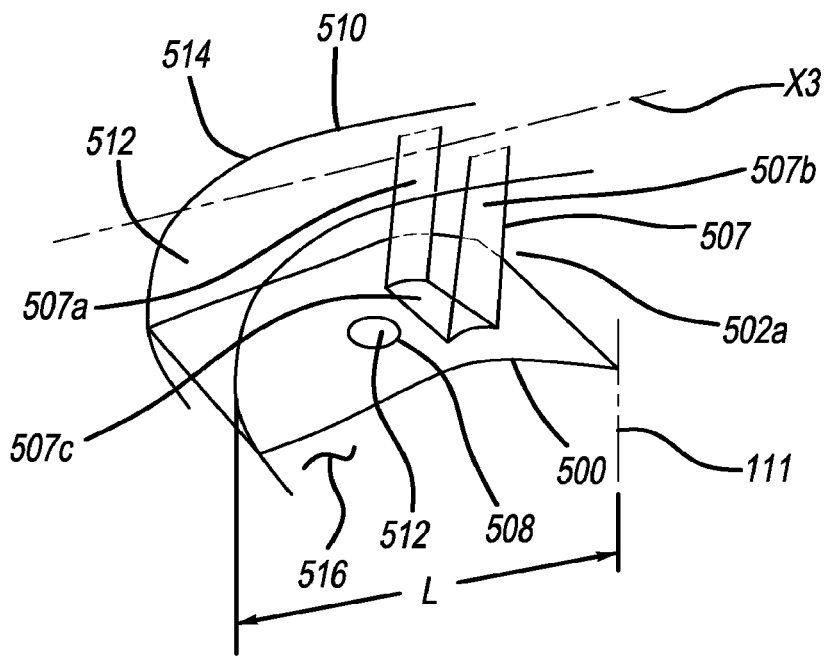
FIG. 24 is a cross-sectional perspective view of another embodiment of an inventive enhancement using a unique tethered system, with the tether attached to the airbag divider and main panel.

Referring to FIG. 24, in another embodiment, the tether or tethers 507a and 507b connecting the divider to the main panel may be attached to the main panel 512 along seams that run generally parallel to or are aligned with the vehicle fore-aft axis, and at locations relatively closer to a vertical plane 111 extending along a rearmost part of the instrument panel (not shown). In doing so, the gas fill rate of the lower chamber 504 of the airbag 510, as gas travels through the flow restriction valve 512 in the divider panel 500 from the upper chamber 502 to the lower chamber 504, may be relatively reduced or delayed. FIG. 24A shows a schematic cross-sectional side view of the embodiment shown in FIG. 24, with gases entering the airbag and flowing along the path indicated by arrow 24G.

Alternatively, referring to FIG. 25, if desired, the tethers 507a and 507b may be attached along the axis X3 at points relatively closer to the rear of the vehicle and away from the instrument panel. In doing so, the gas fill rate of the lower chamber 504 of the airbag 510 is relatively increased. In general, the tether(s) 507a and 507b are preferably attached at points that fall within a middle portion 511a of the upper portion of the main panel of the airbag 510 that ranges from about 25% to 75% of the length L of the airbag 510, as measured from a vertical plane 111 extending along a rearmost portion of the instrument panel to the rearmost part of the airbag 510. Stated another way, the tethers 507a and 507b may more preferably be fixed at points ranging from about 100 to 700 millimeters from the front of the instrument panel 111. FIG. 25A shows a schematic cross-sectional side view of the embodiment shown in FIG. 25, with gases entering the airbag and flowing along the path indicated by arrow 25G. In general, the placement of the tether(s) 507a and 507b or, modifying the angle of the tethers 507a and 507b with regard to the instrument panel 111, facilitates forward or rearward tilting of the one-way valve 512 (or modifying the pitch of the one-way valve) thereby respectively closing or opening the valve 500 to a more direct flow of gas.

Any of the tethers connecting the divider to an other portion of the airbag above the divider may also be joined to each other by a joining section (for example, either of joining sections 507c of FIGS. 24 and 25) which is connected to and extends along the divider between the connection tether portions. Thus, the tether may be formed from a continuous strip which has a central portion extending along the divider and a pair of end portions connected to the divider and extending from the central portion to attach to another portion of the airbag.

In particular embodiments, the tethers 507a and 507b shown in FIGS. 24 and 25 may, for example, be attached to the airbag outer shell along the seams 570 and 572 that attach the side panels 514 and 516 to the main panel 512 of the airbag 510 in the upper chamber 502. In this way, manufacturing is simplified, for as the airbag panels 512, 514, and 516 are sewn together, the tethers 507a and 507b may simultaneously be attached in predetermined positions along the seams 570 and 572.

In addition, a second or bottom end of first tether 507a may be connected to the divider 500 between side panel 514 and valve 512, and a second or bottom end of second tether 507b may be connected to the divider 500 between side panel 516 and valve 512. In a particular embodiment, the connection points or seams of the first and second tethers 507a and 507b at both ends of each tether all preferably reside within one plane that intersects the connection points described in this embodiment, but may be attached in a multi-plane configuration. Altering the attachment locations of each of tethers 507a, 507b along the respective seam 570, 572 to which each tether is attached (that is positioning the tether attachment somewhere between 25% to 75% of the length L of the airbag 510 defined between the front of the instrument panel plane 111 and the rearmost part of the airbag 510 (as shown in FIG. 25) It will be appreciated that each of the two tethers 507a and 507b will be attached to its respective seam at a respective point equidistant from the instrument panel 111, as a correlating point of the other tether 507. Stated another way, each one of tethers 507a, 507b will be attached to its respective seam at a point that is substantially equidistant from the instrument panel 111 as the attachment point of the opposing one of tethers 507a, 507b. It will further be appreciated that moving the attachment points along each seam may alter the pitch of the valve orifice 506. For example, moving the attachment points of the tethers 507 closer to the instrument panel 111 will thereby generally provide a greater exposure of the valve 512 to direct gas flow with a resultant increased relative gas fill rate into the lower chamber. On the other hand, moving the attachment points of the tethers 507 further away from the instrument panel and more rearward of the vehicle will thereby attenuate or limit the exposure of the valve to direct gas flow with a resultant reduced relative gas fill rate into the lower chamber.

Figure 30:
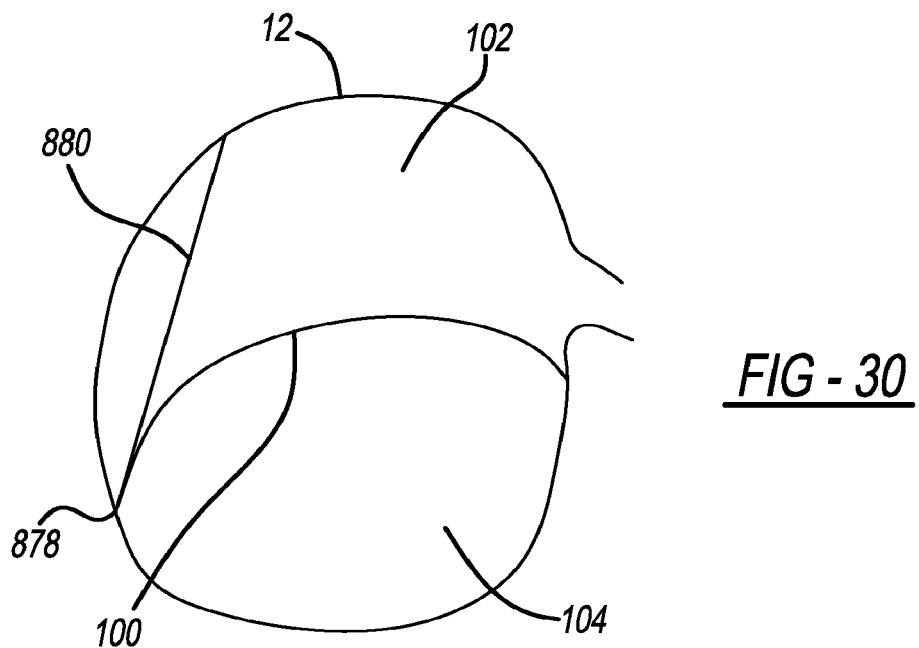
FIG. 30 is a schematic cross-sectional side view of an airbag incorporating an internal tethering mechanism in accordance with an embodiment described herein.
Figure 31:
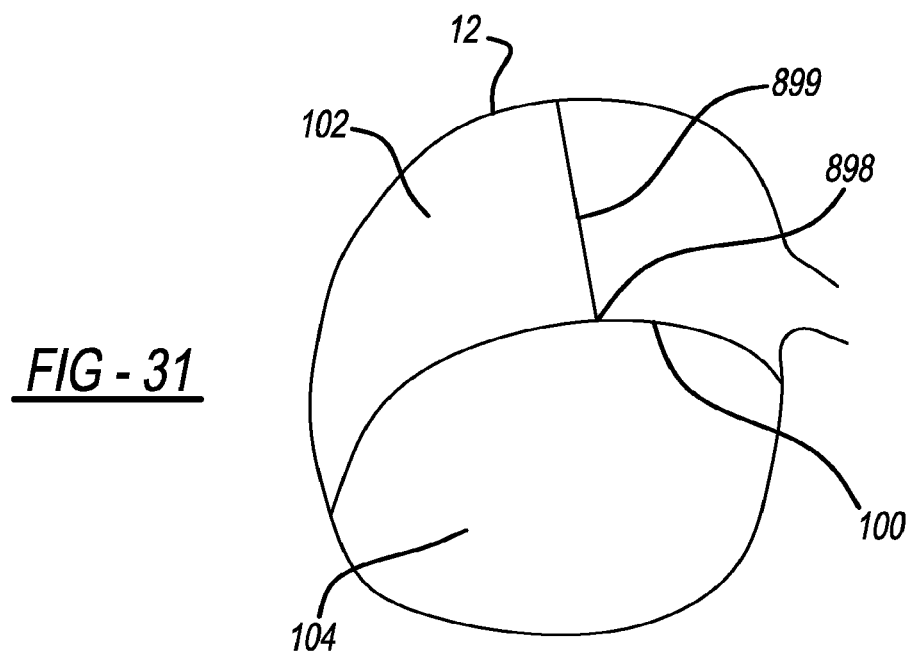
FIG. 31 is a schematic cross-sectional side view of an airbag incorporating an internal tethering mechanism in accordance with another embodiment described herein.

In other embodiments described herein, the tether generally connects the divider 100 with another portion of the airbag located in upper chamber 102 and residing above the divider when the airbag is inflated. Thus, as the airbag inflates, the tether pulls upwardly on the divider and supports the divider and controls portions of the divider from encroaching into or moving toward lower chamber 104. In particular embodiments, a tether connects a central portion of the divider with an upper portion of main panel 12, within upper chamber 102. Referring to FIG. 31, in a particular embodiment, a tether 899 is attached to a location on the divider which is the apex or relatively highest portion 898 of the divider 100 when the bag is in an inflated condition. Referring to FIG. 30, in another embodiment, a tether 880 is attached to either the main panel 12 or the divider 100 along (or proximate) a seam 878 connecting the divider 100 to the front or occupant contact surface of the main panel. An opposite end of the tether is then attached to another portion of the airbag located in upper chamber 102 and residing above the divider when the airbag is inflated, to aid in minimizing or reducing downward deflection or intrusion of the divider into the lower chamber while simultaneously pulling inwardly or restricting motion of the front surface of the main panel in a direction toward the occupant during airbag inflation. Attachment locations of the various portions of the tether to the divider and the airbag exterior panels may be specified so as to control the exterior shape of the airbag during and after inflation. More specifically, in the manner described herein, the tether (or tethers) may be attached so as to force specific portions of the airbag interior to inflate before other portions or to otherwise vary the flow rates of gases into portions of the bag interior, to control the direction of gas flow within the airbag interior, and to control the amounts by which various exterior portions of the airbag extend or project outwardly during and after inflation. Examples of embodiments in which exterior surfaces of the airbag are controlled in this manner are shown in FIGS. 32, 36, 37, and 38.

Referring to FIGS. 25B and 25C, in particular embodiments, at least a portion of a leading edge of divider 1007 is detached from the airbag occupant contact side 1012 as described elsewhere herein, to form a gas flow passage 1001. The detached portion of the divider may or may not include a flap structured for impeding backflow of gases into the upper chamber, as described herein. A tether 1007 is structured to connect the divider 1100 to occupant contact side 1012 above the divider and proximate a location where the head of a vehicle occupant will contact the occupant contact side.

In a particular embodiment, the tether 1007 is attached to the divider at a location within the zone Z3 previously defined herein.

In a particular embodiment, the zone ZZ along the occupant contact side within which the tether 1007 is attached thereto is defined by a band B9 having a maximum width of 20 inches extending along a vertical plane L9 defining a centerline of the deployed airbag, the band also encompassing or including the points or locations along which a seat-belted Hybrid III 5th percentile female ATD, a Hybrid III 50th percentile male test ATD, and a Hybrid III 95th percentile male test ATD will contact the occupant contact side.

In particular embodiments, as well as an upper chamber tether 1007 and detached leading edge divider in accordance with FIG. 25B, the airbag may also include a lower chamber tether in accordance with any of the embodiments described herein (for example as shown in any of FIGS. 32-39. Also, in particular embodiments, in addition to any or all of the features just recited, the airbag may if desired further include a flow restriction valve mechanism 1112 positioned within the zone Z3 of otherwise spaced apart from attachment or non-attachment edges of the divider, as described elsewhere herein.

Referring to FIGS. 32-38, in particular embodiments, internal tethering is applied to reduce the chest compression experienced by adult passengers impacting the airbag, while simultaneously maintaining the performance requirements for Out of Position-2 Children as incorporated in the previously-described Federal standard FMVSS208 relating to low-risk deployment.

Referring to FIGS. 32-38, in particular embodiments of the airbag, it is desired to structure and attach an internal tethering mechanism 990 to interior surfaces of the airbag below the divider 100, so as to connect a part 994 of the front portion of main panel 12 to a rear portion 992 of the main panel (and/or to a portion of one of the side panels). Such a tethering mechanism can be structured to help ensure that, during inflation, the airbag 910 reacts with a child passenger or an adult passenger in a predetermined manner.

In one particular embodiment, the tethering mechanism 990 is attached to the airbag panels such that, as the bag fills, a first dimple, recess or depression 991 is formed in approximately the lower half of a central portion of the occupant-facing exterior surface of main panel 12. Recess 991 is positioned and structured to reside opposite and to encompass or surround what would be the sternum areas of the Hybrid III 5th percentile female ATD, the Hybrid III 50th percentile male ATD, and the Hybrid III 95th percentile male ATD, as described herein. The tethering mechanism 990 is structured so that the inflated and unconstrained portions of the main panel surrounding the recess 991 form lobes 991a engaging the chest portions of the ATD's along either side of the sternum areas. This aids in relieving contact stresses on the sternum while still providing cushioning and support of the chest area. In particular embodiments, the depth D10 of the recess is measured from a surface along a side of the recess which initially contacts the chest to one side of the sternum, to a forward-most portion of the recess positioned closest to the instrument panel.

In one embodiment, tethering mechanism 990 is attached to the airbag exterior panels 12, 14 and 16 so as to have a hollow, generally tubular structure (as shown in FIG. 33A) when the airbag is inflated. This structure may have a body 900a formed from a hollow wall, a first end 990b and a second end 990c. Wall 990a defines an interior 990d of the tubular structure. The wall 990d is attached along first end 990b to the occupant contact side of the main panel 12 along a seam 990e, by stitching or other suitable means. The seam attachment serves to restrict inflation and expansion of the attached portion of the main panel 12 during airbag inflation, such that dimple 991 is formed in the occupant contact side of panel 12. This dimple forms a recess into which a sternum portion of the occupant is received when the occupant contacts the airbag. FIG. 35 is a cross-sectional plan view of the airbag embodiment shown in FIGS. 32 and 33.

Thus, the depression 991 is structured and positioned so as to provide a recessed region of the airbag which is out of contact with a sternum or central portion of the thorax of an adult passenger, while the portion of the thorax surrounding the sternum impacts the airbag regions surrounding the depression. In this manner, the airbag regions surrounding the depression absorb the impact energy prior to contact between the airbag and the sternum or central portion of the thorax. The chest loading is thus transferred to the rib portion of the passenger's chest.

The seams along which the edges of attachment ends 990a and 990b are attached to the airbag panels may have any shape necessary for producing a recess of a particular desired size or configuration.

Figure 39A:
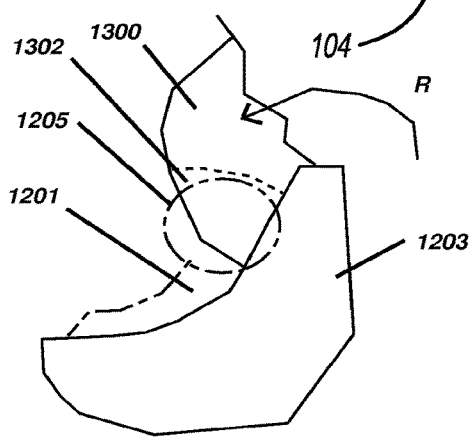
FIG. 39A is a schematic side view of an airbag in accordance with an embodiment as described herein, configured to cover the head of an infant positioned in an infant car seat when inflated.
Figure 39:
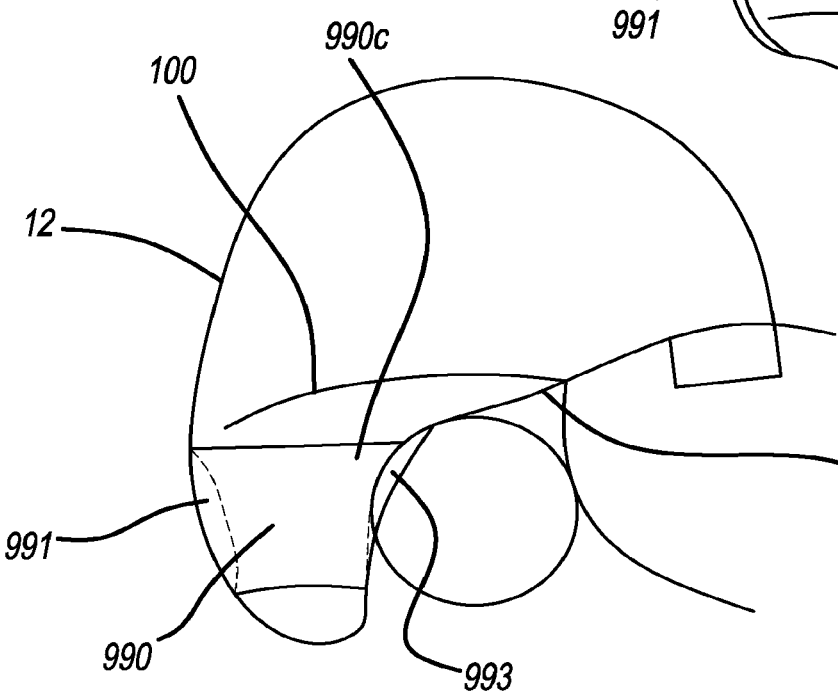
FIG. 39 is a schematic side view of the airbag embodiment of FIG. 33 in a deployed condition wrapped over the head of a child ATD.

Referring again to FIG. 33, 33A and also to FIG. 39, in one particular embodiment, edges of wall 990a along tethering mechanism second end 990c are attached to a side 12z of the main panel 12 opposite the occupant contact side so as to form a second cavity, recess, or dimple 993 which is positioned and structured to receive therein the head of a Hybrid III 6-Year Old collision ATD (not shown) when the head is positioned resting against or proximate the vehicle instrument panel at a location specified as Position-2 for NHTSA collision testing in accordance with FMVSS Standard No. 208, which is incorporated herein by reference in its entirety. Position-2 for NHTSA collision testing may be found at http://www.nhtsa.govicars/rules/rulings/80g/80gii-i.html, the substance of which is repeated herein as FIG. 18. The Hybrid III 6-Year Old collision ATD has physical parameters defined by the National Highway Traffic Safety Administration at http://www.nhtsa.gov/Research/HYBRID+III+6-Year+Old+Physical+Data, the contents of which is incorporated by reference in its entirety.

Attachment of the tethering mechanism second end 990c to the main panel side 12z serves to restrict inflation and expansion of a portion of the main panel side 12z during airbag inflation, such that dimple 993 is formed in this side of panel 12. This dimple forms a recess into which the head of a child passenger in Position 2 is received during inflation of the airbag as described herein with regard to FIGS. 15-17, so as to inflate over and around the child's head. In particular embodiments, the depth D11 of the dimple 993 is measured from a forward-most surface of the airbag along either side of the dimple.

As gases flow into the airbag, the lower portion of the bag inflates such that depression 993 receives the child's head, while relatively raised or protruding lobe portions 993a of the airbag defining the boundaries of the depression 993 act to envelop and cushion the sides of the child's head. An additional advantage of the cavity 993 is its ability to accommodate therein a portion of an infant (not shown) positioned in an infant carrier buckled to the passenger seat.

As stated previously, provision of a tethering mechanism 990 as shown in FIG. 36 effectively reduces the inflated volume of the lower chamber of the airbag and, thus, the total volume of the cushion. Due to this reduction in volume, the lower chamber takes less time to fill and pressurize, thus reducing the time required to position the airbag. In addition, the amount of gas required to fill the airbag is reduced, while permitting an increase in the relative stiffness of airbag exterior of the lower chamber.

Figure 33B:
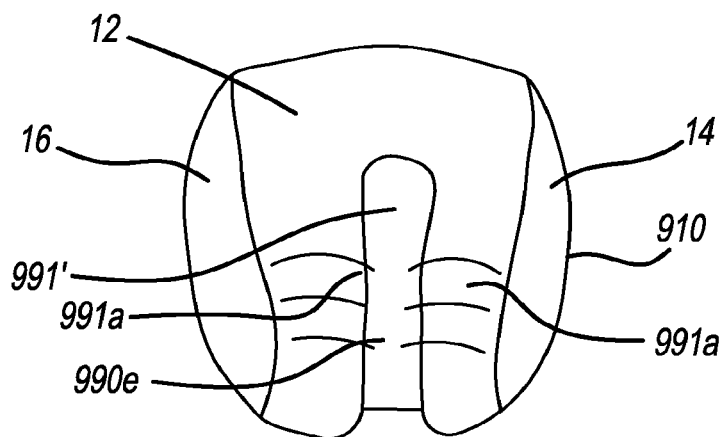
FIG. 33B is a front (passenger-facing) view of the airbag embodiment shown in FIG. 33C.
Figure 33C:
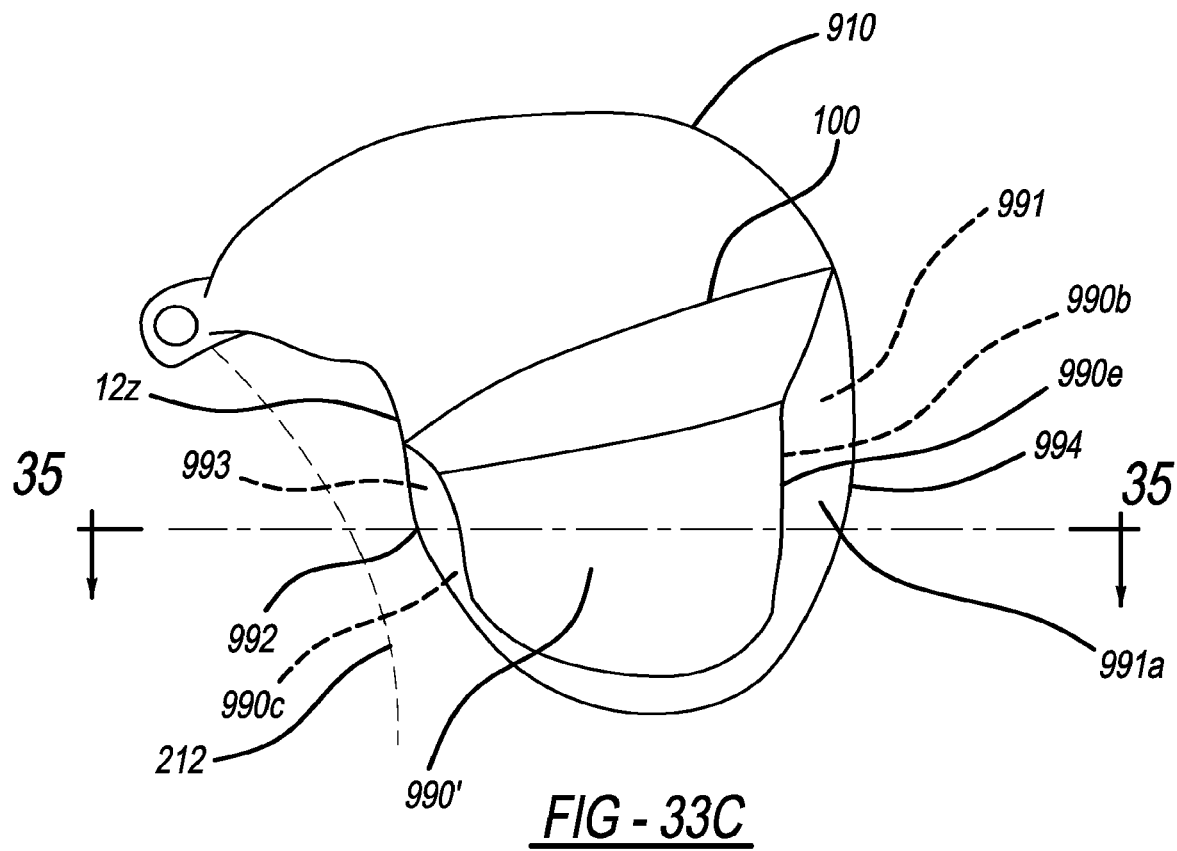
FIG. 33C is a cross-sectional side view showing attachment of one embodiment of a tethering mechanism to the airbag exterior panels so as to provide a recess or cavity.
Figure 37:
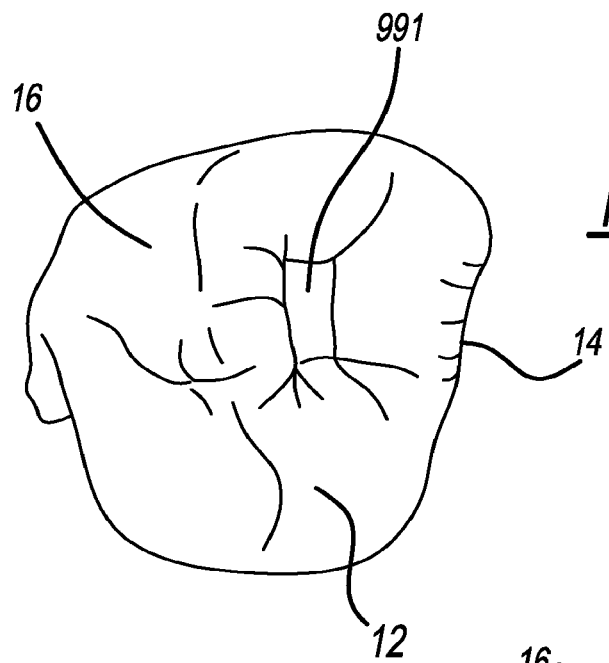
FIGS. 37 and 38 are perspective views of the additional airbag embodiments, each incorporating a recess formed in an occupant contact face of the airbag.
Figure 38:
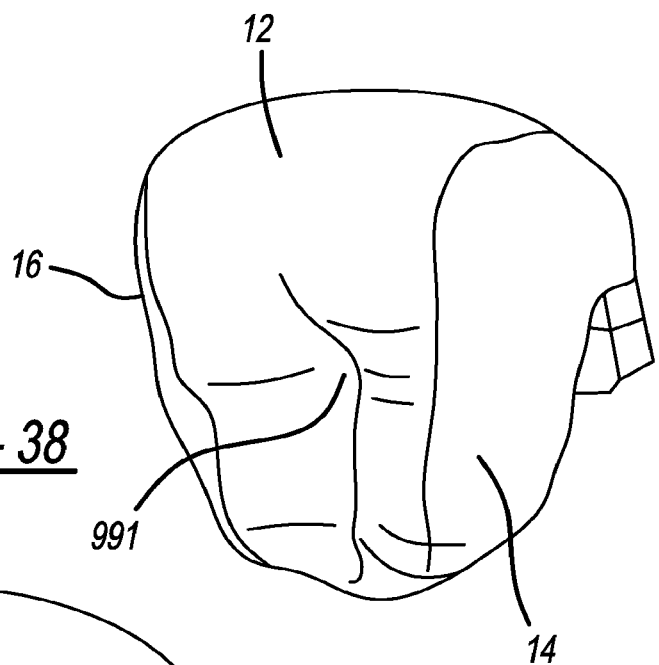

Referring to FIGS. 33B and 33C, in another embodiment, a tethering mechanism 990' is attached to the airbag exterior panels 12, 14 and 16 so as to provide a recess or cavity 991' as previously described, but extending continuously from the occupant contact side around the bottom portion of the airbag to the side of the airbag closest to the instrument panel. This recess 991' includes and incorporates both the occupant contact recess 991 and the child-receiving recess 993 previously described.

FIG. 34 is a cross-sectional plan view of another embodiment 990' of the lower chamber internal tethering mechanism. In this embodiment, the tethering mechanism 990' is attached to the airbag panels such that, as the bag fills, a first dimple or depression 991' is formed in approximately the lower half of a central portion of the occupant-facing exterior surface of main panel 12. Depression 991' is positioned and structured to reside opposite to and to encompass or surround what would be the sternum areas of the Hybrid III 5th percentile female ATD, the Hybrid III 50th percentile male ATD, and the Hybrid III 95th percentile male ATD, as described herein. The tethering mechanism 990' is structured so that the inflated and unconstrained portions of the main panel surrounding the dimple 991' form lobes 991a' engaging the chest portions of the ATD's along either side of the sternum areas. This aids in relieving contact stresses on the sternum while still providing cushioning and support of the chest area.

In this embodiment, the tether 990' has a body 990a', a first end 990b' and a second end 990c' opposite the first end. In the embodiment shown, tether 990' extends along a substantially vertical plane when the airbag is inflated. However, the tether may have any orientation necessary to provide the desired restraint of the airbag exterior surfaces when the cushion is inflated. Tether body 990a' may be formed from a single flat piece of material or from one or more pieces of flat material attached for example, end to end, to form a substantially flat or planar structure. The first end wall 990b' is attached to the occupant contact side of the main panel 12 along a seam by stitching or other suitable means, as previously described. The seam attachment serves to restrict inflation and expansion of the attached portion of the main panel 12 during airbag inflation, such that dimple 991' is formed in the occupant contact side of panel 12. This dimple forms a recess into which a sternum portion of the occupant is received when the occupant contacts the airbag. Thus, the depression 991' is structured and positioned so as to provide a recessed region of the airbag which is out of contact with a sternum or central portion of the thorax of an adult passenger, while the surrounding portion of the thorax impacts the airbag regions surrounding the depression. In this manner, the airbag regions surrounding the depression absorb the impact energy prior to contact between the airbag and the sternum or central portion of the thorax. The chest loading is thus transferred to the rib portion of the passenger's chest. In particular embodiments, the depth D10 of the dimple is measured from a surface along a side of the dimple which initially contacts the chest to one side of the sternum to a portion of the dimple closest to the instrument panel.

In addition, if desired, a second depression 993' for the head of a Hybrid III 6-Year Old collision ATD as previously described may be formed by attaching tether second end 990c' to side 12z of the main panel. In particular embodiments, the depth D1 of the dimple 993' is measured from a forward-most surface of the airbag along either side of the dimple.

It will be appreciated that the depths D10 and D11 of the recesses 991 and 993 formed in the airbag exterior surfaces can be controlled by controlling the position of the tether relative to airbag sides 12a and 12z, and by controlling the length LT of the tether extending generally along an axis parallel with a fore-aft axis of the vehicle (for example, as shown in FIGS. 33 and 33A.

Provision of a tethering mechanism 990' as shown in FIGS. 32-39 effectively reduces the inflated volume of the lower chamber of the airbag and, thus, the total volume of the cushion. Due to this reduction in volume, the lower chamber takes less time to fill and pressurize, thus reducing the time required to position the airbag. In addition, the amount of gas required to fill the airbag is reduced, while permitting an increase in the relative stiffness of airbag exterior of the lower chamber.

FIG. 39 shows a cross-sectional side view (similar to that shown in FIG. 17) of an airbag in accordance with an embodiment as described with regard to FIGS. 32-36, with the airbag wrapped over the head 700 of a Hybrid III 6-Year Old collision ATD.

FIG. 39A shows a schematic side view of an airbag 1300 in accordance with an embodiment as described with regard to FIGS. 32-36, with the airbag wrapped over the head 1205 of an infant 1201 secured in a rear-facing infant car seat 1203. In this embodiment, the head of the infant is received in a recess 1302 (such as recess 993 previously described) as the airbag inflates above and over the top of the infant's head in the direction indicated by arrow R, thereby helping to secure the child's head in position when the airbag is in the deployed configuration.

Operation of an airbag in accordance with an embodiment described herein, and movement of an adult vehicle occupant's body prior to and during contact with a deployed airbag is illustrated in FIGS. 4, 8, 9 and 10-14. FIGS. 8 and 9 show portions of collision tests using ATD's 305 and 405, respectively, meeting the specifications previously described, after deployment of the airbags and stoppage of passenger forward motion. FIGS. 10-14 show a typical deployment/passenger contact sequence using an airbag in accordance with an embodiment of the present invention.

Figure 10:
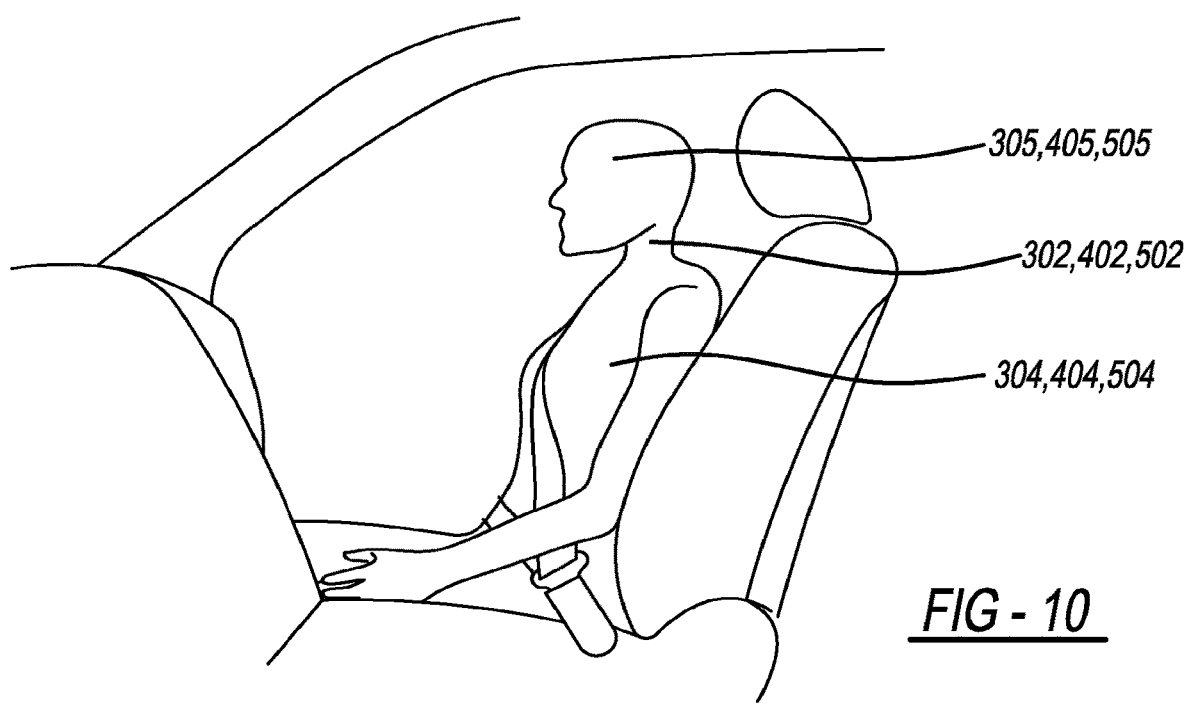
FIG. 10 is a side view of a vehicle passenger compartment showing a seated Anthropomorphic Test Device prior to deployment of a vehicle airbag.

Referring to FIG. 10, prior to bag deployment, an ATD 305, 405, 505 is seated and airbag 10 (not shown) is operatively coupled to an associated gas generating system or other inflation fluid source (not shown), in a manner known in the art. The inflation fluid source may be operatively coupled to a collision event sensor (not shown) that includes (or is in operative communication with) a controller (not shown) which signals activation of the airbag system in the event of a collision. The airbag and its associated inflation means are configured to provide rapid inflation of the airbag (and especially upper chamber 102) so as quickly engage and cushion the forward-moving head & neck region and (at a slightly later point in time) the thoracic region of the passenger, while utilizing a singular cushion volume to aid in reducing the inertia of the individual. The thorax region of the passenger is initially restrained by the seatbelt and receives additional support from the lower chamber once it is filled.

Figure 11:
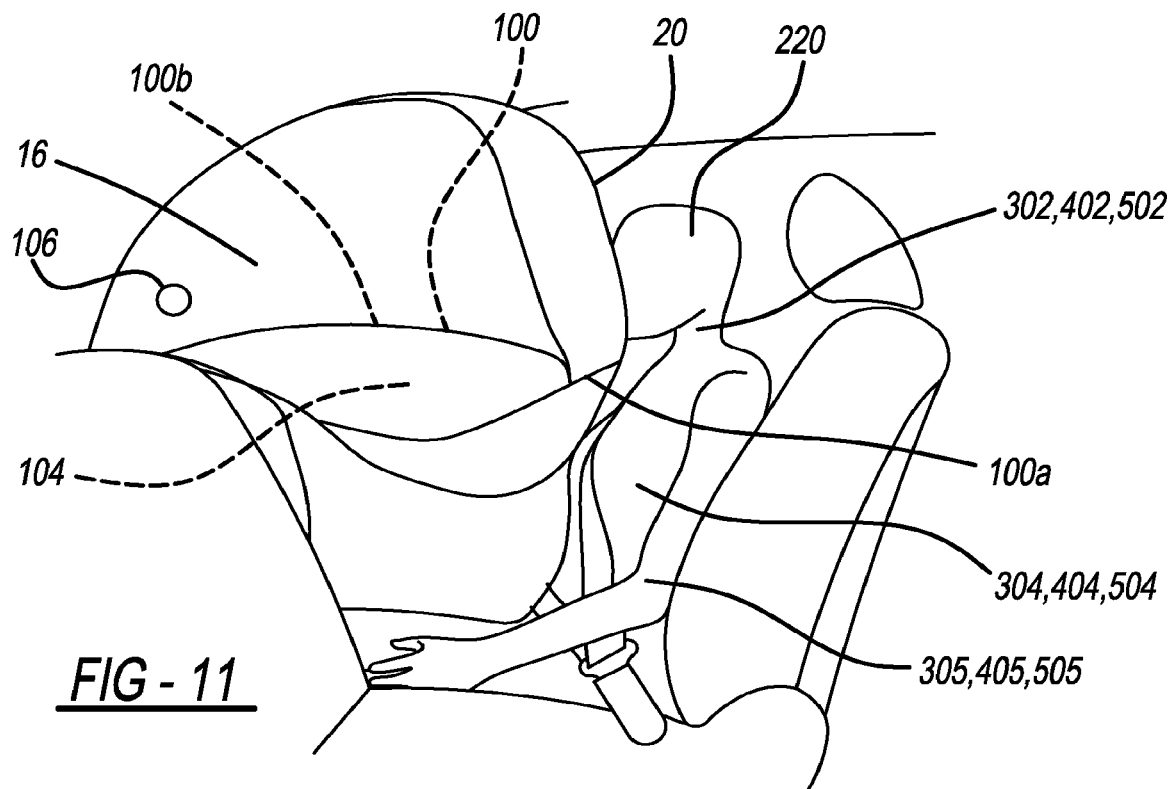
FIG. 11 is the side view of FIG. 10 just after the airbag has been activated and begins to deploy.
Figure 12:
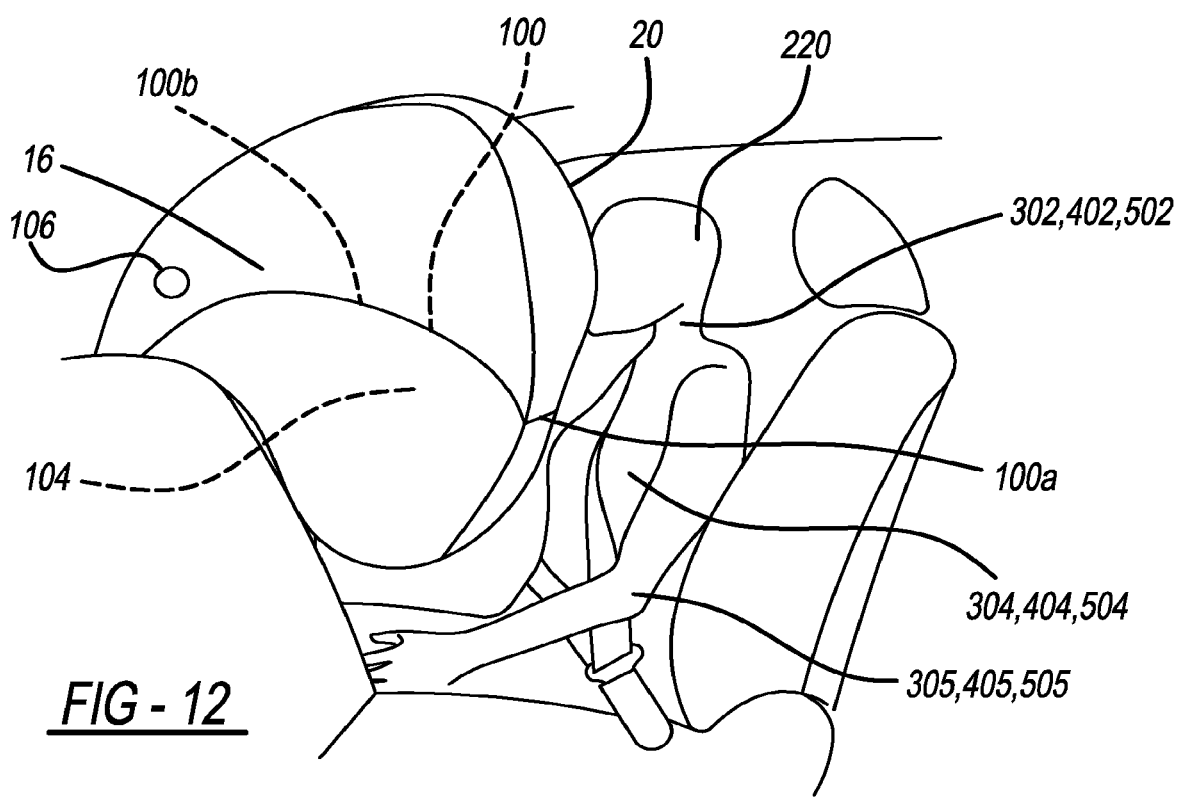
FIG. 12 is the side view of FIG. 11 after additional time has elapsed after airbag activation.
Figure 13:
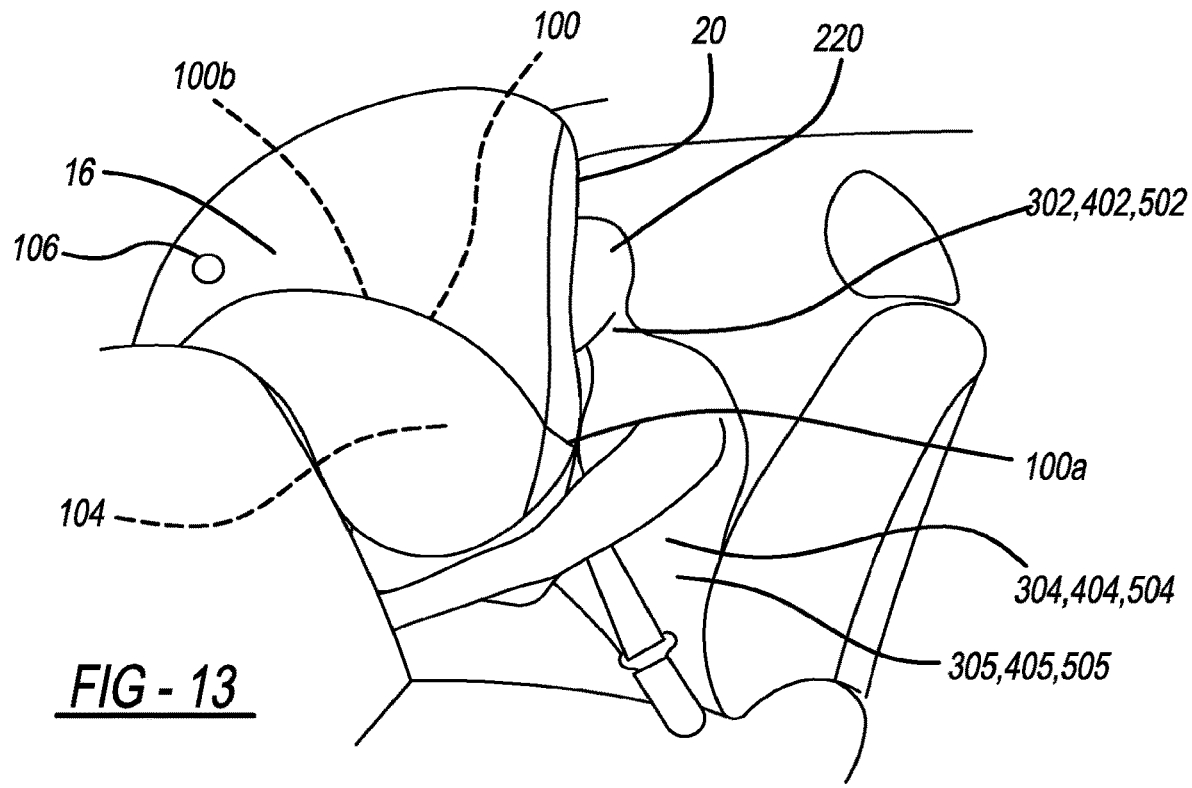
FIG. 13 is the view of FIG. 12 after full contact of the head and neck regions of the passenger with the airbag.
Figure 14:
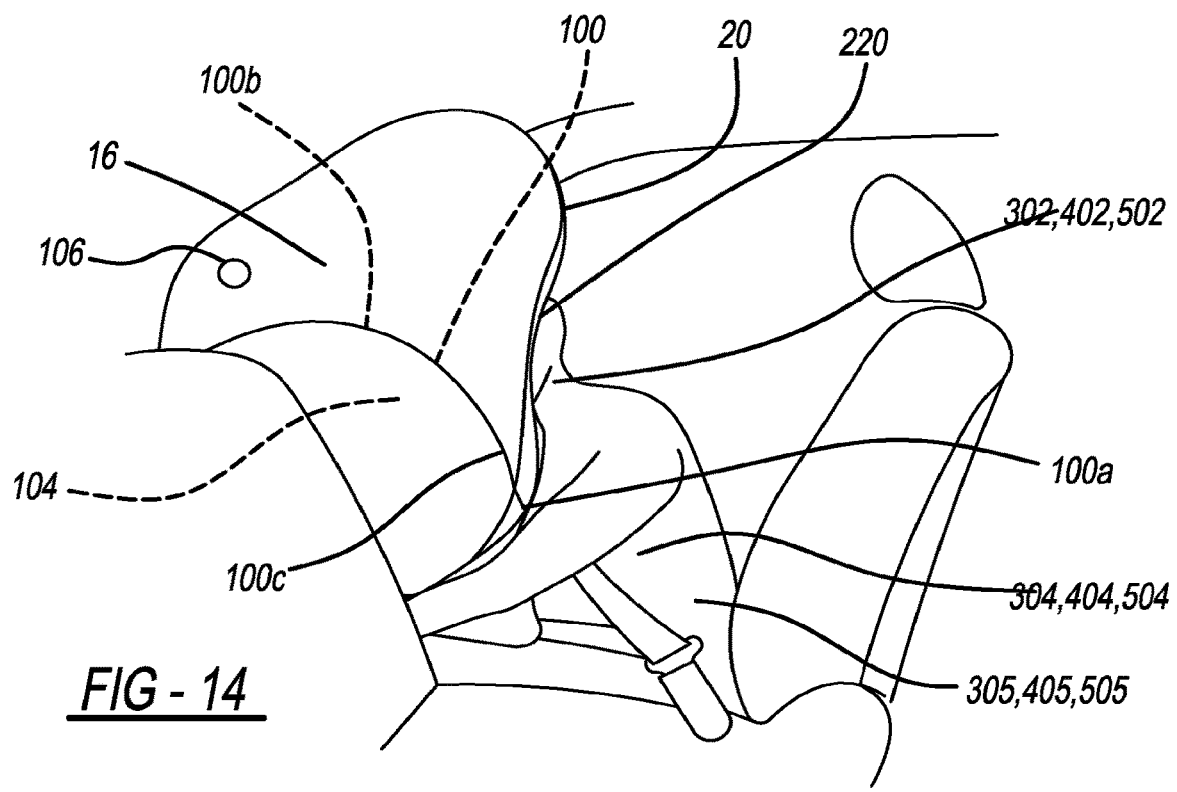
FIG. 14 is the view of FIG. 13 after contact of the thoracic region of the passenger with the seam of the leading edge of the airbag divider panel.

Referring now to FIGS. 11 and 12, when the system is activated, inflation gas flows from the inflation fluid source into upper chamber 102, rapidly inflating the upper chamber to enable this chamber to intercept the forward-moving head and neck regions as early as possible (as seen in FIGS. 13 and 14), to aid in minimizing the momentum built up by the head and neck regions. At this early stage of airbag inflation, the occupant seatbelt tensions to maintain the occupant's lower thoracic region in the seat. Inflation gas then flows from the upper chamber 102 through valve 112 into lower chamber 104 to pressurize the lower chamber for supporting the occupant thoracic region when the seatbelt tensioner releases.

Referring to FIGS. 13 and 14, when the lower chamber is filled, valve 112 actuates responsive to pressure in lower chamber 104 to attenuate or restrict the flow of gas back into the upper chamber 102. Also, as seen in FIGS. 8, 9, 13 and 14, contact between the ATD's and the airbag leading edge 100a occurs within respective zones Z defined by the hip and shoulder joint locations on the bodies of the ATD's as previously described. Referring to FIGS. 4, 8, 9, 13 and 14, it is seen that the divider leading edge seam 110 contacts the passenger between the hip pivot 202 of the passenger and the shoulder pivot 206' of the passenger.

Referring to FIG. 13, as the passenger head region 302 contact the airbags, gases in the upper chamber are vented into the lower chamber or discharged into the environment via upper chamber vents 106, resulting in a reduction of upper chamber pressure and a "softening" of bag front surface over the upper chamber responsive to contact with the passenger's head regions. This softening aids in providing sufficient support to protect the occupant's head region, while helping to minimize the contact forces between the head region and the airbag. Because of valve 112, the compression of the upper chamber may cause some increase in the pressure within the lower chamber 104 in response to the contact with the passenger's head. This facilitates the maintenance of alignment of the head and thorax along axis L (FIG. 4). Responsive to continued forward motion of the passenger's body, the airbag continues to compress, proportioning the airbag internal pressure between the chambers so as to aid in preserving alignment while passenger is loading the airbag.

Referring to FIG. 14, at a time later in the airbag loading event, the chest (thorax) engages the lower portion of the cushion. At this time, both the upper and lower chambers of the cushion are being loaded simultaneously. In this portion of the loading, gas from the lower chamber flows through the flow restriction valve mechanism 112 from the lower chamber to the upper chamber. A rise in pressure now occurs in the upper chamber due to the simultaneous loading by the passenger and the flow of gas from the lower chamber through the directional valve restriction. This rise in pressure is relieved through the main vent(s) in the upper chamber, with gas passing into the vehicle environment. Note that the flow through the restriction valve between the lower and upper chambers in this phase has been tailored by design as previously described, to proportion the upper and lower chamber pressures to minimize the relative motion of the head and thorax, in order to minimize the neck flexion response.

Thus, in the airbag embodiment just described, the airbag is structured to enable filling of a first chamber, then a second chamber using gas passing through the first chamber. When the airbag is loaded by passenger contact, the loading energy is dissipated by passing gas from lower chamber back into the upper chamber, and from the upper chamber through the vents to the surrounding environment. It has been found that chambered passenger-side airbags structured as described above are more efficient with regard to usage of inflation gas than traditional airbag designs providing comparable occupant protection. This characteristic enables a relatively lower-output inflator and/or gas source having a lower peak pressure and pressure rise rate to be used to inflate the airbag, because the upper chamber is significantly lower in volume than a traditional non-chambered bag of similar coverage. In some applications (typically an SUV or light truck) it is also possible to use a single stage inflator. In these applications the vehicle may have a favorable pulse, high roof line and large occupant area. A single-stage inflator may be employed where dynamic modes for adult ATDs can be met along with the 3 & 6 year old out of position test requirements as specified in the regulations. In this case the inflator output would be sufficient to properly restrain the unbelted Hybrid III 50th percentile male test ATD without being too soft and the smaller unbelted Hybrid III 5th percentile female Anthropomorphic Test Device without being too stiff.

Airbags having the same exterior dimensions and chambered structure may be used for multiple applications, because variations in airbag performance characteristics due to design requirements may be achieved by modifying the interior structure of the airbag (for example, by changing the location of the divider, by modifying the flow characteristics of the valve 112 connecting the upper and lower chambers, by changing the upper chamber vent locations and characteristics, and by changing the locations of the seams connecting the volume control mechanism (VCM) panels to the main and side airbag panels). This ability to use a common exterior structure provides a degree of uniformity in bag design and manufacturing.

Figure 40:
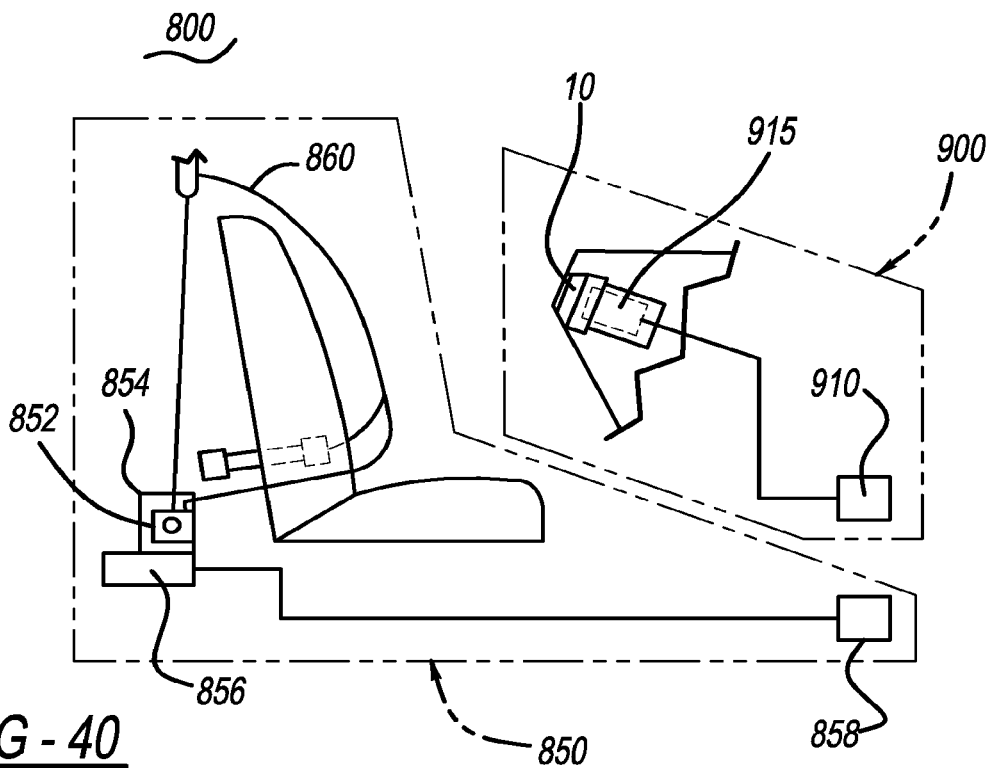
FIG. 40 is a view of a vehicle occupant protection system incorporating an airbag in accordance with an embodiment of the present invention.
Figure 41:
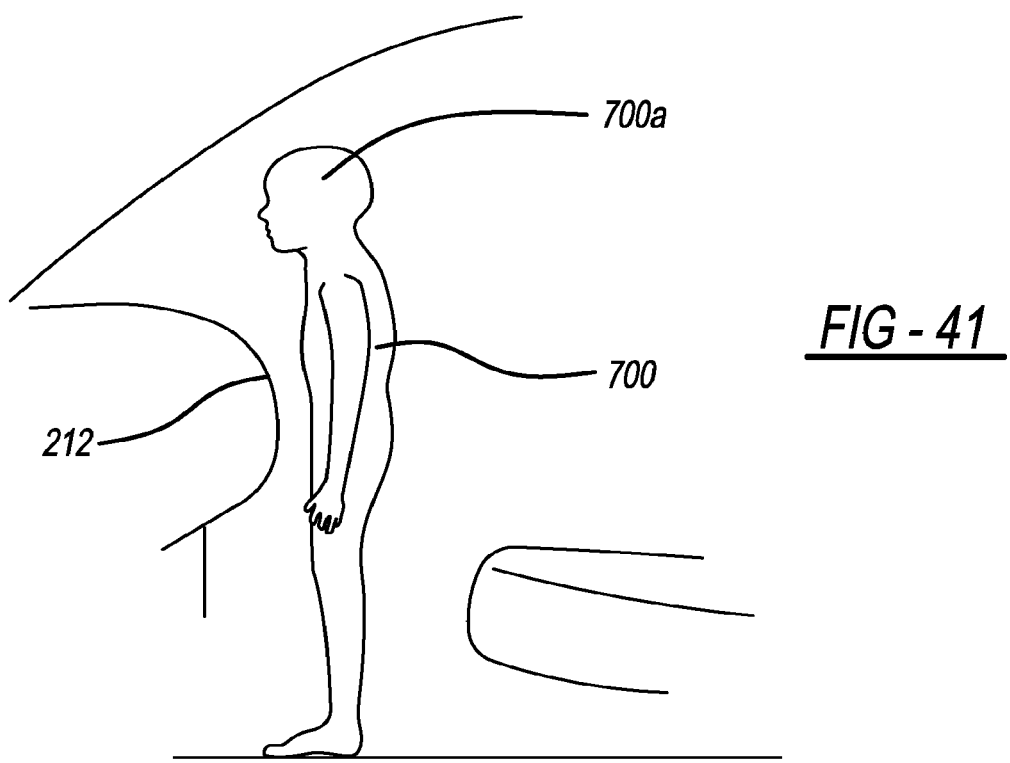
FIG. 41 is a side view of a 3 year-old Anthropomorphic Test Device in positioned in Position-1 for NHTSA Out of Position testing under FMVSS Standard No. 208, prior to activation of a vehicle airbag.
Figure 42:
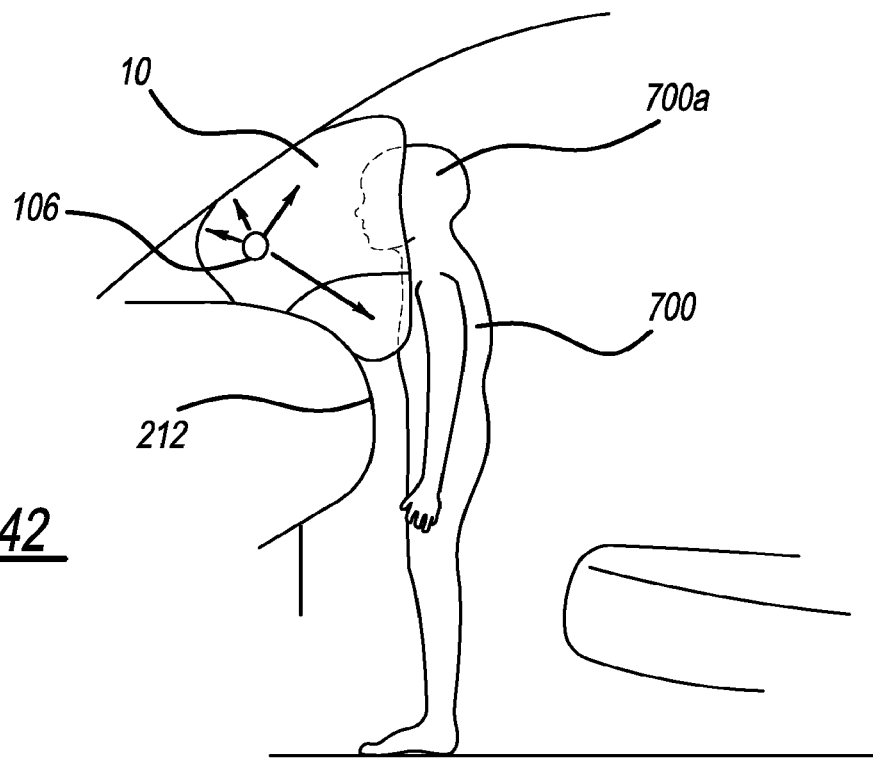
FIG. 42 is the side view of FIG. 41 after activation of a vehicle airbag.

Referring now to FIG. 40, an embodiment 10 of the airbag described herein may be incorporated into an airbag system 900. Airbag system 900 includes at least one gas source 915 (for example, a known inflator or gas generating system) and airbag 10 in accordance with an embodiment described herein. The airbag is operatively coupled to the gas source so as to enable fluid communication therewith upon activation of the gas generating system. Airbag system 900 may also include (or be in communication with) a collision event sensor 910. Collision event sensor 910 includes a known collision sensor algorithm that prompts actuation of airbag system 900 via, for example, activation of gas source 915 in the event of a collision.

Referring again to FIG. 40, airbag system 900 may also be incorporated into a broader, more comprehensive vehicle occupant protection system 800 including additional elements such as a safety belt assembly 850. FIG. 40 shows a schematic diagram of one exemplary embodiment of such a protection system. Safety belt assembly 850 includes a safety belt housing 852 and a safety belt 860 extending from housing 852. A safety belt retractor mechanism 854 (for example, a spring-loaded mechanism) may be coupled to an end portion of the belt. In addition, a known safety belt pretensioner 856 may be coupled to belt retractor mechanism 854 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 850 may also include (or be in communication with) a collision event sensor 858 (for example, an inertia sensor or an accelerometer) including a known collision sensor algorithm that prompts actuation of belt pretensioner 856 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments and such term is not intended to connote that such embodiments are necessarily extraordinary or superlative examples.

The terms "coupled," "connected," and the like as used herein means the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements, for example "top," "bottom," "above," "below," etc., are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. An airbag comprising:
 a main panel and first and second side panels defining an interior of the airbag, the side panels extending from opposite and spaced apart edges of the main panel, the panels defining an interior surface and an exterior surface, and the main panel comprising an occupant contact portion configured to face an occupant;
 a divider positioned in the interior so as to divide the interior into an upper chamber and a lower chamber, at least a portion of the divider being attached to the interior surface of the side panels, wherein at least a portion of the leading edge of the divider is not attached to the interior surface of the occupant contact portion before and after inflation of the airbag, the leading edge of the divider and the interior surface of the occupant contact portion of the main panel defining a gas flow passage therebetween; and
 at least one tether positioned within the upper chamber, the at least one tether being attached to the divider and to the interior surface of an upper portion of the main panel so as to restrict movement of a portion of the divider in a direction toward the lower chamber during inflation of the airbag, wherein the upper portion of the main panel is disposed above the divider,
 wherein upon actuation of said airbag, said upper chamber is oriented to substantially align with a head and/or neck of the occupant prior to contact therewith, and said lower chamber is oriented to substantially align with a thorax of the occupant prior to contact therewith,
 wherein the airbag is structured such that the gas flow passage is at least partially closable to restrict a flow of gases from the lower chamber to the upper chamber, responsive to pressure exerted on the exterior surface of the occupant contact portion of the main panel by the occupant.

2. The airbag of claim 1 further comprising:
 at least one tethering mechanism positioned within the lower chamber, the at least one tethering mechanism being structured and attached to the occupant contact portion of the main panel so as to restrict movement of a portion of the occupant contact portion during airbag inflation such that a first recess is formed along the exterior surface of the occupant contact portion of the main panel when the airbag is inflated.

3. The airbag of claim 2 wherein the at least one tethering mechanism is attached to the interior surface of the occupant contact portion of the main panel such that the first recess is structured and positioned to receive therein a sternum of the occupant contacting the airbag after airbag deployment.

4. The airbag of claim 2 wherein the at least one tethering mechanism is structured and attached to the interior surface of the occupant contact portion of the main panel such that at least one lobe is formed adjacent the first recess, the at least one lobe being positioned so as to cushion a portion of the occupant adjacent the sternum of the occupant contacting the airbag after airbag deployment.

5. The airbag of claim 2 wherein the at least one tethering mechanism has a hollow, generally tubular structure.

6. The airbag of claim 2 wherein the at least one tethering mechanism is planar and is structured to extend along a substantially vertical plane when the airbag is inflated.

7. The airbag of claim 2 wherein the at least one tethering mechanism is structured and attached to the interior surface of the occupant contact portion of the main panel so as to restrict movement of a portion of the occupant contact portion during airbag inflation such that a second recess is formed along the exterior surface of the occupant contact portion of the main panel when the airbag is inflated.

8. The airbag of claim 7 wherein the at least one tethering mechanism is attached to the interior surface of the occupant contact portion of the main panel such that the second recess is positioned and structured to receive therein a head of a Hybrid III 6-Year Old collision ATD when the head is positioned resting against or proximate a vehicle instrument panel at a location specified as Position-2 for NHTSA collision testing in accordance with FMVSS Standard No. 208.

9. The airbag of claim 1 further comprising an opening formed in the divider and spaced apart from any edge of the divider, and a flow restriction valve mechanism positioned so as to restrict gas flow through the opening from the lower chamber into the upper chamber.

10. The airbag of claim 1 wherein the at least one tether is attached to a location on the divider which is structured to be an apex or relatively highest portion of the divider when the airbag is inflated.

11. The airbag of claim 1 wherein the at least one tether is operatively coupled to the divider so as to restrict deflection of the divider in a direction toward the lower chamber during airbag inflation, and wherein the at least one tether is operatively coupled to the interior surface of the occupant contact portion of the main panel so as to restrict motion of the exterior surface of the airbag in a direction toward the occupant during airbag inflation.

12. A vehicle including an airbag in accordance with claim 1.

13. An airbag system including an airbag in accordance with claim 1.

14. The airbag of claim 1 wherein the leading edge extends from the divider to form a flap positioned opposite the interior surface of the occupant contact portion of the main panel and extending into the airbag lower chamber, the flap being structured to restrict a flow of gases from the lower chamber into the upper chamber through the gas flow passage.

* * * * *